(12) United States Patent
Takahashi et al.

(10) Patent No.: US 11,973,180 B2
(45) Date of Patent: Apr. 30, 2024

(54) BATTERY AND METHOD FOR MANUFACTURING BATTERY

(71) Applicant: SEMICONDUCTOR ENERGY LABORATORY CO., LTD., Atsugi (JP)

(72) Inventors: Minoru Takahashi, Nagano (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/542,806

(22) Filed: Dec. 6, 2021

(65) Prior Publication Data
US 2022/0166090 A1 May 26, 2022

Related U.S. Application Data

(60) Continuation of application No. 16/431,877, filed on Jun. 5, 2019, now Pat. No. 11,201,368, which is a (Continued)

(30) Foreign Application Priority Data

| Oct. 27, 2015 | (JP) | ................................. | 2015-210931 |
| Dec. 9, 2015 | (JP) | ................................. | 2015-240157 |
| Dec. 17, 2015 | (JP) | ................................. | 2015-245916 |

(51) Int. Cl.
*H01M 10/052* (2010.01)
*H01M 10/04* (2006.01)
(Continued)

(52) U.S. Cl.
CPC ... *H01M 10/0525* (2013.01); *H01M 10/0413* (2013.01); *H01M 10/0436* (2013.01);
(Continued)

(58) Field of Classification Search
CPC ........... H01M 10/0525; H01M 10/052; H01M 10/0413; H01M 10/0436; H01M 10/0585;
(Continued)

(56) References Cited

U.S. PATENT DOCUMENTS 6,048,639 A 4/2000 Sonozaki et al.
7,731,766 B2 6/2010 Yoon
(Continued)

FOREIGN PATENT DOCUMENTS

CN 001224249 A 7/1999
CN 102214813 A 10/2011
(Continued)

OTHER PUBLICATIONS

Taiwanese Office Action (Application No. 110117788) dated May 25, 2022.
(Continued)

*Primary Examiner* — Raymond Alejandro
(74) *Attorney, Agent, or Firm* — NIXON PEABODY LLP; Jeffrey L. Costellia

(57) ABSTRACT

A battery capable of changing its form safely is provided. A bendable battery having a larger thickness is provided. A battery with increased capacity is provided. For an exterior body of the battery, a film in the shape of a periodic wave in one direction is used. A space is provided in an area surrounded by the exterior body and between an end portion of the electrode stack that is not fixed and an interior wall of the exterior body. Furthermore, the phases of waves of a pair of portions of the exterior body between which the electrode stack is located are different from each other. In particular, the phases are different from each other by 180 degrees so that wave crest lines overlap with each other and wave trough lines overlap with each other.

18 Claims, 35 Drawing Sheets

Related U.S. Application Data division of application No. 15/296,081, filed on Oct. 18, 2016, now Pat. No. 10,333,111.

(51) Int. Cl.

| | |
|---|---|
| *H01M 10/0525* | (2010.01) |
| *H01M 50/105* | (2021.01) |
| *H01M 50/119* | (2021.01) |
| *H01M 50/133* | (2021.01) |
| *H01M 50/136* | (2021.01) |
| *H01M 50/141* | (2021.01) |
| *H01M 50/178* | (2021.01) |
| *H01M 50/55* | (2021.01) |
| *H01M 50/553* | (2021.01) |
| *H01M 10/0585* | (2010.01) |
| *H01M 50/124* | (2021.01) |

(52) U.S. Cl.
CPC ....... *H01M 50/105* (2021.01); *H01M 50/119* (2021.01); *H01M 50/133* (2021.01); *H01M 50/136* (2021.01); *H01M 50/141* (2021.01); *H01M 50/178* (2021.01); *H01M 50/55* (2021.01); *H01M 50/553* (2021.01); *H01M 10/052* (2013.01); *H01M 10/0585* (2013.01); *H01M 50/124* (2021.01); *H01M 2220/10* (2013.01); *H01M 2220/20* (2013.01); *H01M 2220/30* (2013.01); *Y02E 60/10* (2013.01); *Y02P 70/50* (2015.11)

(58) Field of Classification Search
CPC ............. H01M 50/141; H01M 50/136; H01M 50/178; H01M 50/105; H01M 50/133; H01M 50/119; H01M 50/55; H01M 50/553; H01M 50/124; H01M 2220/10; H01M 2220/20; H01M 2220/30; Y02P 70/50; Y02E 60/10
See application file for complete search history.

(56) References Cited

U.S. PATENT DOCUMENTS

| | | | |
|---|---|---|---|
| 7,972,721 B2 | 7/2011 | Kozu et al. | |
| 8,100,681 B2 | 1/2012 | Yoon | |
| 8,426,069 B2 | 4/2013 | Okazaki et al. | |
| 8,703,314 B2 | 4/2014 | Morikawa et al. | |
| 8,785,030 B2 | 7/2014 | Ueda | |
| 9,023,509 B2 | 5/2015 | Cho et al. | |
| 9,325,028 B2 | 4/2016 | Kwon et al. | |
| 9,701,056 B2 | 7/2017 | Ochiai et al. | |
| 9,941,506 B2 | 4/2018 | Hiroki et al. | |
| 10,014,497 B2 | 7/2018 | Lee et al. | |
| 10,185,114 B2 | 1/2019 | Ito | |
| 10,320,025 B2 | 6/2019 | Hiroki et al. | |
| 10,323,050 B2 | 6/2019 | Miyasato et al. | |
| 10,755,869 B2 | 8/2020 | Kawata et al. | |
| 11,316,189 B2 | 4/2022 | Hiroki et al. | |
| 11,626,581 B2 | 4/2023 | Hiroki et al. | |
| 11,677,095 B2 | 6/2023 | Hiroki et al. | |
| 2007/0264535 A1 | 11/2007 | Lee et al. | |
| 2009/0253049 A1* | 10/2009 | Ishikawa ............. | H01M 10/052 429/347 |
| 2011/0294015 A1* | 12/2011 | Pirk ........................ | H01M 4/04 429/246 |
| 2012/0058373 A1* | 3/2012 | Morikawa ......... | H01M 10/0525 429/94 |
| 2012/0081852 A1 | 4/2012 | Maravilla et al. | |
| 2012/0177975 A1 | 7/2012 | Yageta et al. | |
| 2012/0183825 A1 | 7/2012 | Lee et al. | |
| 2012/0321932 A1* | 12/2012 | Ise .................... | H01M 10/0436 429/144 |
| 2013/0101884 A1 | 4/2013 | Ueda | |
| 2013/0224562 A1 | 8/2013 | Momo | |
| 2015/0022957 A1 | 1/2015 | Hiroki et al. | |
| 2015/0044527 A1 | 2/2015 | Neudecker et al. | |
| 2015/0111088 A1 | 4/2015 | Hiroki et al. | |
| 2015/0155528 A1 | 6/2015 | Takahashi et al. | |
| 2015/0155530 A1 | 6/2015 | Takahashi et al. | |
| 2015/0200319 A1 | 7/2015 | Miyamura. et al. | |
| 2015/0248504 A1 | 9/2015 | Glunz et al. | |
| 2015/0261254 A1 | 9/2015 | Hiroki et al. | |
| 2015/0349375 A1 | 12/2015 | Takahashi et al. | |
| 2016/0006070 A1 | 1/2016 | Sohn et al. | |
| 2016/0093839 A1 | 3/2016 | Iseri et al. | |
| 2016/0218327 A1 | 7/2016 | Takahashi et al. | |
| 2016/0248053 A1 | 8/2016 | Iseri et al. | |
| 2018/0123091 A1 | 5/2018 | Ichikawa et al. | |
| 2018/0226629 A1 | 8/2018 | Hiroki et al. | |
| 2020/0143999 A1 | 5/2020 | Kawata et al. | |
| 2023/0246154 A1 | 8/2023 | Hiroki et al. | |
| 2023/0378514 A1 | 11/2023 | Hiroki et al. | |

FOREIGN PATENT DOCUMENTS

| | | |
|---|---|---|
| CN | 102257667 A | 11/2011 |
| CN | 102959760 A | 3/2013 |
| CN | 103875093 A | 6/2014 |
| CN | 104487244 A | 4/2015 |
| CN | 104577179 A | 4/2015 |
| CN | 104620436 A | 5/2015 |
| CN | 104701565 A | 6/2015 |
| CN | 104716383 A | 6/2015 |
| CN | 105470414 A | 4/2016 |
| CN | 105914305 A | 8/2016 |
| DE | 19901657 | 7/1999 |
| EP | 2375472 A | 10/2011 |
| EP | 2477267 A | 7/2012 |
| EP | 2768041 A | 8/2014 |
| EP | 2881251 A | 6/2015 |
| EP | 2991154 A | 3/2016 |
| EP | 3091593 A | 11/2016 |
| JP | 64-072458 A | 3/1989 |
| JP | 10-247480 A | 9/1998 |
| JP | 11-213964 A | 8/1999 |
| JP | 2000-173559 A | 6/2000 |
| JP | 2001-052762 A | 2/2001 |
| JP | 2002-151032 A | 5/2002 |
| JP | 2003-123706 A | 4/2003 |
| JP | 2004-024801 A | 1/2004 |
| JP | 2004-303625 A | 10/2004 |
| JP | 2005-243362 A | 9/2005 |
| JP | 2005-268220 A | 9/2005 |
| JP | 2006-331874 A | 12/2006 |
| JP | 2007-234466 A | 9/2007 |
| JP | 2011-023369 A | 2/2011 |
| JP | 2012-151110 A | 8/2012 |
| JP | 2014-164857 A | 9/2014 |
| JP | 2015-130332 A | 7/2015 |
| JP | 2016-027532 A | 2/2016 |
| JP | 2016-072209 A | 5/2016 |
| JP | 2016-157549 A | 9/2016 |
| JP | 2016-164874 A | 9/2016 |
| KR | 2015-0046738 A | 4/2015 |
| KR | 2015-0065142 A | 6/2015 |
| TW | 423172 | 2/2001 |
| TW | 201434657 | 9/2014 |
| TW | 201501392 | 1/2015 |
| TW | 201530851 | 8/2015 |
| WO | WO-2012/140709 | 10/2012 |
| WO | WO-2014/042454 | 3/2014 |
| WO | WO-2015/122667 | 8/2015 |
| WO | WO-2015/125048 | 8/2015 |
| WO | WO-2015/141264 | 9/2015 |

OTHER PUBLICATIONS

International Search Report (Application No. PCT/IB2016/056146) dated Jan. 17, 2017.
Written Opinion (Application No. PCT/IB2016/056146) dated Jan. 17, 2017.

(56) References Cited

OTHER PUBLICATIONS

Taiwanese Office Action (Application No. 105134153) dated May 27, 2020.
Chinese Office Action (Application No. 201680063174.X) dated Sep. 24, 2020.
Taiwanese Office Action (Application No. 112108567) Dated Nov. 9, 2023.
Chinese Office Action (Application No. 202111677442.6) Dated Feb. 20, 2024.

* cited by examiner

FIG. 6A
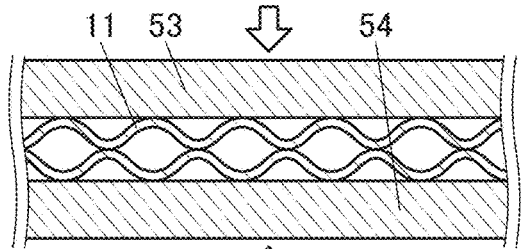
FIG. 6B
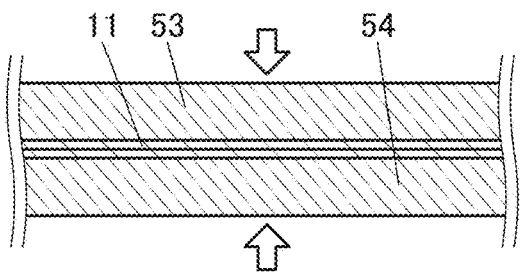
FIG. 6C
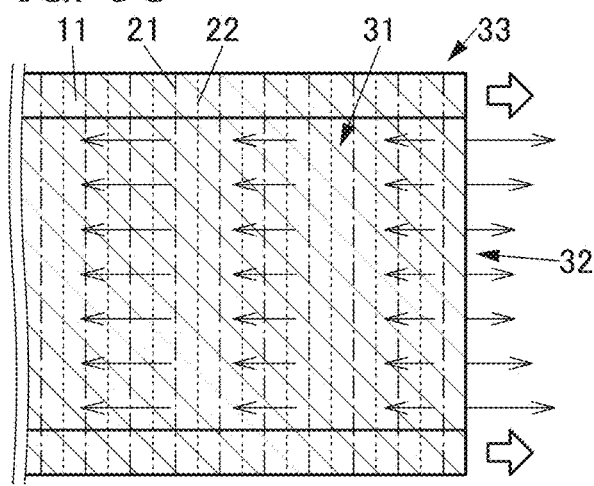
FIG. 6D
FIG. 6E
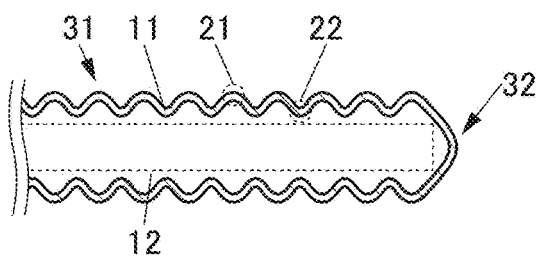
FIG. 6F
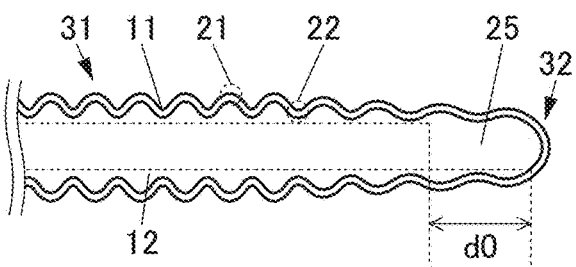

Sample 8

Sample 9

Sample 10

FIG. 33A1 Model 1
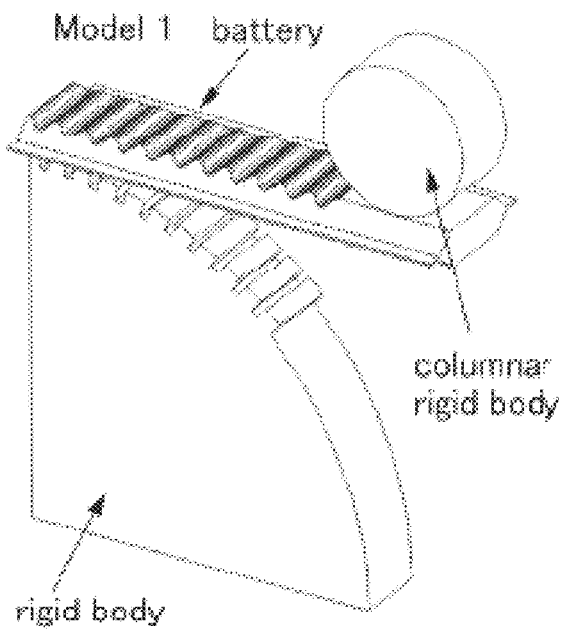
FIG. 33A2 Model 1
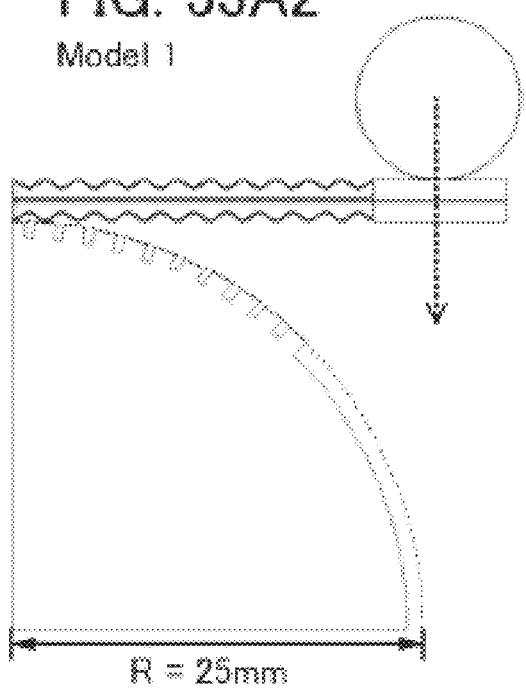
FIG. 33B1 Model 2
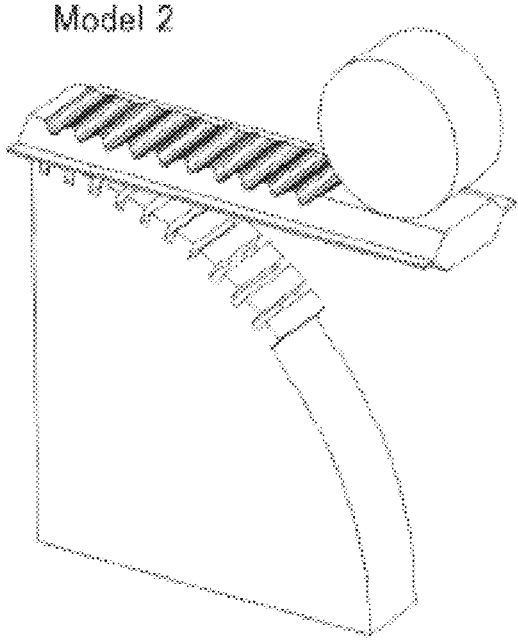
FIG. 33B2 Model 2
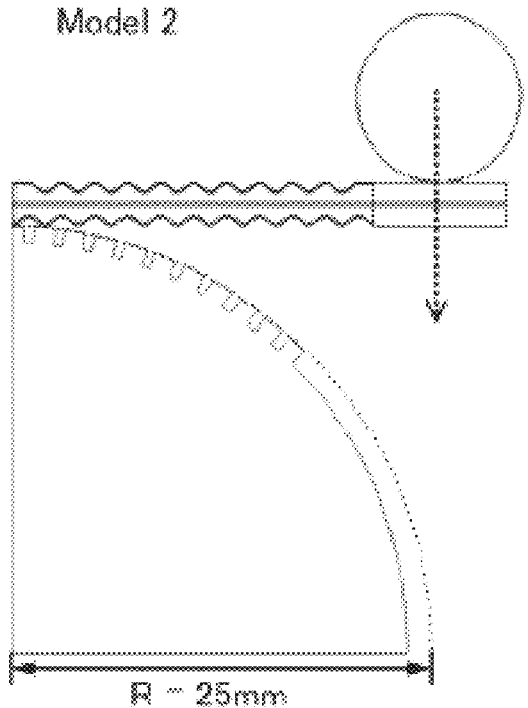

BATTERY AND METHOD FOR MANUFACTURING BATTERY

TECHNICAL FIELD

One embodiment of the present invention relates to a battery. Another embodiment of the present invention relates to a bendable battery. Another embodiment of the present invention relates to an exterior body of a battery.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

BACKGROUND ART

In recent years, portable information terminals typified by smartphones have been actively developed. Portable information terminals, which are a kind of electronic devices, are desired to be lightweight and compact for users. Wearable terminals that are used while being worn on users have also been developed.

Devices such as wearable devices and portable information terminals include secondary batteries that are capable of being repeatedly charged and discharged, in many cases. Such devices are required to be lightweight and compact and thus there is a problem in that the capacities of secondary batteries used therein are inevitably low, limiting the operation time of the devices. Secondary batteries used in such devices should be lightweight and compact and should be capable of being used for a long time.

Patent Document 1 discloses a highly flexible battery using a thin, pliant film-like material as an exterior body.

REFERENCE

Patent Document

[Patent Document 1] PCT International Publication No. 2012/140709

DISCLOSURE OF INVENTION

However, in the case where a flexible battery is fabricated using the technique disclosed in Patent Document 1, bending the battery might damage an exterior body thereof unless the thickness of the battery is small (e.g., 400 μm or smaller). Such a thin battery, however, does not have enough capacity.

An object of one embodiment of the present invention is to provide a battery that is capable of changing its form safely. Another object is to provide a bendable battery having a larger thickness. Another object is to provide a battery with increased capacity. Another object is to provide a highly reliable battery. Another object is to manufacture a battery at low cost.

Note that the description of these objects does not disturb the existence of other objects. One embodiment of the present invention does not necessarily achieve all the objects listed above. Other objects can be derived from the description of the specification and the like.

One embodiment of the present invention is a battery including a stack and an exterior body. The exterior body has a film-like form and is folded in half with the stack between facing portions of the exterior body. The exterior body includes a pair of first portions, a second portion, a pair of third portions, and a fourth portion. The pair of first portions overlaps with each other, and each of the first portions is surrounded by the second portion, the pair of third portions, and the fourth portion and includes a portion overlapping with the stack. The second portion is a folded portion located between the pair of first portions. The pair of third portions is belt-like portions located opposite to each other with each of the first portions therebetween and extending in a direction intersecting with the second portion. The fourth portion is a belt-like portion located opposite to the second portion with each of the first portions therebetween. The exterior body is bonded in the third portions and the fourth portion. In an area surrounded by the exterior body, the stack and the second portion are not in contact with each other but there is a space between the stack and the second portion.

It is preferred that in a plan view of the exterior body, each of the third portions in an extension direction thereof be longer than a total length of one of the first portions, the second portion, and the fourth portion in a direction parallel to the extension direction of the third portions.

It is preferred that each of the first portions have a wave shape in which a plurality of crest lines and a plurality of trough lines are parallel to each other and alternately located and that each of the third portions be flat.

It is preferred that each of the first portions include a region in which a length of wave period increases and a wave amplitude decreases as a distance from the second portion decreases.

It is preferred that the pair of first portions of the exterior body include a region in which the crest lines of one first portion do not overlap with the trough lines of the other first portion. It is particularly preferred that the pair of first portions include a region in which the crest lines thereof overlap with each other and the trough lines thereof overlap with each other.

It is preferred that the second portion not have a wave shape.

It is preferred that one of the crest lines be located between the second portion and the trough line of the first portion that is located closest to the second portion.

It is preferred that a distance between an end portion of the stack on the second portion side and an interior surface of the exterior body in an area surrounded by the exterior body of the battery in the state of being unbent be greater than or equal to $\pi \times t$ when a thickness of the stack is 2t.

Another embodiment of the present invention is a method for manufacturing a battery including a stack in an area surrounded by an exterior body. The method includes the following first to third steps. The first step is to prepare the exterior body in a film form processed to have a wave shape in which a plurality of crest lines and a plurality of trough lines parallel to each other are alternately located and the plurality of crest lines are located at regular intervals. The second step is to fold a part of the exterior body 180° in a direction perpendicular to the crest lines and the trough lines with the stack therebetween. The third step is to bond another part of the exterior body that is band-like, is located outward from the stack, and extends in a direction perpendicular to the crest lines and the trough lines. In the third step, bonding of the exterior body is performed such that a part thereof becomes flat and a distance between the plurality of crest lines increases as a distance from the folded portion of the exterior body decreases in a portion of the exterior body overlapping with the stack.

The method preferably includes a fourth step of processing the exterior body such that a band-like portion extending in a direction parallel to the crest lines and the trough lines of the exterior body becomes flat, after the first step and before the second step. It is preferred that in the second step, the portion of the exterior body that is processed to be flat be folded.

Tt is preferred that in the second step, the exterior body be folded such that the crest lines of one of portions of the exterior body that overlap with each other do not overlap with the trough lines of the other portion. It is particularly preferred that in the second step, the exterior body be folded such that the crest lines of one of the portions of the exterior body that overlap with each other overlap with the crest lines of the other portion and the trough lines of the one portion overlap with the trough lines of the other portion.

According to one embodiment of the present invention, a battery that is capable of changing its form safely can be provided. Alternatively, a bendable battery having a larger thickness can be provided. Alternatively, a battery with increased capacity can be provided.

Alternatively, a highly reliable battery can be provided. Alternatively, a battery can be manufactured at low cost.

Note that one embodiment of the present invention does not necessarily have all the effects listed above. Other effects can be derived from the description of the specification, the drawings, the claims, and the like.

BRIEF DESCRIPTION OF DRAWINGS

FIGS. 6A to 6F illustrate a method for manufacturing of a battery of an embodiment.

FIGS. 33A1 to 33B2 show calculation models of Example 7.

BEST MODE FOR CARRYING OUT THE INVENTION

Figure 1A:
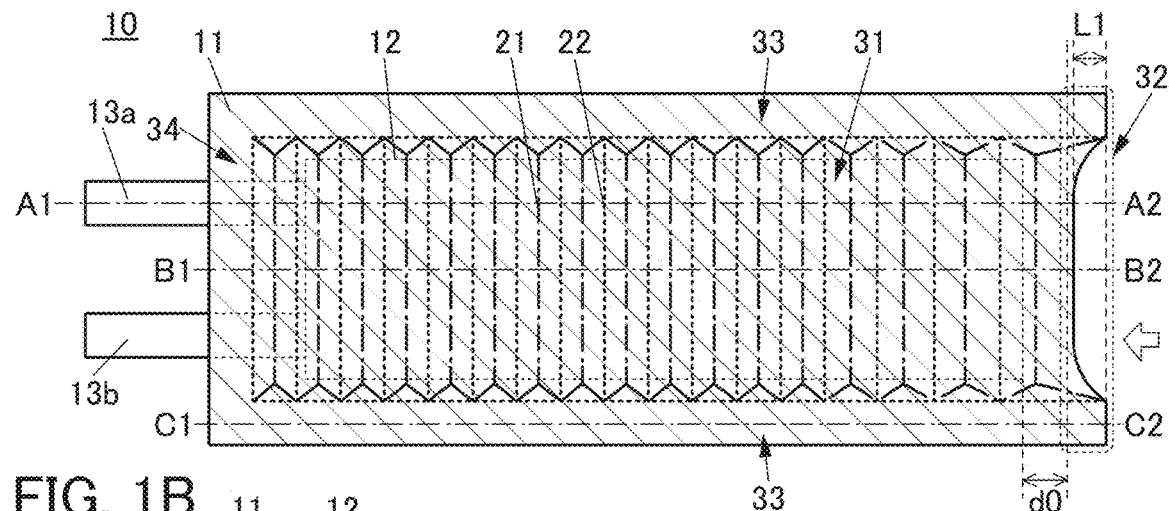
FIGS. 1A to 1E illustrate a structural example of a battery of an embodiment.

Embodiments and examples will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments and examples.

Note that in structures of the present invention described below, the same portions or portions having similar functions are denoted by the same reference numerals in different drawings, and the description thereof is not repeated. Note that the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the scale of each component is not necessarily limited to that in the drawings.

Note that in this specification and the like, ordinal numbers such as "first" and "second" are used in order to avoid confusion among components and do not limit the number.

Embodiment 1

In this embodiment, structural examples of batteries of embodiments of the present invention and examples of manufacturing methods thereof will be described.

One embodiment of the present invention is a bendable battery. For an exterior body of the battery, a film in the shape of a periodic wave in one direction is used. The use of the wave shape for the exterior body relieves stress when the exterior body is bent because the form of the exterior body changes such that the period and amplitude of the wave are changed, preventing the exterior body from being broken.

In an electrode stack included in a battery of one embodiment of the present invention, a portion to which a tab or the like is connected is fixed and the relative positions of electrodes are shifted in the other portion. When the exterior body of the battery is bent, the electrode stack can change its shape with the fixed point used as a support such that the relative positions of the electrodes are shifted.

One embodiment of the present invention further includes a space in an area surrounded by the exterior body and between an end portion of the electrode stack that is not fixed and an interior wall of the exterior body. The space allows the electrode stack to shift when the battery is bent, preventing the portion of the electrode stack and the interior wall of the exterior body from coming in contact with each other. One embodiment of the present invention can prevent the exterior body from being broken by the contact between the electrode stack and the exterior body accompanying the change in the form of the electrode stack, regardless of the thickness of the electrode stack For example, even in the case where the thickness of the battery is larger than 400 µm, larger than or equal to 500 µm, or larger than or equal to 1 mm, changing the form, such as bending, can be safely repeated. It is needless to say that one embodiment of the present invention can also be used for a very thin battery with a thickness of 1 µm to 400 µm inclusive.

There is no limitation on the thickness of the battery as long as it is determined in accordance with the capacity required for an electronic device provided with the battery, the shape of the device, and the like so that the thickness is suitable for a use. For example, the thickness is smaller than or equal to 10 mm, preferably smaller than or equal to 5 mm, more preferably smaller than or equal to 4 mm, still more preferably smaller than or equal to 3 mm.

To form a larger space between the interior wall of the exterior body and the electrode stack, the phases of waves of a pair of portions of the exterior body between which the electrode stack is sandwiched are preferably different from each other. Specifically, it is preferred that wave crest lines of one of the pair of portions between which the electrode stack is located not overlap with wave trough lines of the other portion. It is particularly preferred that the phases of the waves of the pair of portions of the exterior body between which the electrode stack is located be different from each other by 180° so that wave crest lines of the pair of portions of the exterior body overlap with each other and wave trough lines thereof overlap with each other. In that case, a space that ensures the largest distance between the electrode stack and the exterior body can be formed. In contrast, it is not preferred that the phases of the waves of the pair of portions be coordinate so that wave crest lines of one of the portions overlap with wave trough lines of the other portion. In that case, a space is formed to be distorted and the distance between the electrode stack and the exterior body is the shortest.

One embodiment of the present invention can be manufactured, for example, in such a manner that a film is folded in half in the direction parallel to wave crest lines and wave trough lines with an electrode stack therebetween and bonding is performed by application of pressure and heat such that at least two sides perpendicular to the folded portion become flat. Furthermore, it is preferred that the film be folded in half such that the phases of waves of opposite portions of the film are at least different from each other. It is particularly preferred that the film be folded such that the phases of the waves are different from each other by 180°.

Here, the phases of the waves of the pair of portions of the exterior body between which the electrode stack is sandwiched might be changed after the bonding. Even in that case, at least a region adjacent to the folded portion preferably includes a portion in which the phases of the waves of the pair of portions are different from each other, after the bonding.

The bonding makes the two sides of the film between which the electrode stack is located longer than the natural length of the two sides. This generates tensile force in the direction perpendicular to wave crest lines and wave trough lines in a portion overlapping with the electrode stack. Meanwhile, reaction in the direction opposite to that of the tensile force occurs in the portion overlapping with the electrode stack so that the wave shape is maintained. The reaction decreases as the distance from the folded portion decreases; thus, the exterior body changes its shape such that the wave thereof is stretched as the distance from the folded portion decreases. Specifically, the exterior body changes its shape such that the length of the wave period increases and the wave amplitude decreases as the distance from the folded portion decreases. Through such a mechanism, the bonding is performed such that a bonding portion becomes sufficiently flat, whereby a space can be formed between the folded portion and the electrode stack.

The shape of the wave of the film is important for formation of an enough space between the interior wall of the exterior body and the electrode stack. A larger space can be formed as the length of the wave period of the film decreases and the wave amplitude increases. For example, a film in the wave shape with the following length is preferably used: the length when the film is stretched is 1.02 times or more, preferably 1.05 times or more, more preferably 1.1 times or more, and twice or less the natural length of the film. Any of a variety of shapes such as a sine-wave shape, a triangular-wave shape, an arc shape, and a rectangular shape can be used as the wave shape as long as the wave shape has at least repeated crests and troughs in one direction. A large wave amplitude might increase the volume of the battery; thus, the length of the wave period is preferably set small so that the ratio of the length of the film when it is stretched to the natural length thereof is high.

Conditions for the bonding are also important for formation of an enough space. Insufficient bonding might result in a wavy shape of the bonding portion instead of a flat shape, failing to form an enough space. Moreover, insufficient bonding might form a gap in the bonding portion when the battery changes its form, because the bonding is performed with the phases of the waves different from each other. However, the use of an optimized bonding method can avoid such problems. Preferred conditions for the bonding depend on a material of the film, a material of an adhesive used for the bonding, and the like; for example, in the case where polypropylene is used for a heat-sealing layer, pressure that enables planarization of an embossed wave shape is applied at a temperature higher than or equal to the melting point of polypropylene. Furthermore, it is preferred that the bonding be performed by applying a high pressure to a portion of the bonding portion in the direction perpendicular to the embossed wave shape (side sealing portion) compared with a portion of the bonding portion in the direction parallel to the embossed wave shape (top sealing portion).

Since one embodiment of the present invention allows the shape of a secondary battery to be freely designed, when a secondary battery having a curved surface is used, for example, the design flexibility of the whole electronic device is increased, and electronic devices having a variety of designs can be provided. Furthermore, when the secondary battery is provided along the inner surface of an electronic device having a curved surface, a space in the electronic device can be effectively used with no waste.

Furthermore, one embodiment of the present invention can increase the capacity of a secondary battery; accordingly, an electronic device can be used for a long time with a low frequency of charge.

Thus, an electronic device having a novel structure can be provided.

Specific examples of structures and manufacturing methods will be described below with reference to drawings.

[Structural Example]

Figure 1B:
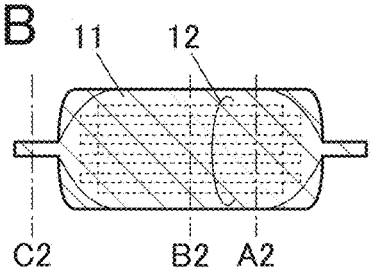
Figure 1C:
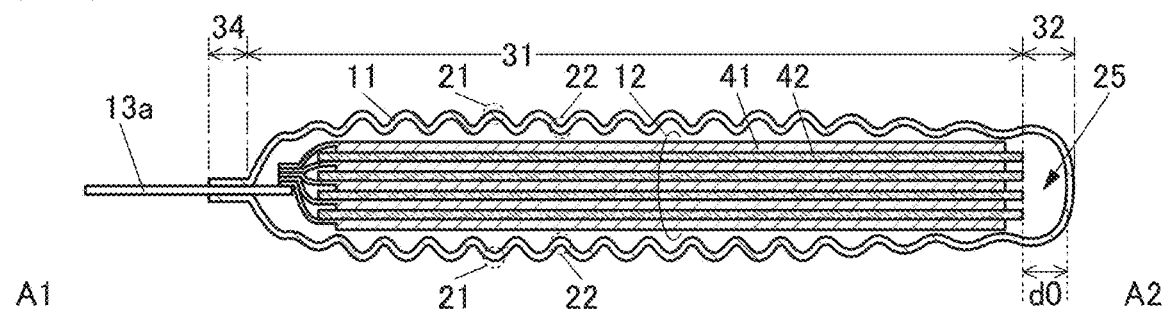
Figure 1D:
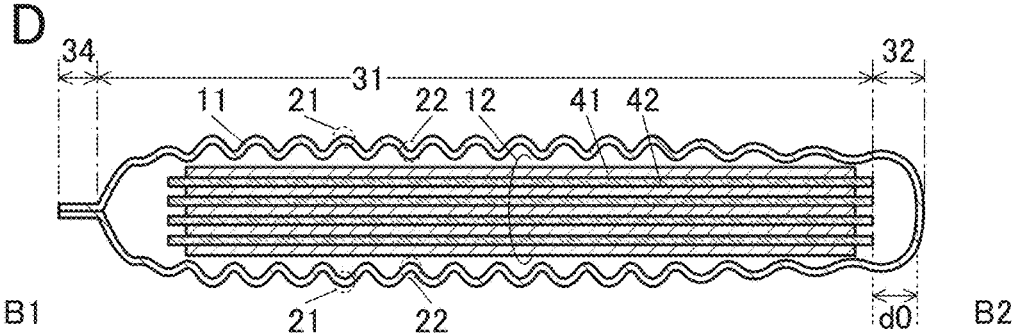
Figure 1E:
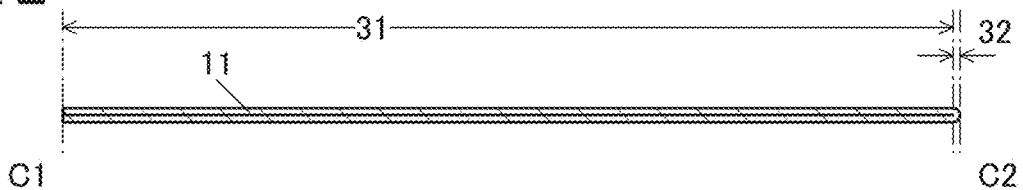

FIG. 1A is a plan view of a battery 10 described below as an example. FIG. 1B is a view of the battery 10 seen from the direction shown by a hollow arrow in FIG. 1A. FIGS. 1C, 1D, and 1E are schematic cross-sectional views taken along A1-A2, B1-B2, and C1-C2 in FIG. 1A, respectively.

The battery 10 includes an exterior body 11, a stack 12 located in an area surrounded by the exterior body 11, and electrodes 13a and 13b that are electrically connected to the stack 12 and extend to the outside of the exterior body 11. In the area surrounded by the exterior body 11, an electrolyte is provided in addition to the stack 12.

The exterior body 11 has a film-like form and is folded in half with the stack 12 between facing portions of the exterior body. The exterior body 11 includes a pair of portions 31 between which the stack 12 is located, a folded portion 32, a pair of bonding portions 33, and a bonding portion 34. The pair of bonding portions 33 is belt-like portions extending in the direction substantially perpendicular to the folded portion 32 and is located with a portion 31 therebetween. The bonding portion 34 is a belt-like portion located opposite to the folded portion 32 with the portion 31 therebetween. The portion 31 can also be referred to as a region surrounded by the folded portion 32, the pair of bonding portions 33, and the bonding portion 34. Here, the electrode 13a and the electrode 13b are partly sandwiched by the bonding portion 34 in FIG. 1A and the like.

At least a surface of the portion 31 of the exterior body 11 has a wave shape in which crests and troughs are repeated in the direction in which the pair of bonding portions 33 extends. In other words, the portion 31 has a wave shape in which crest lines 21 and trough lines 22 are alternately repeated. In FIG. 1A and the like, crests of the crest lines 21 are shown by dashed-dotted lines, and troughs of the trough lines 22 are shown by broken lines.

In the plan view, the length of each bonding portion 33 in the extension direction is longer than the total length of the bonding portion 34, the portion 31, and the folded portion 32 of the exterior body 11 in the direction parallel to the extension direction of the bonding portion 33. As illustrated in FIG. 1A, a portion of the folded portion 32 that is located closest to the bonding portion 34 is closer to the bonding portion 34 by a distance L1 from a line connecting end portions of the pair of bonding portion 33 on the folded portion 32 side.

The stack 12 at least has a structure where positive electrodes and negative electrodes are alternately stacked. The stack 12 can also be called an electrode stack. Furthermore, separators may be provided so as to separate the positive electrodes and the negative electrodes. Here, as the number of layers in the stack 12 increases, the capacity of the battery 10 increases. The details of the stack 12 will be described below.

Here, the thickness of the stack 12 is, for example, larger than or equal to 200 μm and smaller than or equal to 9 mm, preferably larger than or equal to 400 μm and smaller than or equal to 3 mm, more preferably larger than or equal to 500 μm and smaller than or equal to 2 mm, and is typically approximately 1.5 mm.

As illustrated in FIGS. 1A, 1, and 1D, in the area surrounded by the exterior body 11, a space (also referred to as a gap or a hollow) 25 is provided between an end portion of the stack 12 that is closest to the folded portion 32 and an interior surface of the exterior body 11 that is located in the folded portion 32. Here, the length of the space 25 in the direction parallel to the extending direction of the bonding portions 33 is represented by a distance d0. The distance d0 can also be referred to as the distance between the end portion of the stack 12 that is closest to the folded portion 32 and the interior surface of the exterior body 11 that is located in the folded portion 32.

The stack 12 is bonded to the electrode 13a (and the electrode 13b) extending inside and outside the area surrounded by the exterior body 11 through the bonding portion 34. Thus, it can also be said that the relative positions of the stack 12 and the exterior body 11 are fixed by the bonding portion 34. The electrode 13a is bonded to the plurality of positive electrodes or the plurality of negative electrodes in the stack 12, and the electrode 13b is connected to the plurality of positive electrodes or the plurality of negative electrodes to which the electrode 13a is not bonded.

Furthermore, as illustrated in FIGS. 1A, 1C, and 1D, it is preferred that the portion 31 of the exterior body 11 include a region in which the length of the wave period increases and the wave amplitude decreases as the distance from the folded portion 32 decreases. When the battery 10 is fabricated to have such a structure, the space 25 can be formed in the area surrounded by the exterior body 11.

As illustrated in FIGS. 1C and 1D, it is best the pair of portions 31 between which the stack 12 is located face each other such that the phases of the waves of the portions 31 are different from each other by 180°. In other words, it is preferred that the exterior body 11 be folded with the stack 12 therebetween such that the crest lines 21 overlap with each other and the trough lines 22 overlap with each other. In that case, the space 25 with a favorable shape can be provided.

[Space]

Next, the bent form of the battery 10 provided with the space 25 will be described.

Figure 2A:
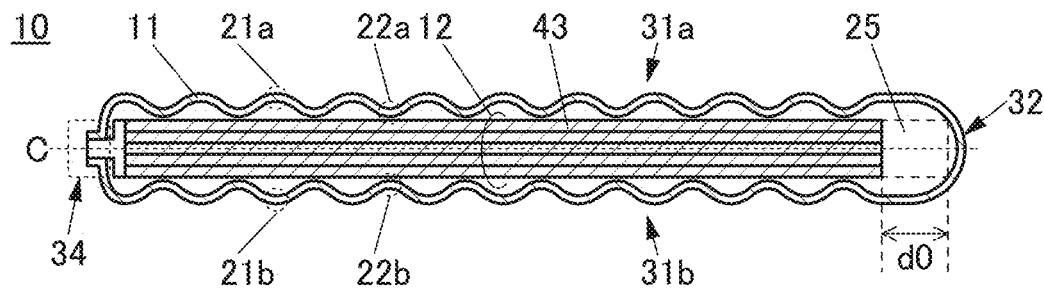
FIGS. 2A to 2C are structural examples and a model diagram of a battery in the state of being bent of an embodiment.

FIG. 2A is a simple schematic cross-sectional view of the structure of the battery 10 that is partly illustrated.

Here, the pair of portions 31 of the exterior body 11 is distinguished from each other and shown as a portion 31a and a portion 31b. Similarly, respective crest lines and respective trough lines of the portion 31a and the portion 31b are shown as a crest line 21a and a crest line 21b, and a trough line 22a and a trough line 22b.

In FIG. 2A, the stack 12 has a structure in which five electrodes 43 are stacked. The electrode 43 corresponds to the electrode 41 or the electrode 42 in FIG. 1A. The relative positions of the plurality of electrodes 43 are fixed at an end portion on the bonding portion 34 side. The relative positions of the stack 12 and the exterior body 11 are fixed by the bonding portion 34.

In the area surrounded by the exterior body 11, the space 25 is provided in the vicinity of the folded portion 32. Here, the distance between the interior wall of the exterior body 11 and the end portion of the electrode 43 on the folded portion 32 side when the exterior body 11 is not bent is assumed to be the distance d0.

The neutral plane of the battery 10 is referred to as a neutral plane C. Here, the neutral plane C corresponds to the neutral plane of the electrode 43 that is located in the middle of the five electrodes 43 included in the stack 12.

Figure 2B:
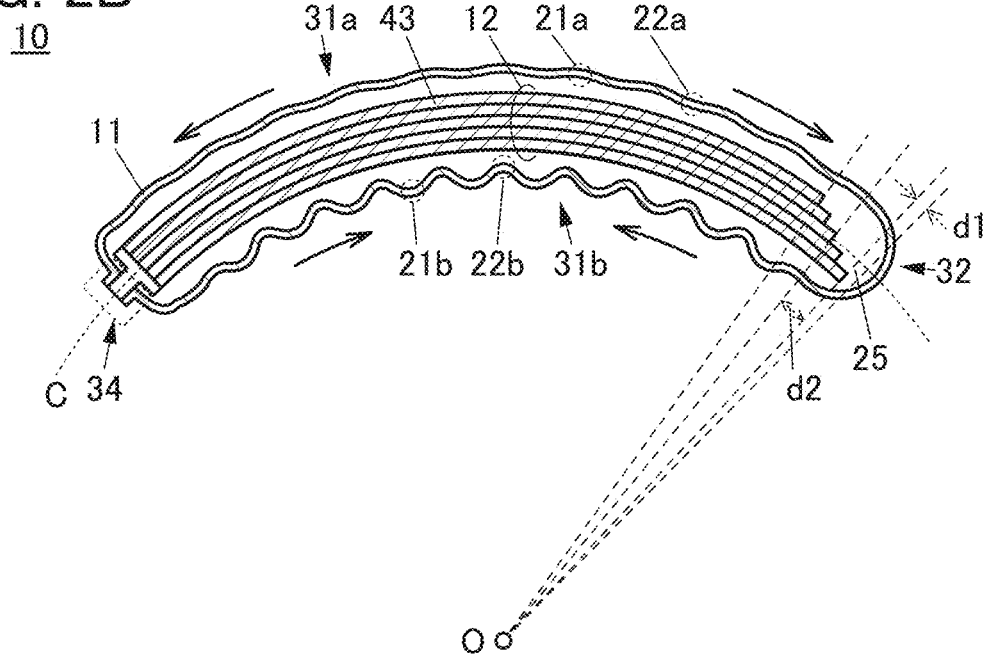

FIG. 2B is a schematic cross-sectional view of the battery 10 in the state of being bent with a point O at the center to have an arc shape. Here, the battery 10 is bent such that the portion 31a faces outward and the portion 31b faces inward.

As illustrated in FIG. 2B, the portion 31a that faces outward changes its form such that the wave amplitude becomes smaller and the length of the wave period becomes larger. In other words, the distance between the crest lines 21a and the distance between the trough lines 22a of the portion 31a that faces outward increase. In contrast, the portion 31b that faces inward changes its form such that the wave amplitude becomes larger and the length of the wave period becomes smaller. In other words, the distance between the crest lines 21b and the distance between the trough lines 22b of the portion 31b that faces inward and is in the state of being bent decrease. In such a manner, the portion 31a and the portion 31b change their forms, whereby stress applied to the exterior body 11 is relieved, and the battery 10 can be bent without any damage to the exterior body 11.

As illustrated in FIG. 2B, the stack 12 changes its form such that the relative positions of the plurality of electrodes 43 are shifted. This relieves stress applied to the stack 12, allowing the battery 10 to be bent without any damage to the stack 12. It is assumed in FIG. 2B that the electrodes 43 do not stretch due to a bend. When the thickness of the electrode 43 is set sufficiently small with respect to the curvature radius with which the battery 10 is bent, less stress is applied to the electrodes 43 themselves.

The end portions of the electrodes 43 included in the stack 12 that are located outward from the neutral plane C shift to the bonding portion 34 side.

In contrast, the end portions of the electrodes 43 located inward from the neutral plane C shift to the folded portion 32 side. Here, the distance between the interior wall of the exterior body 11 and the end portion of the innermost electrode 43 on the folded portion 32 side decreases from the distance d0 to a distance d1. Here, the amount of relative deviation between the electrode 43 located on the neutral plane C and the innermost electrode 43 is assumed to be a distance d2. The distance d1 corresponds to a value obtained by subtracting the distance d2 from the distance d0.

In the case where the distance d0 before bending is smaller than the distance d2 after bending, the electrodes 43 of the stack 12 that are located inward from the neutral plane C come in contact with the interior wall of the exterior body 11 Thus, a required value of the distance d0 will be described below.

Figure 2C:
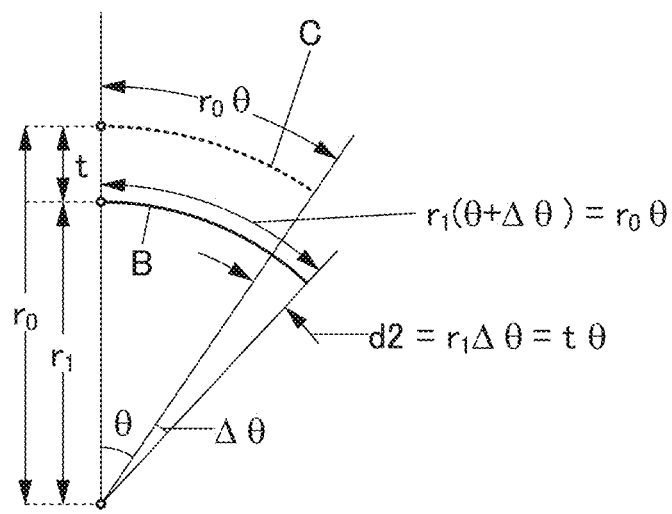

Description will be given below with reference to FIG. 2C. In FIG. 2C, a curve corresponding to the neutral plane C is shown by a dashed line, and a curve corresponding to the innermost surface of the stack 12 is shown as a curve B by a solid line.

A curve C is the arc of a radius $r_0$, and a curve B is the arc of a radius $r_1$. The difference between the radius $r_0$ and the radius $r_1$ is assumed to be t. Here, t corresponds to half of the thickness of the stack 12. The arc lengths of the curve C and the curve B are equal to each other. The central angle of the curve C is assumed to be θ, and the central angle of the curve B is assumed to be θ+Δθ.

The distance d2, which is the amount of difference between the edge of the curve C and that of the curve B, is calculated from the above relation as follows.

$$d2 = r_1 \times \Delta\theta \qquad \text{[Formula 1]}$$
$$= t \times \theta$$

This indicates that the distance d2 can be estimated from the thickness of the stack 12 and the bending angle and does not depend on the length of the stack 12 and the bending curvature radius, for example.

Setting the distance d0 of the space 25 larger than or equal to the distance d2 as described above can prevent the stack 12 and the exterior body 11 from coming in contact with each other when the battery 10 is bent. Thus, in the case where the battery 10 with a thickness of 2t is used while being bent and the maximum angle at which the battery 10 is bent is θ°, the distance d0 between the stack 12 and the interior wall of the exterior body 11 in the space 25 is set to a value greater than or equal to t×θ.

For example, when the battery is used while being bent at 30°, the distance d0 of the space 25 is set to a value greater than or equal to πt/6. Similarly, when the battery is used while being bent at 60°, the distance d0 is set to a value greater than or equal to πt/3; when the battery is used while being bent at 90°, the distance d0 is set to a value greater than or equal to πt/2; and when the battery is used while being bent at 180°, the distance d0 is set to a value greater than or equal to πt.

For example, in the case where the battery 10 is not used in the state of being wound, for example, the maximum bending angle of the battery 10 is estimated to be 180° Thus, when the battery 10 is used in such a manner, the distance d0 is set to a value larger than or equal to πt, preferably larger than πt, whereby the battery 10 can be used for all devices. The battery 10 can be provided in a variety of electronic devices in which the battery 10 is used in the state of being bent to have a V shape or a U shape, for example, the battery 10 is used in the state of being folded in half.

In the case where the battery 10 is wound so as to circle around a cylindrical object once, the distance d0 of the space 25 is set to a value larger than or equal to 2πt so that the battery 10 can be bent at 360°, In the case where the battery 10 is wound so as to circle around a cylindrical object more than once, the distance d0 of the space 25 is set to an appropriate value accordingly. In the case where the battery 10 is changed in form to have a bellows shape, the distance d0 of the space 25 is set to an appropriate value depending on the direction, the angle, and the number of bending portions of the battery 10.

The above is the description of the space 25.

[Manufacturing Method Example]

An example of a method for manufacturing the battery 10 will be described below.

First, a flexible film to be the exterior body 11 is prepared.

For the film, a material with high water resistance and high gas resistance is preferably used. As the film used as the exterior body, a layered film in which a metal film and an insulator film are stacked is preferably used. The metal film can be formed using any of the metals that can have the form of a metallic foil, such as aluminum, stainless steel, nickel steel, gold, silver, copper, titanium, chromium, iron, tin, tantalum, niobium, molybdenum, zirconium, and zinc, or an alloy thereof. As the insulator film, a single-layer film selected from a plastic film made of an organic material, a hybrid material film containing an organic material (e.g., an organic resin or fiber) and an inorganic material (e.g., ceramics), and a carbon-containing inorganic film (e.g., a carbon film or a graphite film), or a layered film including two or more of the above films can be used. A metal film is easy to be embossed. Forming projections by embossing increases the surface area of the metal film exposed to outside air, achieving efficient heat dissipation.

Then, the flexible film is processed by, for example, embossing to form the exterior body 11 having a wave shape.

The projections and depressions of the film can be formed by pressing (e.g., embossing) The projections and depressions formed on the film by embossing form an enclosed space whose inner volume is variable, which is sealed by the film serving as a part of a wall of the sealing structure. This enclosed space can be said to be formed because the film has an accordion structure or a bellows structure. The sealing structure using the film can prevent entry of water and dust. Note that embossing, which is a kind of pressing, is not necessarily employed and a method that allows formation of a relief on part of the film can be employed. A combination of methods, for example, embossing and any other pressing, may be performed on one film. Alternatively, embossing may be performed on one film more than once.

The projections of the film can have a hollow semicircular shape, a hollow semi-oval shape, a hollow polygonal shape, or a hollow irregular shape. In the case of a hollow polygonal shape, it is preferable that the polygon have more than three corners, in which case stress concentration at the corners can be reduced.

Figure 3A:
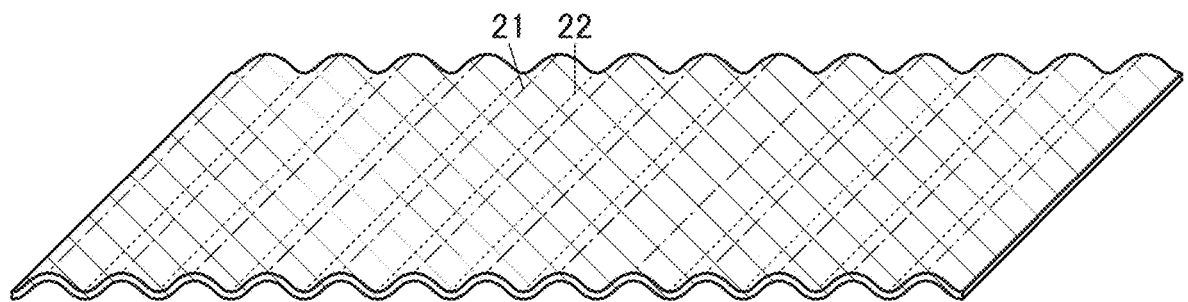
FIGS. 3A and 3B illustrate a method for manufacturing a battery of an embodiment.

FIG. 3A is an example of a schematic perspective view of the exterior body 11 formed in such a manner. The exterior body 11 has a wave shape in which the plurality of crest lines 21 and the plurality of trough lines 22 are alternately arranged on its surface which is the outer side of the battery 10. Here, the crest lines 21 adjacent to each other and the trough lines 22 adjacent to each other are preferably arranged at regular intervals.

Figure 3B:
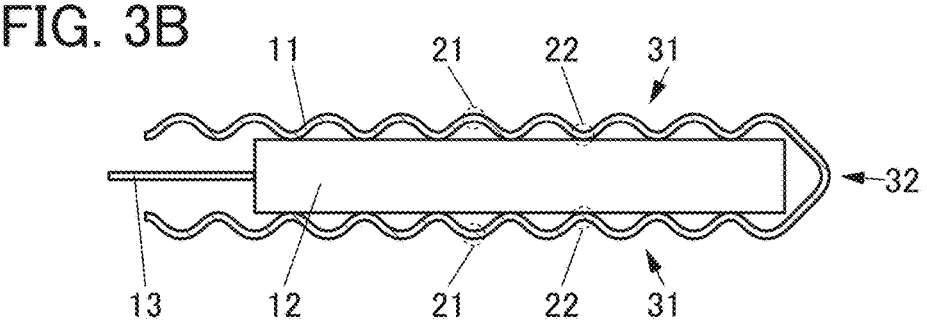

Subsequently, the exterior body 11 is partly folded such that the stack 12 prepared in advance is sandwiched (FIG. 3B). At this time, the length of the exterior body 11 is preferably adjusted such that an electrode 13 (the electrode 13a or the electrode 13b) connected to the stack 12 is exposed to the outside. Furthermore, the width of portions of the exterior body 11 that protrudes beyond the stack 12 is set sufficiently long in consideration of the thickness of the stack 12 because the protruding portions serve as the bonding portion 33 and the bonding portion 34 later.

FIG. 3B illustrates an example of the case where the pair of portions 31 between which the stack 12 is positioned are located such that the phases of the waves of the portions 31 are different from each other by 180°. In other words, FIG. 3B illustrates the case where the exterior body 11 is folded such that the crest lines 21 overlap with each other and the trough lines 22 overlap with each other in the pair of portions 31.

Figure 4A:
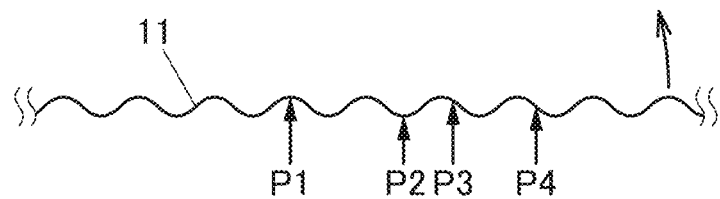
FIGS. 4A to 4E illustrate a method for manufacturing a battery of an embodiment.

Here, the position and the shape of the folded portion 32 of the exterior body 11 will be described. FIG. 4A is a schematic cross-sectional view of the exterior body 11. FIGS. 4B to 4E each illustrate a cross-sectional shape of the folded portion 32 when the folding position is a point P1, P2, P3, or P4 in FIG. 4A. Note that the case where the exterior body 11 is folded in the direction shown by an arrow in FIG. 4A will be described below, and the surface facing downward corresponds to the outer surface of the battery 10. In FIG. 4A, a portion protruding upward is shown as the trough line 22 and a portion protruding downward is shown as the crest line 21.

In FIGS. 4B to 4E, a region partly surrounded by the folded portion 32 is hatched. Here, a region sandwiched between two positions at which the wave periodicity of the exterior body 11 is lost, as boundaries, is the folded portion 32. Note that in FIGS. 4B to 4E, the shape of the folded portion 32 is exaggerated; thus, its perimeter is not shown correctly in some cases.

Figure 4B:
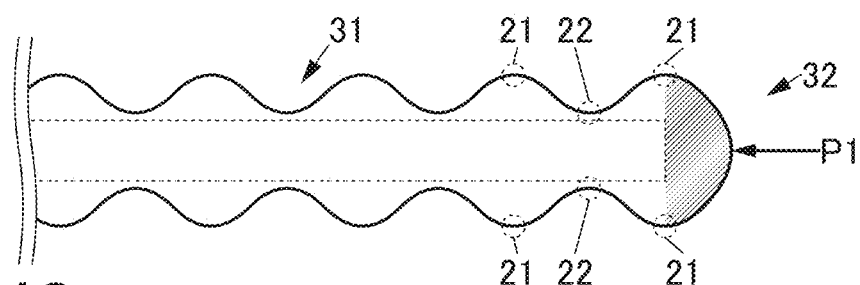

The point P1 coincides with the trough line 22. As illustrated in FIG. 4B, the exterior body 11 is folded at the point P1, whereby the folded portion 32 can have a substantially arc shape. In addition, folding the exterior body 11 at the point P2 allows the phases of the opposite waves to be different from each other by 180°.

Figure 4C:
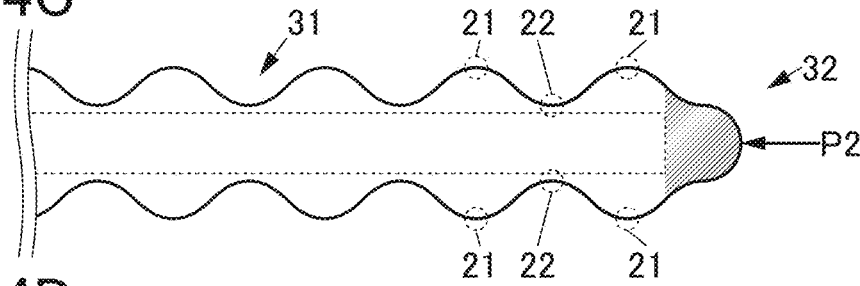

The point P2 coincides with the crest line 21. As illustrated in FIG. 4C, also when the exterior body 11 is folded at the point P2, the folded portion 32 can have a substantially arc shape. In addition, folding the exterior body 11 at the point P2 allows the phases of the opposite waves to be different from each other by 180°.

Figure 4D:
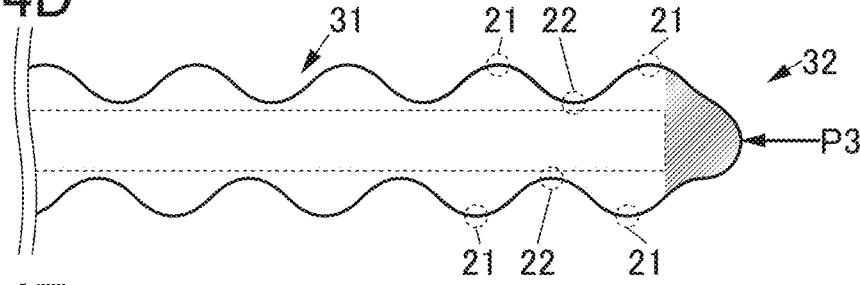

The point P3 is a point located between the crest line 21 and the trough line 22 and closer to the crest line 21 than to the midpoint of the crest line 21 and the trough line 22. As illustrated in FIG. 4D, the point P3 coincides with neither the crest line 21 nor the trough line 22, whereby the shape of the folded portion 32 is distorted instead of being vertically symmetrical. In addition, when the exterior body 11 is folded at the point P3, coincidence of the crest lines, the trough lines, and the crest line and the trough line of the opposite waves can be avoided.

Figure 4E:
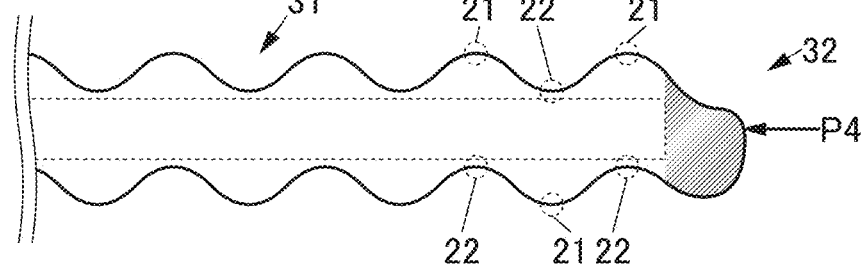

The point P4 coincides with the midpoint of the crest line 21 and the trough line 22. As illustrated in FIG. 4E, in the case where the exterior body 11 is folded at the point P4, the shape of the folded portion 32 is significantly distorted. Specifically, the folded portion 32 is more likely to protrude upward or downward. Therefore, it is difficult to ensure a large distance between the stack 12 and the interior wall of the exterior body 11 on the side opposite to the protruding portion.

Here, FIGS. 4B to 4D are the same in that one crest line 21 is located between the folded portion 32 and the trough line 22 of the portion 31 that is closest to the folded portion 32. In particular, FIG. 4B illustrates an example of the case where boundaries of the folded portion 32 coincide with the crest lines 21 of the waves. The exterior body 11 is folded with the crest lines 21 of the two waves or the vicinities thereof regarded as boundaries in this manner, whereby a space that is large in the thickness direction can be ensured on the inner side of the folded portion 32 and the vicinity thereof. As described above, it is important to keep a distance between the interior wall of the exterior body 11 and the outermost electrode of the stack when the battery 10 is folded, and the shape illustrated in FIG. 4B allows the distance to be large.

In contrast, in FIG. 4E, there is no crest line 21 between the folded portion 32 and the trough line 22 of the portion 31 that is closest to the folded portion 32, on the lower surface side. Thus, a space that is large in the thickness direction is unlikely to be formed at the folded portion 32 and the vicinity thereof.

Figure 5A:
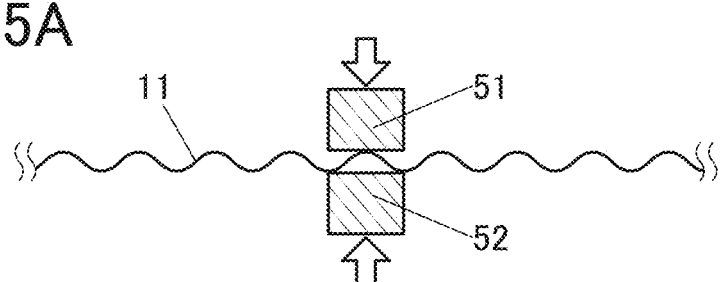
FIGS. 5A to 5E illustrate a method for manufacturing of a battery of an embodiment.

Here, a portion of the exterior body 11 that is to be the folded portion 32 preferably has a flat shape instead of a wave shape. For example, as illustrated in FIG. 5A, the exterior body 11 is partly planarized by being sandwiched by molds 51 and 52 each with a flat surface and pressurized or by being pressurized while being heated.

Figure 5B:
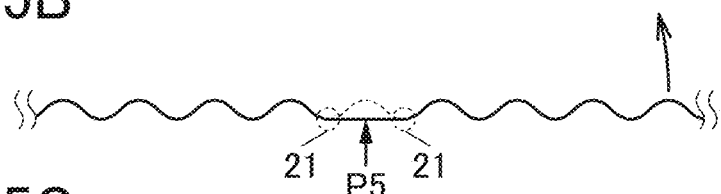

FIG. 5B is a schematic cross-sectional view of the exterior body 11 partly planarized in this manner. Here, the exterior body 11 is partly planarized such that the crest lines 21 are connected.

Figure 5C:
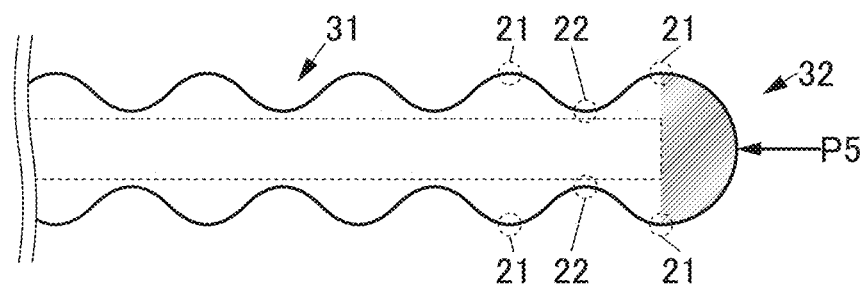

FIG. 5C is a schematic cross-sectional view of the exterior body 11 folded at a point P5 at the center of the formed flat portion. As illustrated in FIG. 5C, when the planarized exterior body 11 is used for the folded portion 32, a space larger than that in FIG. 4B can be formed.

Figure 5D:
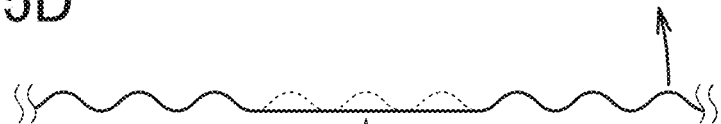
Figure 5E:
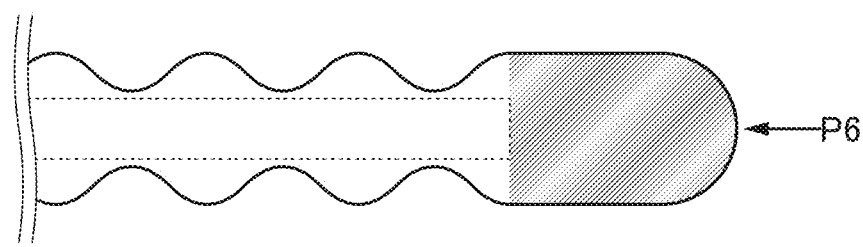

FIGS. 5D and 5E each illustrate an example of the case where planarization is performed in a region larger than that in FIG. 5C. As in FIG. 513, the exterior body 11 is partly planarized such that the crest lines 21 are connected The exterior body 11 is planarized in a region larger than the thickness of the stack 12 in such a manner, whereby a large space that is uniform in the thickness direction can be formed.

The above is the description of the relation between the position and the shape of the folded portion.

The exterior body 11 is folded such that the stack 12 is sandwiched, in the above manner, and then, portions of the exterior body 11 that are to be the bonding portions 33 are bonded by being pressurized while being heated.

As illustrated in FIG. 6A, pressure bonding can be performed in such a manner that the exterior body 11 is sandwiched by a pair of molds 53 and 54 each with a flat surface. Then, pressure bonding is performed in the direction perpendicular to the surfaces of the molds 53 and 54, whereby the portions of the exterior body 11 that are to be the bonding portions 33 are bonded so as to be flat as illustrated in FIG. 6B. At this time, clearance is preferably provided to keep a certain distance between the molds 53 and 54. In that case, for example, the following problem can be avoided: the thickness of the bonding portion is reduced by more than a certain value, so that a conductive material (e.g., aluminum foil) contained in the film is exposed, leading to loss or a decrease of the insulating property.

Pressure bonding is preferably performed at a pressure higher than that for subsequent formation of the bonding portion 34, for example, so that the bonding portions 33 become sufficiently flat. The pressure depends on a material and the thickness of the exterior body; for example, in the case where a film with a thickness of approximately 110 μm, the pressure for pressure bonding is higher than or equal to 100 kPa/cm$^2$ and lower than or equal to 1000 kPa/cm$^2$, and can typically be approximately 600 kPa/cm. In addition, in pressure bonding, any temperature is acceptable as long as it is higher than or equal to the melting point of a material used as a fusing layer; for example, in the case where polypropylene is used, the temperature is preferably approximately 175° C.

Furthermore, the thickness of each of the bonding portions 33 after pressure bonding is preferably smaller than the total thickness of two exterior bodies 11 before pressure bonding. For example, in the case where a layered film including a fusing layer is used as the exterior body, the thickness of the fusing layer of the bonding portion 33 after pressure bonding is preferably 30% or more and 95% or less, more preferably 50% or more and 90% or less, still more preferably 60% or more and 80% or less of the total thickness of two fusing layers of portions of the exterior body 11 that is not subjected to pressure bonding (e.g., the portion 31 and the folded portion 32 of the battery 10).

When the bonding portion 33 is formed under the above conditions, even repeated changes in the form of the battery 10, such as bends, do not break sealing, and leakage of an electrolytic solution and the like with which the area surrounded by the exterior body 11 is filled can be prevented. This allows the battery 10 to have extremely high reliability and safety. In particular, the bonding portion 33 can be formed in which a gap is not formed because of a change in the form of the battery 10 even in the case where the phases of the waves of facing portions of the exterior body 11 are different from each other by 180° as illustrated in FIG. 6A.

In FIG. 6C, force applied to each portion of the exterior body 11 in bonding is schematically shown by arrows. Here, greater force is shown by longer arrows.

Part of the exterior body 11 having a wave shape before bonding is stretched in the drawing direction (shown by thick arrows) due to its planarization by bonding. The stretch generates tensile force to the folded portion 32 side in the portion 31 of the exterior body 11. This force increases as the distance from the bonding portion 33 decreases, and decreases as the distance from the bonding portion 33 increases.

On the other hand, since the portion 31 has a wave shape, reaction occurs in the direction opposite to that of the force described above. This reaction increases as the distance from the folded portion 32 increases, and decreases as the distance from the folded portion 32 decreases.

Application of the above two kinds of force to the portion 31 and the folded portion 32 stretches the portion 31 such that the wave period gradually increases as the distance from the folded portion 32 decreases, as illustrated in FIG. 6D. The stretch amount increases as the distance from the bonding portion 33 decreases, and decreases as the distance from the bonding portion 33 increases; thus, a center portion of the folded portion 32 is depressed to the portion 31 side.

FIGS. 6E and 6F are schematic cross-sectional views before and after formation of the bonding portions 33. Even in the case where the stack 12 is in contact with the interior wall of the exterior body 11 before bonding as illustrated in FIG. 6E, a stretch of the portion 31 of the exterior body 11 in formation of the bonding portions 33 enables the space 25 to be formed as illustrated in FIG. 6F.

The bonding portions 33 are formed to be flat in the aforementioned manner, whereby the space 25 can be formed between the folded portion 32 and the stack 12.

Subsequently, an electrolytic solution is introduced from a portion to be the bonding portion 34. Under reduced pressure or in an inert gas atmosphere, a desired amount of electrolytic solution is dripped into the area surrounded by the exterior body 11 in the form of a bag.

After that, a portion to be the bonding portion 34 is bonded by a method similar to the above method, so that the bonding portion 34 is formed. In forming the bonding portion 34, an insulating sealing layer may be provided between the exterior body 11 and the electrodes 13$a$ and 13$b$. The sealing layer melts at the time of pressure bonding, whereby the electrodes 13$a$ and 13$b$ and the film-like exterior body 11 are fixed.

The battery 10 illustrated in FIG. 1A and the like can be manufactured in the aforementioned manner.

The above is the description of the battery manufacturing method example.

[Battery Shape]

As described above, the space 25 can be formed due to a stretch of part of the exterior body 11 in formation of the bonding portions 33. That is to say, the distance d0 between the stack 12 and the exterior body 11 in the space 25 changes in accordance with the stretch amount of the exterior body 11 in the bonding portion 33. To increase the distance d0, a film with the above ratio of the length of the film with a wave form that is stretched to the natural length of the film is preferably used as the exterior body 11.

Furthermore, in the portion 31, as the distance from the bonding portion 33 increases, the stretch amount decreases, and thus, the distance d0 decreases. In contrast, as the stretch amount of the bonding portion 33 increases, tensile force of the portion 31 increases; accordingly, the distance d0 can be increased even in the position apart from the bonding portion 33. Here, in the case where the same film is used, the stretch amount of the bonding portion 33 increases in proportion to the length of the bonding portion 33 in the drawing direction.

Figure 7:
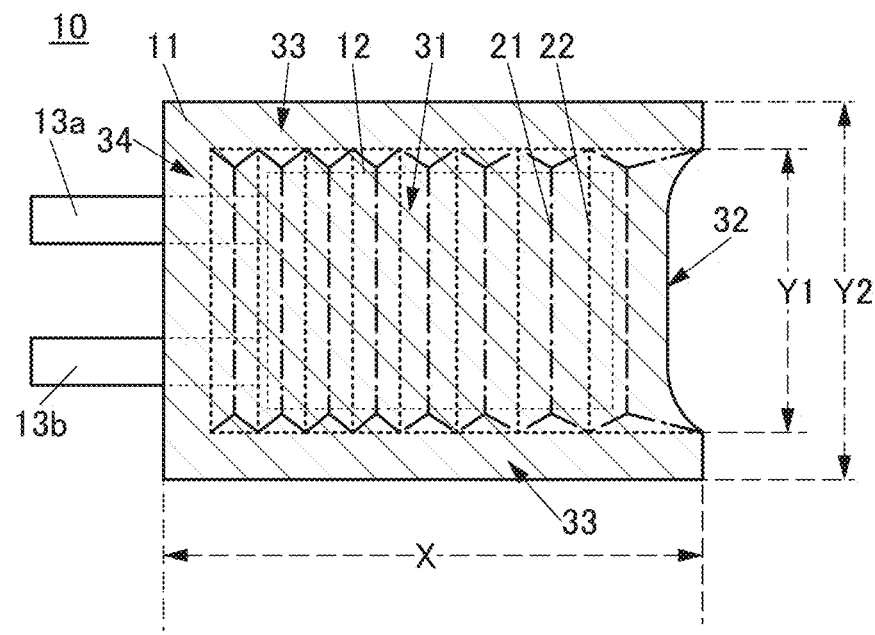
FIG. 7 illustrates a structural example of a battery of an embodiment.

FIG. 7 is a schematic top view of the battery 10 with an aspect ratio different from that in FIGS. 1A to 1E. The battery 10 is preferably designed such that the ratio of X to Y1 (X/Y1) is higher than or equal to 1, where the length of the bonding portion 33 in the drawing direction is X and the distance between the pair of bonding portions 33 (that is, the width of the portion 31) is Y1. For example, the ratio of X to Y1 (X/Y1) is higher than or equal to 1.2, higher than or equal to 1.5, higher than or equal to 1.7, higher than or equal to 2, or higher than or equal to 3. Although there is no upper limit on the ratio of X to Y1, the ratio is preferably, for example, lower than 100 or lower than 50 in consideration of productivity.

The ratio of X to Y2 (X/Y2) is preferably, for example, 4/3 or 16/9 assuming that the width of the battery 10 including the widths of the bonding portions 33 is Y2, in which case an electronic device provided with the battery 10 can be easily designed and the battery 10 is more widely used. In the case where the battery 10 is provided in a narrow object such as a watch band, the ratio of X to Y2 (X/Y2) can be, for example, higher than or equal to 1.5, higher than or equal to 2, or higher than or equal to 3.

The above is the description of the battery shape.

[Film Processing Method]

Next, a film processing method that can be used for the exterior body 11 will be described.

First, a sheet made of a flexible material is prepared. As the sheet, a stacked body, a metal film provided with a heat-seal layer or sandwiched between heat-seal layers is used. As the heat-seal layer, a heat-seal resin film containing, e.g., polypropylene or polyethylene is used In this embodiment, a metal sheet, specifically, aluminum foil whose top surface is provided with a nylon resin and whose bottom surface is provided with a stack of an acid-proof polypropylene film and a polypropylene film is used as the sheet. The sheet is cut to obtain a film with a desired size.

Then, the film is embossed, so that the film with unevenness can be obtained. The film includes a plurality of projections and depressions, thereby having a wave pattern that can be visually recognized. Although an example where the sheet is cut and then embossing is performed is described here, the order is not particularly limited; embossing may be performed before cutting the sheet and then the sheet may be cut. Alternatively, the sheet may be cut after thermocompression bonding is performed with the sheet folded.

Embossing, which is a kind of pressing, will be described below.

Figure 8:
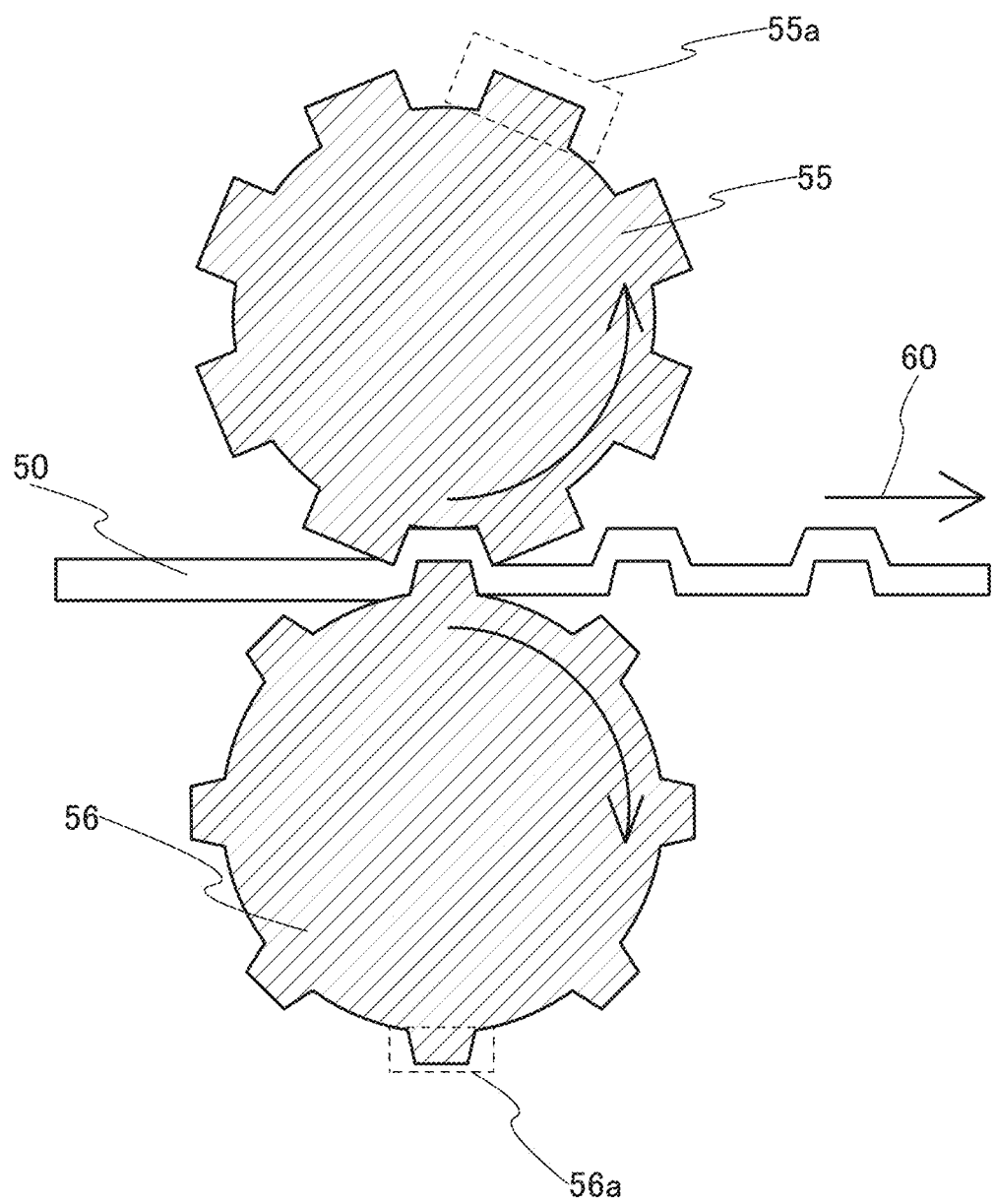
FIG. 8 illustrates a method for processing a film of an embodiment.

FIG. 8 is a cross-sectional view illustrating an example of embossing. Note that embossing refers to processing for forming unevenness on a film by bringing an embossing roll whose surface has unevenness into contact with the film with pressure. Note that the embossing roll is a roll whose surface is patterned.

FIG. 8 illustrates an example where both surfaces of a film are embossed, and shows a method for forming a film having projections whose top portions are on one surface.

FIG. 8 illustrates the state where a film 50 is sandwiched between an embossing roll 55 in contact with the one surface of the film and an embossing roll 56 in contact with the other surface and the film 50 is being transferred in a direction 60. The surface of the film is patterned by pressure or heat. The surface of the film may be patterned by pressure and heat.

The embossing rolls can be formed of metal rolls, ceramic rolls, plastic rolls, rubber rolls, organic resin rolls, lumber rolls, or the like, as appropriate.

In FIG. 8, embossing is performed using the male embossing roll 56 and the female embossing roll 55. The male embossing roll 56 has a plurality of projections 56a. The projections correspond to projections formed on a film to be processed. The female embossing roll 55 has a plurality of projections 55a. Between adjacent projections 55a, a depression is positioned into which a projection formed on the film by the projection 56a of the male embossing roll 56 fits.

Successive embossing by which the film 50 partly stands out and debossing by which the film 50 is partly indented can form a projection and a flat portion successively. In this manner, a pattern can be formed on the film 50.

Figure 9A:
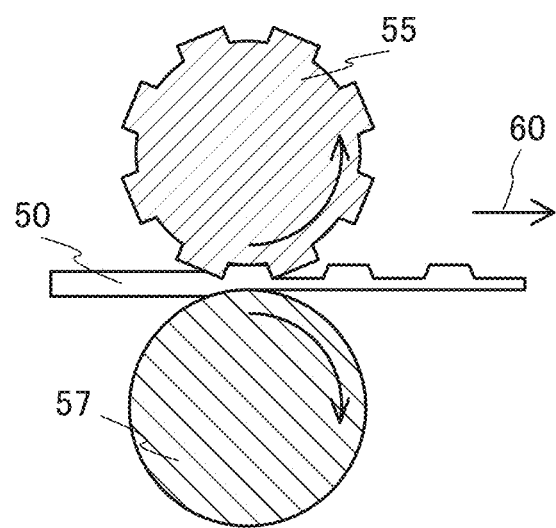
FIGS. 9A to 9C illustrate a method for processing a film of an embodiment.
Figure 9B:
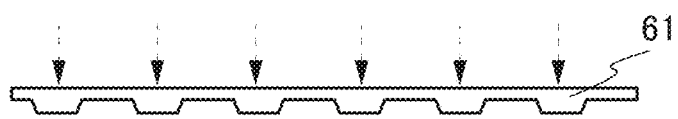
Figure 9C:

Next, a method for forming a film having a plurality of projections, which is a method different from that described with reference to FIG. 8, will be described with reference to FIGS. 9A to 9C, FIGS. 9A to 9C illustrate an example where one surface of a film is embossed, and show a method for forming a film having projections whose top portions are on one surface.

FIG. 9A illustrates the state where the film 50 is sandwiched between the embossing roll 55 in contact with one surface of the film and a roll 57 in contact with the other surface and the film 50 is being transferred in the direction 60. Note that a roll 57 may be fixed without rotating. Since the embossing roll 55 is provided only on one surface of the film here, a plurality of projections formed on the film have no space. This means that the film has protrusions on one surface and is flat on the other surface.

Then, as illustrated in FIG. 98, a film 61 in which projections are formed on one surface by embossing is partly removed. Here, the film is partly removed from a flat surface, that is, the surface that was in contact with the roll 57, of the projections. As a method for removing part of the film, thermal removal by laser irradiation, chemical removal by dropping an etchant, physical removal using a tool, or the like can be given.

As a result, spaces 64 can be formed in the projections 63 as illustrated in FIG. 9C. In this manner, a film 62 having the projections 63 can be formed.

Note that in the method of forming a film illustrated in FIGS. 9A to 9C, a metal film is preferably used as the film 50. In addition, a heat-seal layer is preferably provided on one or both surfaces of the metal film after the process illustrated in FIGS. 9A to 9C.

Since processing is performed using the embossing rolls in the aforementioned manner, a processing apparatus can be small. Furthermore, a film before being cut can be processed, achieving excellent productivity. Note that a method for processing a film is not limited to processing using embossing rolls; a film can be processed by pressing a pair of embossing plates having a surface with unevenness against the film. In that case, one of the embossing plates may be flat and the film may be processed in a plurality of steps.

[Secondary Battery Manufacturing Method Example]

An example of a manufacturing method particularly when a secondary battery is used as the battery 10 will be described below. Note that the description of points already described above is omitted in some cases.

Here, the film-like exterior body 11 having a wave shape is folded in half so that two end portions overlap with each other, and three sides are sealed using an adhesive layer.

Figure 10A:
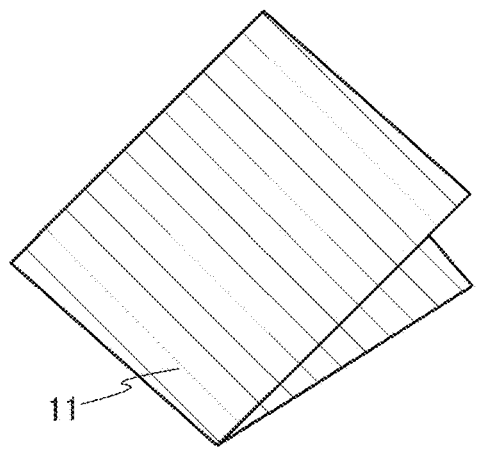
FIGS. 10A to 10E illustrate a method for manufacturing a battery of an embodiment.

The exterior body 11 composed of a film processed to have a wave shape is folded so that a state illustrated in FIG. 10A is obtained.

Figure 10B:
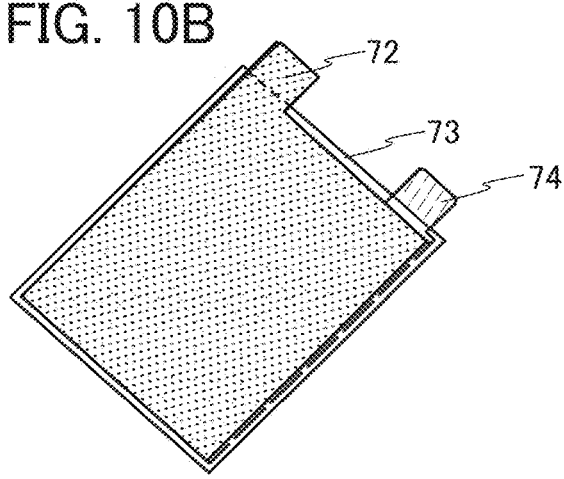

Then, as illustrated in FIG. 10B, a stack including a positive electrode current collector 72, a separator 73, and a negative electrode current collector 74 included in a secondary battery is prepared. Although not illustrated in the drawings, a positive electrode active material layer is formed on part of a surface of the positive electrode current collector 72, whereas a negative electrode active material layer is formed on part of a surface of the negative electrode current collector 74. The positive electrode current collector 72 and the negative electrode current collector 74 can each be formed using a highly conductive material that is not alloyed with a carrier ion such as a lithium ion, for example, a metal such as stainless steel, gold, platinum, zinc, iron, nickel, copper, aluminum, titanium, or tantalum or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 µm to 40 µm inclusive. Note that in the example illustrated here, for simplicity, one stack including the positive electrode current collector 72 provided with the positive electrode active material layer, the separator 73, and the negative electrode current collector 74 provided with the negative electrode active material layer is packed in an exterior body. To increase the capacity of a secondary battery, a plurality of the stacks are stacked and packed in an exterior body.

Figure 10C:
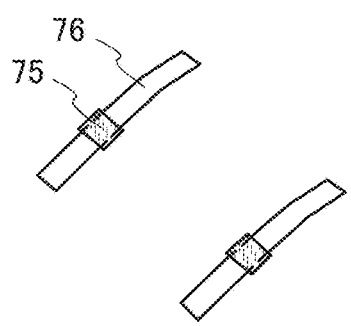

In addition, two lead electrodes 76 with sealing layers 75 illustrated in FIG. 10C are prepared. Each of the lead electrodes 76 is also referred to as a lead terminal or a tab and is provided in order to lead a positive electrode or a negative electrode of a secondary battery to the outside of an exterior film. Aluminum and nickel-plated copper are used for the positive electrode lead and the negative electrode lead, respectively.

Then, the positive electrode lead is electrically connected to a protruding portion of the positive electrode current collector 72 by ultrasonic welding or the like, and the negative electrode lead is electrically connected to a protruding portion of the negative electrode current collector 74 by ultrasonic welding or the like.

Then, two sides of the film-like exterior body 11 are sealed by thermocompression bonding by the above-described method, and one side is left open for introduction of an electrolytic solution. In this manner, the bonding portions 33 are formed. After that, under reduced pressure or in an inert gas atmosphere, a desired amount of electrolytic solution is dripped into the film-like exterior body 11 in the form of a bag. Lastly, the side of the film which has been left open without being subjected to thermocompression bonding is sealed by thermocompression bonding, so that the bonding portion 34 is formed. In thermocompression bonding, the sealing layers 75 provided on the lead electrodes are also melted, thereby fixing the lead electrodes and the film-like exterior body 11 to each other.

Figure 10D:
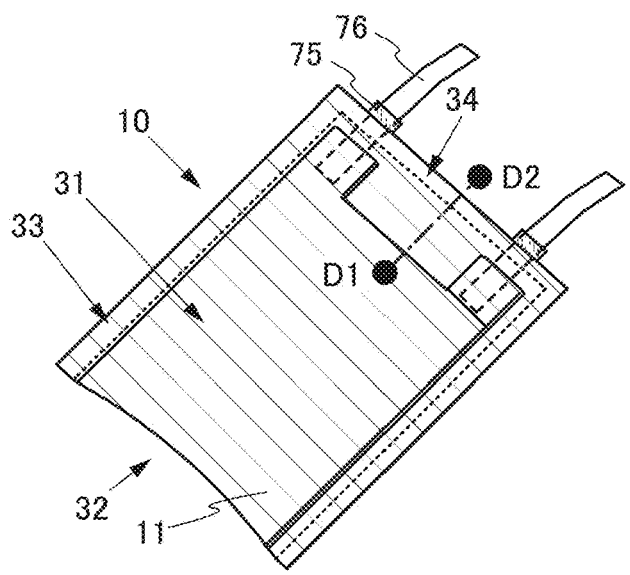

In this manner, the battery 10 illustrated in FIG. 10D, which is a secondary battery, can be manufactured.

The exterior body 11 in the form of a film of the battery 10, which is the obtained secondary battery, has a pattern of waves. A region between the edge and a dotted line in FIG. 10D is the bonding portions 33 and the bonding portion 34, and the region is processed to be flat.

Figure 10E:
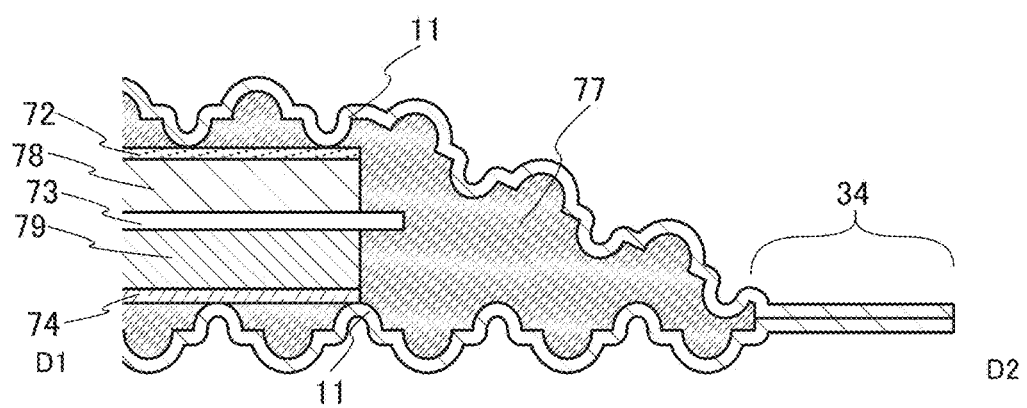

FIG. 10E illustrates an example of a cross section taken along dashed-dotted line D1-D2 in FIG. 10D.

As illustrated in FIG. 10E, the positive electrode current collector 72, a positive electrode active material layer 78, the separator 73, a negative electrode active material layer 79, and the negative electrode current collector 74 are stacked in this order and surrounded by the folded film-like exterior body 11. The folded film-like exterior body 11 is sealed by the bonding portion 34 in end portions of the film-like exterior body 11 and a space sandwiched by the film-like exterior body 11 is provided with an electrolytic solution 77. In other words, the space surrounded by the film-like exterior body 11 is filled with the electrolytic solution 77.

Examples of positive electrode active materials that can be used for the positive electrode active material layer 78 include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ is used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 73, an insulator such as cellulose (paper), polypropylene with pores, or polyethylene with pores can be used.

As an electrolyte of the electrolytic solution 77, a material that has carrier ion mobility and contains lithium ions as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolytic solution, a material with carrier ion mobility is used. As the solvent of the electrolytic solution, an aprotic organic solvent is preferably used Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a fluorine-based polymer gel, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used When the solid electrolyte is used, a separator and a spacer are not necessary. Furthermore, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material used in the negative electrode active material layer 79; for example, metal lithium, a carbon-based material, an alloy-based material, or the like can be used.

The metal lithium is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, fullerene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of metal lithium (higher than or equal to 0.1 V and lower than or equal to 0.3 V vs. Li/Li) when lithium ions are intercalated into the graphite (while a lithium-graphite intercalation compound is formed). For this reason, a lithium-ion secondary battery can have a high operating voltage In addition, graphite is preferable because of its advantages such as relatively high capacity per unit volume, small volume expansion, low cost, and safety greater than that of metal lithium.

For the negative electrode active material, an alloy-based material or an oxide which enables charge-discharge reactions by an alloying reaction and a dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used as the alloy-based material, for example. Such elements have higher capacity than carbon. In particular, silicon has a significantly high theoretical capacity of 4200 mAh/g. For this reason, silicon is preferably used as the negative electrode active material. Examples of the alloy-based material that uses such an element include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, SiO, SnO, $SnO_2$, or an oxide such as titanium dioxide ($TiO_2$), lithium titanium oxide ($Li_4Ti_5O_2$), a lithium-graphite intercalation compound ($Li_xC_6$), niobium pentoxide ($Nb_2O_5$), tungsten oxide ($WO_2$), or molybdenum oxide ($MoO_2$) can be used. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a material containing two or more of single crystal silicon, amorphous silicon, polycrystal silicon, $Si_2O_3$, $Si_3O_4$, $Si_2O$, and $SiO_2$. Furthermore, SiO is a colored material. Thus, SiC can be distinguished from SiO, (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_1$ and $BiF_3$. Note that any of the fluorides can be used as a positive electrode active material because of its high potential.

The negative electrode active material layer 79 may further include a binder for increasing adhesion of active materials, a conductive additive for increasing the conductivity of the negative electrode active material layer, and the like in addition to the above negative electrode active materials.

In the secondary battery, for example, the separator 73 has a thickness of approximately 15 μm to 30 μm, the positive electrode current collector 72 has a thickness of approximately 10 μm to 40 μm, the positive electrode active material layer 78 has a thickness of approximately 50 μm to 100 μm, the negative electrode active material layer 79 has a thickness of approximately 50 μm to 100 μm, and the negative electrode current collector 74 has a thickness of approximately 5 μm to 40 μm. The film-like exterior body 11 has a thickness of approximately 20 μm to 500 μm. The height of each of the projections of the film-like exterior body 11 is approximately 5 μm to 400 μm. If the height of each of the projections of the film-like exterior body 11 is 2 mm or more, the total thickness of the secondary battery becomes too large.

The battery capacity per unit volume is preferably as large as possible. The battery capacity per unit volume becomes large as the proportion of the volume of a battery portion to the total volume of the secondary battery increases. When the heights of the projections of the film-like exterior body 11 are made large, the total thickness of the secondary battery is increased and the proportion of the volume of the battery portion to the total volume is decreased, resulting in a small battery capacity.

Note that the adhesive layer is formed in the following manner: a layer made of polypropylene is provided on the surface of the film on the side where the film is attached, and only a thermocompression-bonded portion becomes the adhesive layer.

FIG. 10E illustrates an example where the bottom side of the film-like exterior body 11 is fixed and pressure bonding is performed. In this case, the top side is greatly bent and a step is formed. Thus, when a plurality of the above-described stacks (e.g., eight or more stacks) are provided between facing portions of the folded film-like exterior body 11, the step is large and stress applied to the top side of the film-like exterior body 11 might be too high. Furthermore, the edge of the top side of the film might be misaligned with the edge of the bottom side of the film. To prevent misalignment of the edges, a step may be provided on the bottom side of the film and pressure bonding may be performed at a center portion so that stress is uniformly applied.

In the case where the misalignment is large, there is a region where part of the edge of one film does not overlap with the other film. To correct the misalignment of the edges of the top and bottom sides of the film, such a region may be cut off.

Here, a current flow in charging a secondary battery will be described with reference to FIG. 1. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 11:
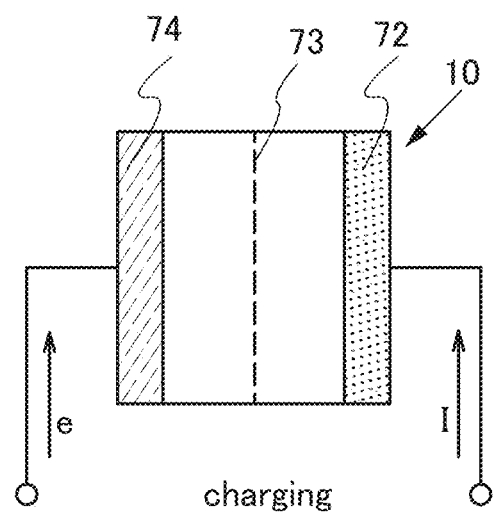
FIG. 11 illustrates a structural example of a battery of an embodiment.

Two terminals in FIG. 11 are connected to a charger, and the battery 10 is charged. As the charge of the battery 10 proceeds, a potential difference between electrodes increases. In FIG. 11, electrons flow from a terminal outside the battery 10 to the positive electrode current collector 72, and a current flows from the positive electrode current collector 72 to the negative electrode current collector 74 in the battery 10. In FIG. 11, the direction of the current flow from the negative electrode to the terminal outside the battery 10 is regarded as the positive direction. In other words, the direction in which a charging current flows is regarded as the direction of a current.

[Example of Electrode Stack]

A structural example of a stack including a plurality of electrodes will be described below.

Figure 12A:
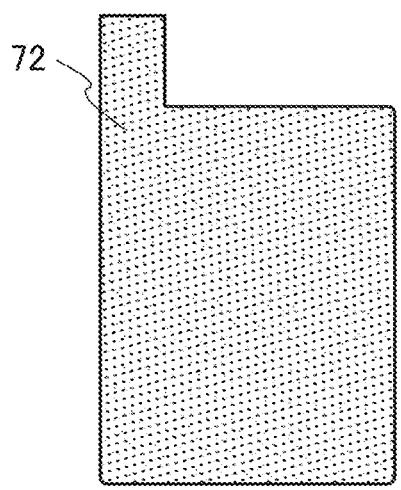
FIGS. 12A to 12E illustrate a structural example of a battery of an embodiment.
Figure 12B:
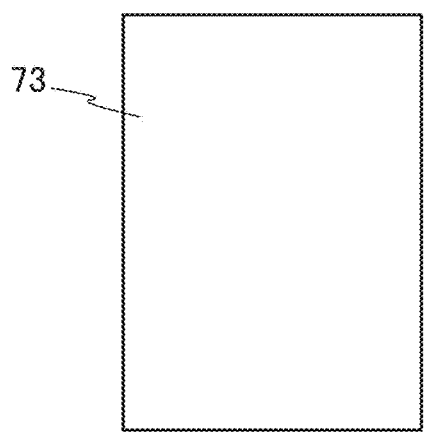
Figure 12C:
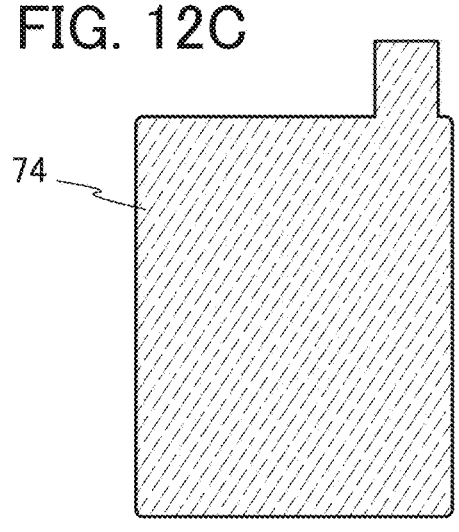
Figure 12D:
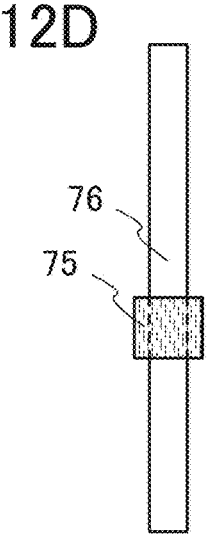
Figure 12E:
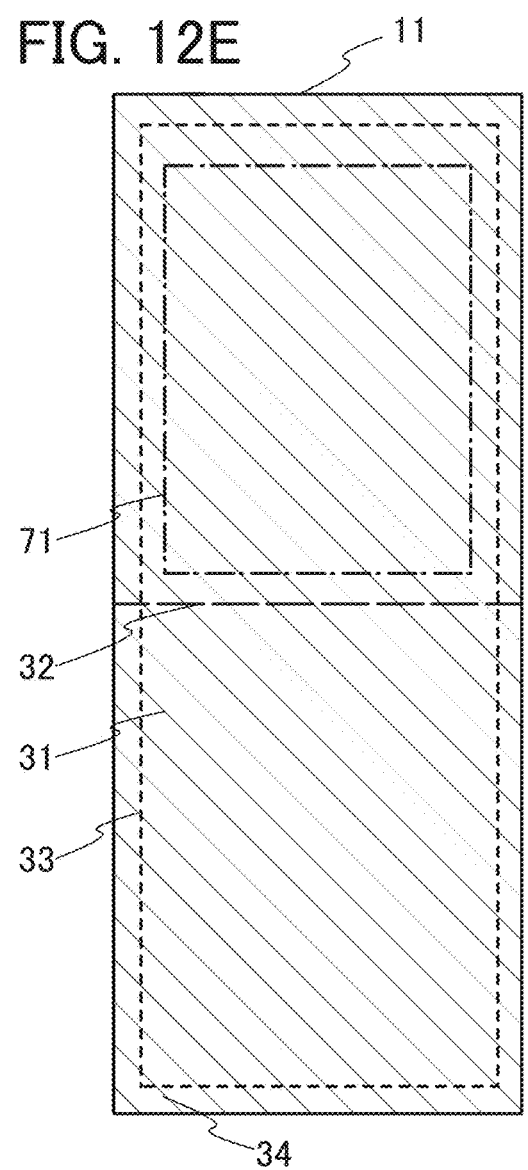

FIG. 12A is a top view of the positive electrode current collector 72. FIG. 12B is a top view of the separator 73. FIG. 12C is a top view of the negative electrode current collector 74. FIG. 12D is a top view of the sealing layer 75 and the lead electrode 76. FIG. 12E is a top view of the film-like exterior body 11.

The dimensions of the components are substantially the same in FIGS. 12A to 12E. A region 71 surrounded by a dashed-dotted line in FIG. 12E has substantially the same dimension as the separator in FIG. 12B. A region between the edge and a dashed line in FIG. 12E corresponds to the bonding portions 33 and the bonding portion 34.

Figure 13A:
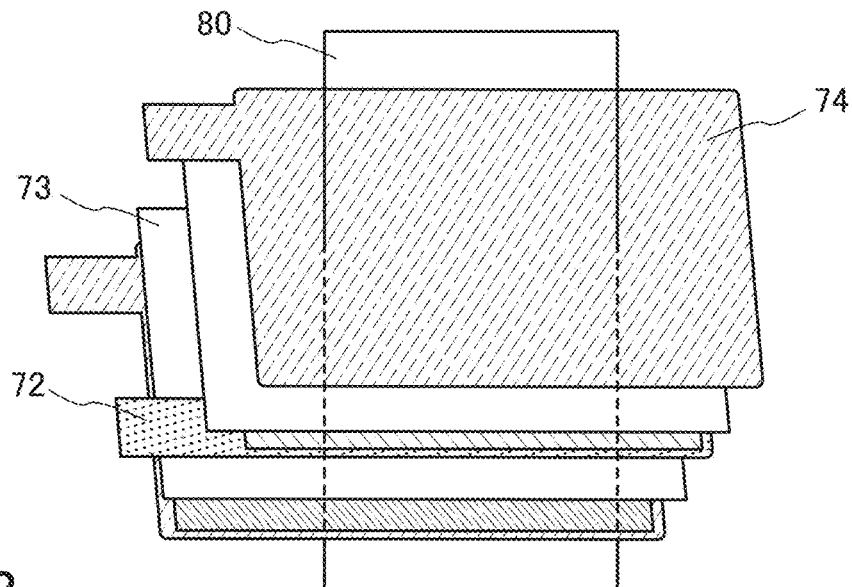
FIGS. 13A to 13C illustrate structural examples of batteries of embodiments.
Figure 13B:
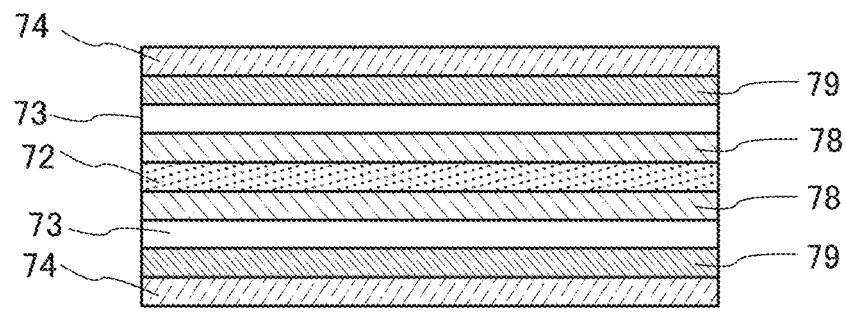

FIG. 13A illustrates an example where the positive electrode active material layer 78 is provided on both surfaces of the positive electrode current collector 72. Specifically, the negative electrode current collector 74, the negative electrode active material layer 79, the separator 73, the positive electrode active material layer 78, the positive electrode current collector 72, another positive electrode active material layer 78, another separator 73, another negative electrode active material layer 79, and another negative electrode current collector 74 are stacked in this order. FIG. 13B is a cross-sectional view of the layered structure taken along a plane 80.

Note that although FIG. 13A illustrates an example where two separators are used, the following structure may be employed: one separator is folded and two end portions are sealed to form a bag form, and the positive electrode current collector 72 is provided in the bag form. The positive electrode active material layer 78 is formed on both surfaces of the positive electrode current collector 72 provided in the bag-like separator.

Figure 13C:
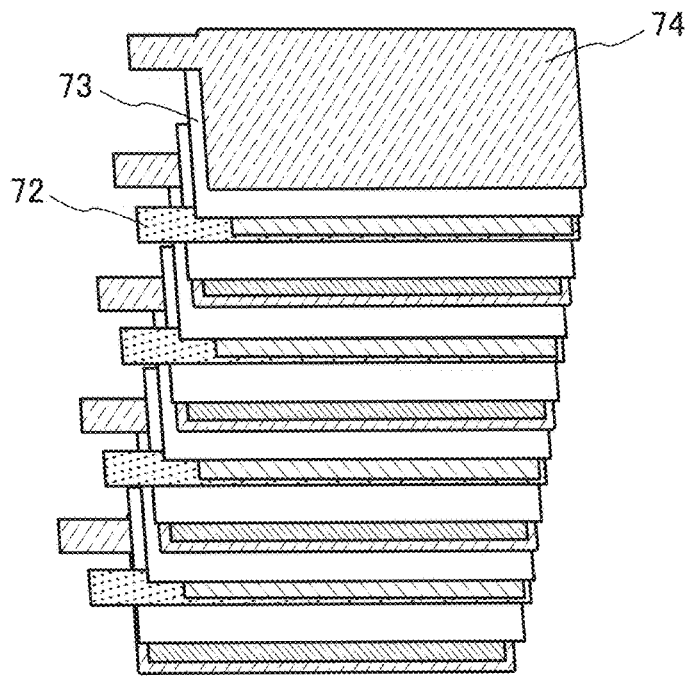

The negative electrode active material layer 79 may be provided on both surfaces of the negative electrode current collector 74. In a secondary battery illustrated in FIG. 13C, three negative electrode current collectors 74 each provided with the negative electrode active material layers 79 on both surfaces, four positive electrode current collectors 72 each provided with the positive electrode active material layers 78 on both surfaces, and eight separators 73 are sandwiched between two negative electrode current collectors 74 each having the negative electrode active material layer 79 on one surface. In this case, four bag-like separators can be used instead of eight separators.

Figure 14A:
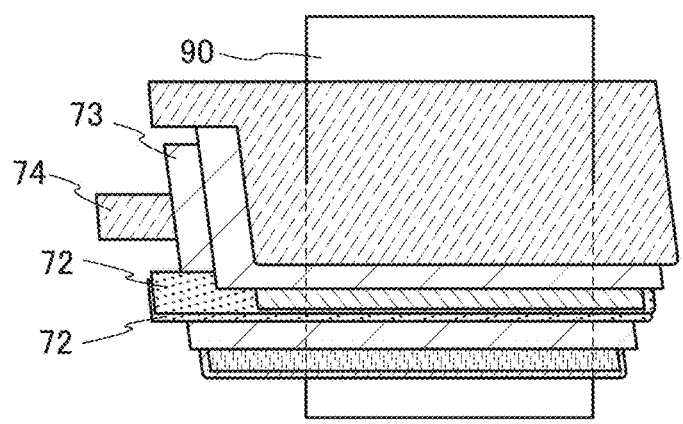
FIGS. 14A to 14C illustrate structural examples of batteries of embodiments.
Figure 14B:
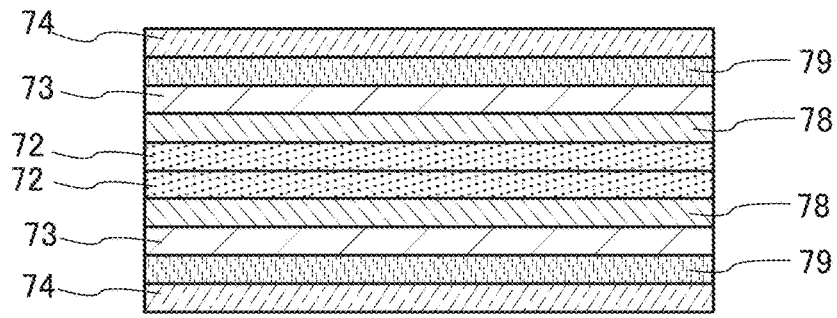

The capacity of the secondary battery can be increased by increasing the number of the stacks. In addition, when the positive electrode active material layers 78 are provided on both surfaces of the positive electrode current collector 72 and the negative electrode active material layers 79 are provided on both surfaces of the negative electrode current collector 74, the thickness of the secondary battery can be made small, FIG. 14A illustrates a secondary battery in which the positive electrode active material layer 78 is provided on one surface of the positive electrode current collector 72 and the negative electrode active material layer 79 is provided on one surface of the negative electrode current collector 74. Specifically, the negative electrode active material layer 79 is provided on one surface of the negative electrode current collector 74 and the separator 73 is stacked in contact with the negative electrode active material layer 79. The positive electrode active material layer 78 that is provided on one surface of the positive electrode current collector 72 is in contact with a surface of the separator 73 remote from the negative electrode active material layer 79. Another positive electrode current collector 72 whose one surface is provided with the positive electrode active material layer 78 is in contact with the other surface of the positive electrode current collector 72. Note that the positive electrode current collectors 72 are provided such that the surfaces remote from the positive electrode active material layers 78 face each other. Another separator 73 is stacked thereon, and another negative electrode active material layer 79 provided on one surface of another negative electrode current collector 74 is stacked in contact with the separator. FIG. 14B is a cross-sectional view of the layered structure in FIG. 14A, which is taken along a plane 90.

Although two separators are used in FIG. 14A, the following structure may be employed: one separator is folded and two end portions are sealed to form a bag form, and two positive electrode current collectors 72 each provided with the positive electrode active material layer 78 on one surface are provided in the bag form.

Figure 14C:
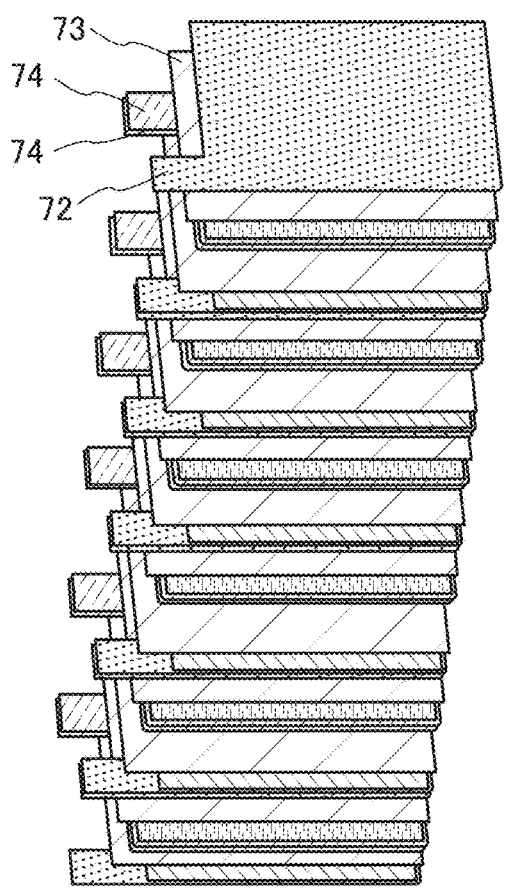

In FIG. 14C, a plurality of the stacks illustrated in FIG. 14A are stacked. In FIG. 14C, the negative electrode current collectors 74 are provided such that the surfaces remote from the negative electrode active material layers 79 face each other. In FIG. 14C, twelve positive electrode current collectors 72, twelve negative electrode current collectors 74, and twelve separators 73 are stacked.

A secondary battery with a structure in which the positive electrode active material layer 78 is provided on one surface of the positive electrode current collector 72 and the negative electrode active material layer 79 is provided on one surface of the negative electrode current collector 74, is thicker than a secondary battery with a structure in which the positive electrode active material layers 78 are provided on both surfaces of the positive electrode current collector 72 and the negative electrode active material layers 79 are provided on both surfaces of the negative electrode current collector 74. However, the surface of the positive electrode current collector 72 on which the positive electrode active material layer 78 is not provided faces the surface of another positive electrode current collector 72 on which the positive electrode active material layer 78 is not provided; as a result, metals are in contact with each other. Similarly, the surface of the negative electrode current collector 74 on which the negative electrode active material layer 79 is not provided faces the surface of another negative electrode current collector 74 on which the negative electrode active material layer 79 is not provided; as a result, metals are in contact with each other. Surfaces where the metals are in contact with each other easily slide on each other owing to the low friction. Since the metals in the secondary battery slide on each other at the time of bending, the secondary battery is easily bent.

The protruding portions of the positive electrode current collector 72 and the negative electrode current collector 74 are also referred to as tab portions. The tab portions of the positive electrode current collector 72 and the negative electrode current collector 74 are easily cut when the secondary battery is bent. This is because the tab portions are long and narrow protrusions and the stress is likely to be applied to the roots of the tab portions.

In the structure in which the positive electrode active material layer 78 is provided on one surface of the positive electrode current collector 72 and the negative electrode active material layer 79 is provided on one surface of the negative electrode current collector 74, there are a surface where the positive electrode current collectors 72 are in contact with each other and a surface where the negative electrode current collectors 74 are in contact with each other. The surface where the current collectors are in contact with each other has low friction resistance and thus easily reduces the stress due to the difference in radius of curvature that occurs when the battery is changed in form. Furthermore, the total thickness of each tab portion is large in the structure in which the positive electrode active material layer 78 is provided on one surface of the positive electrode current collector 72 and the negative electrode active material layer 79 is provided on one surface of the negative electrode current collector 74; thus, the stress is distributed as compared with the case of the structure in which the positive electrode active material layers 78 are provided on both surfaces of the positive electrode current collector 72 and the negative electrode active material layers 79 are provided on both surfaces of the negative electrode current collector 74, As a result, the tab portion is less likely to be cut.

In the case of thus stacking layers, ultrasonic welding is performed to fix and electrically connect all the positive electrode current collectors 72 at a time. Furthermore, when ultrasonic welding is performed with the positive electrode current collectors 72 overlapping with a lead electrode, they can be electrically connected efficiently.

Ultrasonic welding can be performed in such a manner that ultrasonic waves are applied to the tab portion of the positive electrode current collector placed so as to overlap with a tab portion of another positive electrode current collector, while pressure is applied thereto.

Figure 15A:
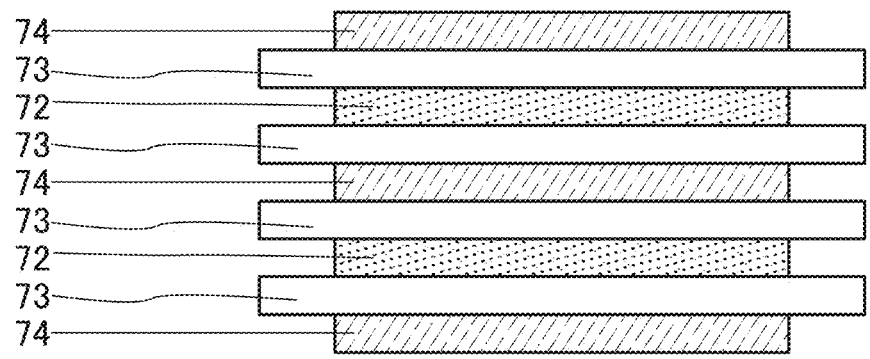
FIGS. 15A to 15C illustrate structural examples of batteries of embodiments.
Figure 15B:
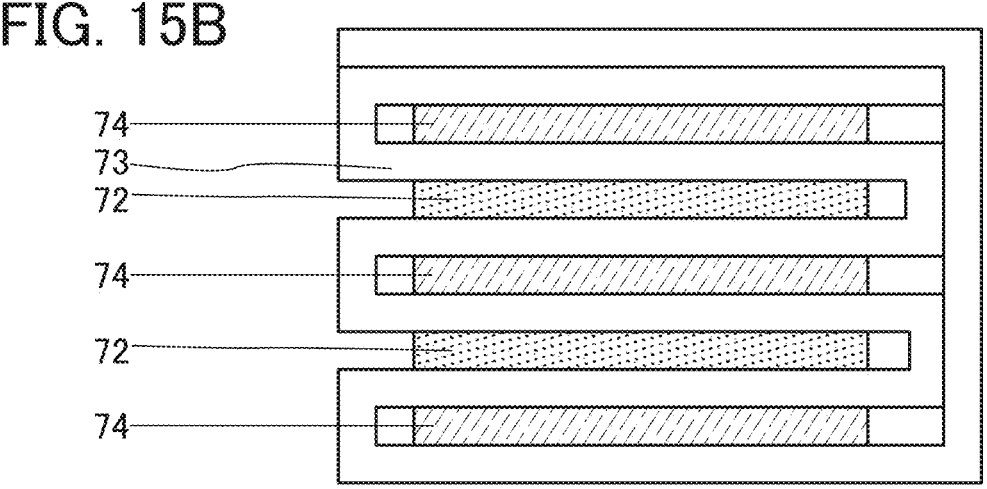
Figure 15C:
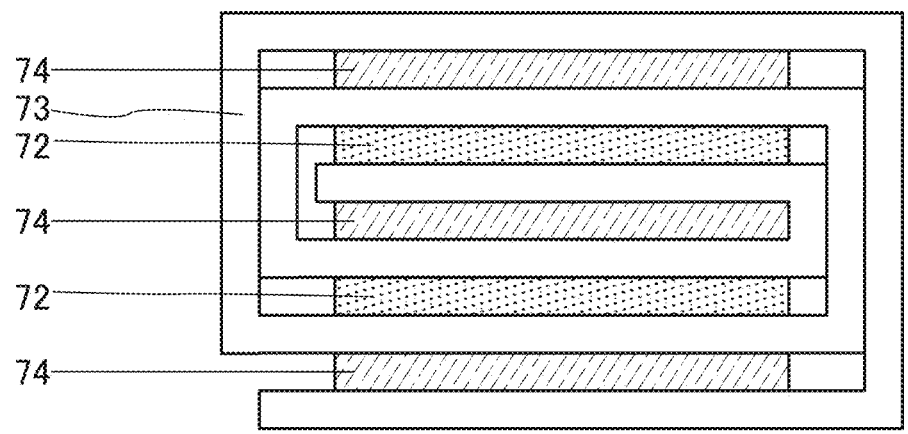

The separators 73 preferably have a shape that helps prevent an electrical short circuit between the positive electrode current collector 72 and the negative electrode current collector 74. For example, the width of each of the separators 73 is preferably larger than those of the positive electrode current collector 72 and the negative electrode current collector 74 as illustrated in FIG. 15A, in which case the positive electrode current collector 72 and the negative electrode current collector 74 are less likely to come in contact with each other even when the relative positions of the positive electrode current collector 72 and the negative electrode current collector 74 are shifted because of a change in form, such as a bend. Alternatively, as illustrated in FIG. 15B, one separator 73 is preferably folded into a bellows shape, or as illustrated in FIG. 15C, one separator 73 is preferably wrapped around the positive electrode current collectors 72 and the negative electrode current collectors 74 alternately. In those cases, the positive electrode current collector 72 and the negative electrode current collector 74 do not come in contact with each other even when the relative positions of the positive electrode current collector 72 and the negative electrode current collector 74 are shifted. In FIGS. 15B and 15C, the separator 73 is provided so as to partly cover a side surface of a layered structure of the positive electrode current collectors 72 and the negative electrode current collectors 74.

Although FIGS. 15A to 15C do not illustrate the positive electrode active material layer 78 and the negative electrode active material layer 79, the above description can be referred to for forming methods thereof. Although an example where the positive electrode current collectors 72 and the negative electrode current collectors 74 are alternately arranged is described here, two positive electrode current collectors 72 or two negative electrode current collectors 74 may be adjacent to each other as described above.

In an example in this embodiment, one rectangle film is folded in half and two end portions are made to overlap with each other for sealing. However, the shape of the film is not limited to a rectangle and can be a polygon such as a triangle, a square, or a pentagon or any symmetric shape other than a rectangle, such as a circle or a star.

Although an example of a small battery used in a portable information terminal or the like is described in this embodiment, one embodiment of the present invention is not particularly limited to this example. Application to a large battery provided in a vehicle or the like is also possible.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible. Furthermore, application to a solar cell, an optical sensor, a touch sensor, a display device, a flexible printed circuit (FPC), an optical film (e.g., a polarizing plate, a retardation plate, a prism sheet, a light reflective sheet, and a light diffusion sheet), and the like is possible.

At least part of this embodiment can be implemented in combination with any of the other embodiments and examples described in this specification, as appropriate.

Embodiment 2

In this embodiment, examples of electronic devices incorporating a battery obtained using Embodiment 1, in particular, a secondary battery will be described.

The secondary battery that can be fabricated according to Embodiment 1 includes a thin and flexible film as an exterior body and thus can flexibly change its form.

A part of an electronic device like a watch is brought into contact with a part of the body (wrist or arm) of a user, that is, the user wears the electronic device, whereby the user can feel like the electronic device is lighter than the actual weight. A flexible secondary battery can be provided in an electronic device having a form with a curved surface that fits a part of the body of a user so that the secondary battery can be fixed in a suitable form.

When a user moves a part of the body where an electronic device is on, the user might feel uncomfortable regarding the electronic device as a distraction, and feel stress even in the case where the electronic device has a curved surface that fits the part of the body. An electronic device provided with a flexible secondary battery in a portion whose form can be changed can change its form at least partly according to movement of the body of a user; thus, an electronic device with which the user does not feel uncomfortable can be obtained.

An electronic device does not necessarily have a form with a curved surface or a complicated form; an electronic device may have a simple form. The number or size of components that can be incorporated in an electronic device with a simple form, for example, is determined depending on the volume of a space formed by a housing of the electronic device in many cases. Providing a flexible secondary battery in a small space between components other than the secondary battery enables a space formed by a housing of an electronic device to be efficiently used; thus, the electronic device can be reduced in size.

Examples of wearable devices include wearable input terminals such as a wearable camera, a wearable microphone, and a wearable sensor; wearable output terminals such as a wearable display and a wearable speaker; and wearable input/output terminals having the functions of any of the input terminals and any of the output terminals. Another example of a wearable device is a wearable computer including a CPU, which is a typical example of a device that controls each device and calculates or processes data. Other examples of wearable devices include devices that store data, send data, and receive data, typically, a portable information terminal and a memory.

Examples of electronic devices each using a flexible secondary battery are as follows: display devices such as head-mounted displays and goggle type displays, televisions (also referred to as television receivers), desktop personal computers, laptop personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible secondary battery can be incorporated along a curved inside/outside wall surface of a house or a building or a curved interior/exterior surface of an automobile.

Figure 16A:
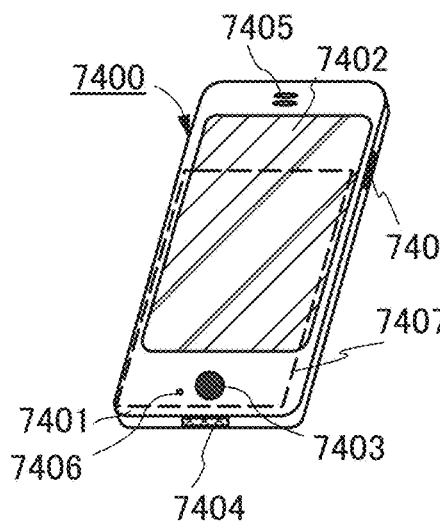
FIGS. 16A to 16H illustrate electronic devices of embodiments.

FIG. 16A illustrates an example of a mobile phone. A mobile phone 7400 includes a display portion 7402 incorporated in a housing 7401, an operation button 7403, an external connection port 7404, a speaker 7405, a microphone 7406, and the like Note that the mobile phone 7400 includes a secondary battery 7407.

Figure 16B:
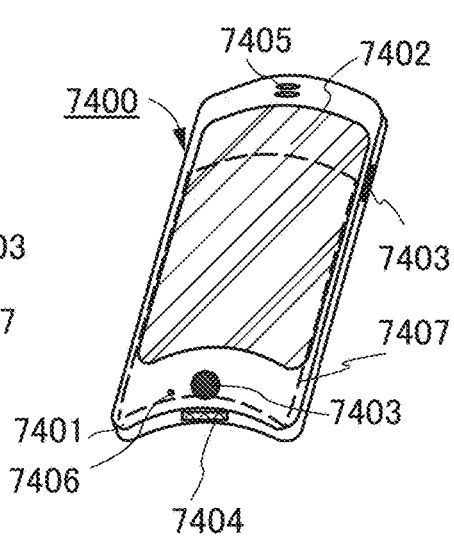
Figure 16C:
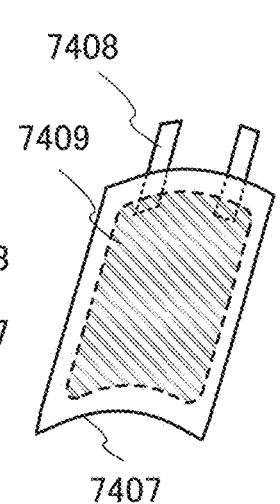

FIG. 16B illustrates the mobile phone 7400 that is bent. When the whole mobile phone 7400 is bent by external force, the secondary battery 7407 included in the mobile phone 7400 is also bent. FIG. 16C illustrates the bent secondary battery 7407. The secondary battery 7407 is a laminated storage battery (also referred to as a layered battery or a film-covered battery). The secondary battery 7407 is fixed while being bent, Note that the secondary battery 7407 includes a lead electrode 7408 electrically connected to a current collector 7409. A film serving as an exterior body of the secondary battery 7407 is embossed, so that the secondary battery 7407 has high reliability even when bent, for example. The mobile phone 7400 may further be provided with a slot for insertion of a SIM card, a connector portion for connecting a USB device such as a USB memory.

Figure 16D:
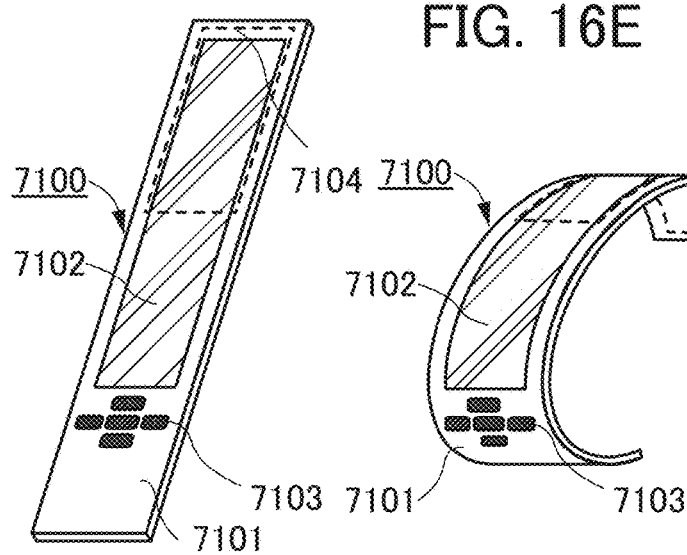
Figure 16E:
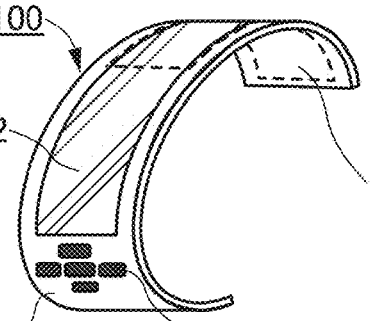
Figure 16F:
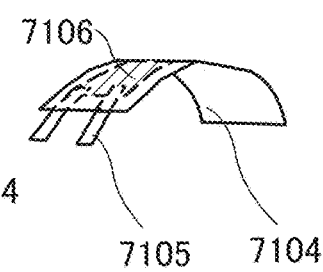
Figure 16G:
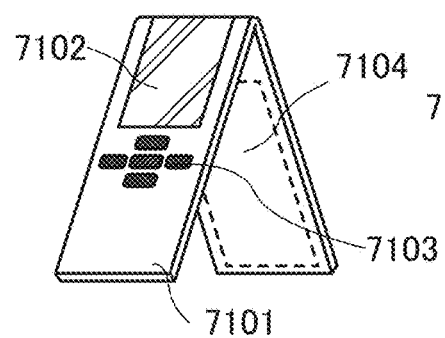
Figure 16H:
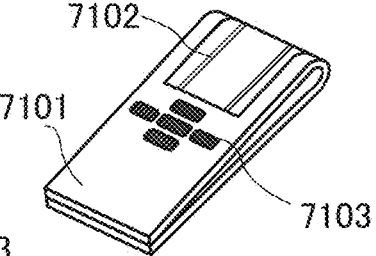

FIG. 16D illustrates an example of a mobile phone that can be bent. When bent to be put around a forearm, the mobile phone can be used as a bangle-type mobile phone as in FIG. 16E. A mobile phone 7100 includes a housing 7101, a display portion 7102, an operation button 7103, and a secondary battery 7104. FIG. 16F illustrates the secondary battery 7104 in the state of being bent. When the mobile phone is worn on a user's arm while the secondary battery 7104 is bent, the housing changes its form and the curvature of a part or the whole of the secondary battery 7104 is changed. Specifically, a part or the whole of the housing or the main surface of the secondary battery 7104 is changed in the range of radius of curvature from 10 mm to 150 mm inclusive. Note that the secondary battery 7104 includes a lead electrode 7105 that is electrically connected to a current collector 7106. Pressing is performed to form a plurality of projections and depressions on a surface of a film serving as an exterior body of the secondary battery 7104, for example; thus, reliability is retained even when the secondary battery 7104 is bent many times with different curvatures. The mobile phone 7100 may further be provided with a slot for insertion of a SIM card, a connector portion for connecting a USB device such as a USB memory. When a center portion of the mobile phone illustrated in FIG. 16D is bent, a form illustrated in FIG. 16G can be obtained. When the center portion of the mobile phone is folded so that end portions of the mobile phone overlap with each other as illustrated in FIG. 16H, the mobile phone can be reduced in size so as to be put in, for example, a pocket of clothes a user wears. As described above, the mobile phone illustrated in FIG. 16D can change its form in more than one way, and it is desirable that at least the housing 7101, the display portion 7102, and the secondary battery 7104 have flexibility in order to change the form of the mobile phone.

Figure 17A:
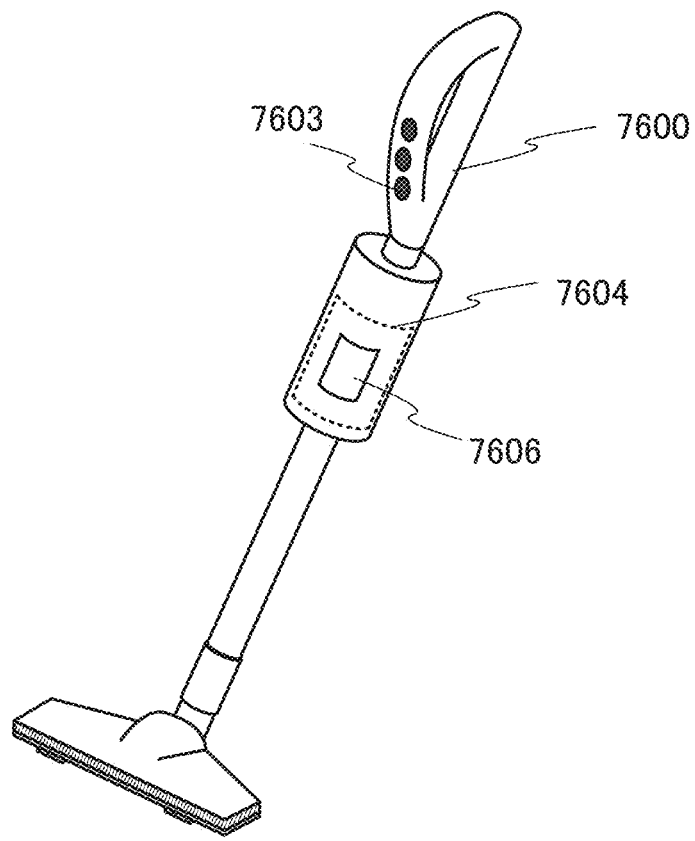
FIGS. 17A to 17C illustrate an electronic device of an embodiment.

FIG. 17A illustrates an example of a vacuum cleaner. By being provided with a secondary battery, the vacuum cleaner can be cordless. To leave a dust collecting space for storing vacuumed dust inside the vacuum cleaner, a space occupied by a secondary battery 7604 is preferably as small as possible. For this reason, it is useful to provide the secondary battery 7604 that can be bent, between the outside surface and the dust collecting space.

Figure 17B:
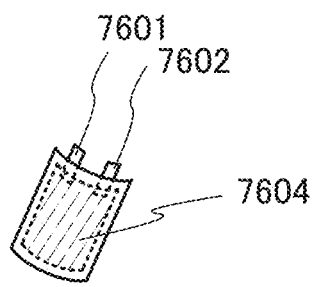

The vacuum cleaner 7600 is provided with operation buttons 7603 and the secondary battery 7604. FIG. 17B illustrates the secondary battery 7604 in the state of being bent. A film that serves as an exterior body of the secondary battery 7604 is embossed, so that the secondary battery 7604 has high reliability even when bent. The secondary battery 7604 includes a lead electrode 7601 electrically connected to a negative electrode and a lead electrode 7602 electrically connected to a positive electrode.

Figure 17C:
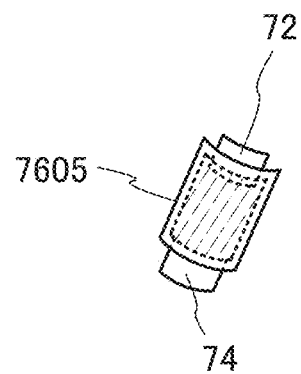

As an example of a secondary battery where one current collector is exposed from each short side of an exterior body, a curved secondary battery 7605 is illustrated in FIG. 17C. In the secondary battery 7605 illustrated in FIG. 17C, part of the positive electrode current collector 72 is exposed from one short side of the exterior body and part of the negative electrode current collector 74 is exposed from the other short side of the exterior body. A film serving as the exterior body of the secondary battery 7605 is also embossed, so that the secondary battery 7605 can be bent and has high reliability. Note that a structure in which one lead electrode is exposed from one short side of an exterior body may be employed.

The thin secondary battery 7604 can be manufactured by the method for manufacturing a laminated secondary battery that is described in Embodiment 1.

The thin secondary battery 7604 has a laminated structure and is bent and fixed. The vacuum cleaner 7600 includes a display portion 7606 that displays, for example, the remaining amount of power in the thin secondary battery 7604. A display area of the display portion 7606 is curved to fit the shape of the outer surface of the vacuum cleaner. The vacuum cleaner includes a connection cord for being connected to a receptacle. When the thin secondary battery 7604 is charged to have sufficient power, the connection cord can be removed from the receptacle to use the vacuum cleaner. The thin secondary battery 7604 may be charged wirelessly without using the connection cord.

The use of secondary batteries that can be bent in vehicles enables production of next-generation clean energy vehicles such as hybrid electric vehicles (HEVs), electric vehicles (EVs), and plug-in hybrid electric vehicles (PHEVs). Moreover, secondary batteries that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 18A:
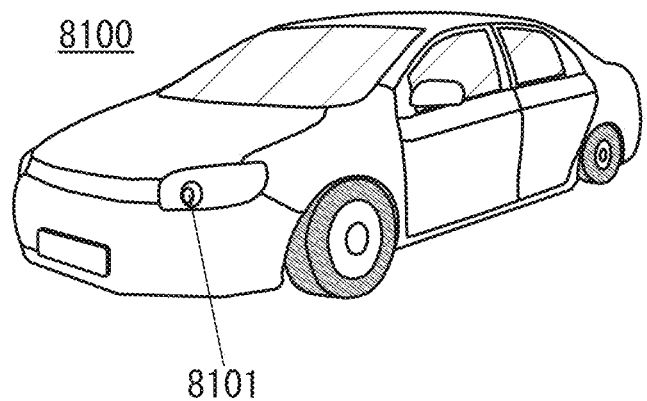
FIGS. 18A and 18B illustrate vehicles of embodiments.
Figure 18B:
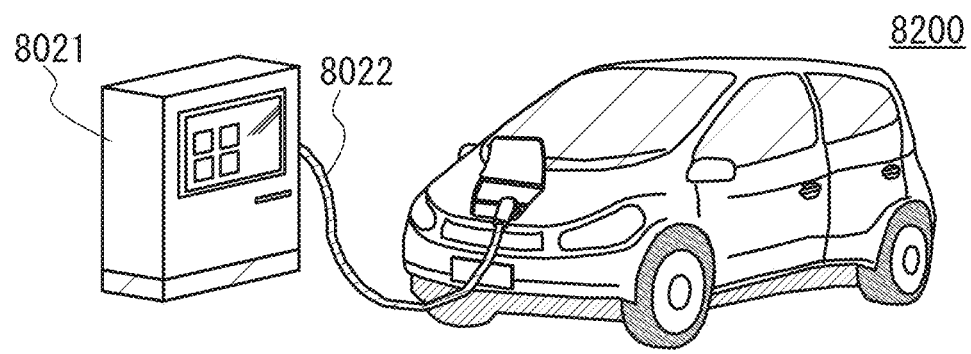

FIGS. 18A and 18B each illustrate an example of a vehicle fabricated using one embodiment of the present invention. An automobile 8100 illustrated in FIG. 18A is an electric vehicle that runs on the power of an electric motor. Alternatively, the automobile 8100 is a hybrid electric vehicle capable of driving using either an electric motor or an engine as appropriate. In the case of providing a laminated secondary battery in the vehicle, a battery module including a plurality of laminated secondary batteries is placed in one place or more than one place. One embodiment of the present invention can make a secondary battery itself compact and lightweight; thus, when the secondary battery having a curved surface is provided on the inside of a tire of a vehicle, for example, the vehicle can be a high-mileage vehicle. Furthermore, a secondary battery that can have various shapes can be provided in a small space in a vehicle, which allows a space in a trunk and a space for riders to be secured. The automobile 8100 includes the secondary battery. The secondary battery is used not only to drive the electric motor, but also to supply electric power to a light-emitting device such as a headlight 8101 or a room light (not illustrated).

The secondary battery can also supply electric power to a display device of a speedometer, a tachometer, or the like included in the automobile 8100. Furthermore, the secondary battery can supply electric power to a semiconductor device included in the automobile 8100, such as a navigation system.

FIG. 18B illustrates an automobile 8200. The automobile 8200 can be charged when a secondary battery included in the automobile 8200 is supplied with electric power through external charging equipment by a plug-in system, a contactless power feeding system, or the like. In FIG. 18B, a secondary battery included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the secondary battery included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the secondary battery when the automobile stops or moves. To supply electric power in such a contactless manner, an electromagnetic induction method or a magnetic resonance method can be used.

According to one embodiment of the present invention, the degree of flexibility in place where the secondary battery can be provided is increased; thus, a vehicle can be designed efficiently. Furthermore, according to one embodiment of the present invention, the secondary battery itself can be made compact and lightweight as a result of improved characteristics of the secondary battery. The compact and lightweight secondary battery contributes to a reduction in the weight of a vehicle, and thus increases the driving radius. Furthermore, the secondary battery included in the vehicle can be used as a power source for supplying electric power to products other than the vehicle. In such a case, the use of a commercial power source at peak time of electric power demand can be avoided.

At least part of this embodiment can be implemented in combination with any of the other embodiments and examples described in this specification, as appropriate.

Example 1

In this example, description will be given of the internal shapes of bendable batteries (lithium-ion secondary batteries) exemplified in Embodiment 1 that were fabricated as batteries of one embodiment of the present invention and photographed.

Each lithium-ion secondary battery was fabricated by the manufacturing method described in Embodiment 1 using $LiCoO_2$ as a positive electrode active material, graphite as a negative electrode active material, and an embossed aluminum laminated film as an exterior body. The thickness of an electrode stack is approximately 1.5 mm. In the electrode stack, six current collectors each made of aluminum foil and provided with a positive electrode active material layer on one side and six current collectors each made of copper foil and provided with a negative electrode active material layer on one side are alternately stacked.

As each exterior body, an aluminum laminated film with a thickness of approximately 110 μm in which polypropylene, aluminum foil, and nylon are stacked in this order was used. The film was obtained by being processed to have a wave pitch of 2 mm and a height difference between a crest and a trough of 0.5 mm.

Bonding for formation of a bonding portion of the film was performed using a mold (heat bar) with a flat surface. A pair of bonding layers (side sealing portions) in the direction perpendicular to wave crest lines and wave trough lines were formed by pressure bonding using a heat bar with a width of 1 mm at a pressure of 600 $kPa/cm^2$ and a temperature of 175° C. Meanwhile, a bonding layer (top sealing portion) in the direction parallel to the wave crest lines and the wave trough lines were formed by pressure bonding using a heat bar with a width of 2 mm provided with a groove at the position that faces a lead portion at a pressure of 125 $kPa/cm^2$ and a temperature of 175° C.

Here, two kinds of samples fabricated as follows were prepared. One of the samples, Sample 1, was fabricated in such a manner that a portion of a film to be a folded portion was planarized and the film was folded such that the phases of waves of portions that overlapped with each other were different from each other by approximately 180°, that is, the wave crest lines of the portions overlapped with each other and the wave trough lines of the portions overlapped with each other. The planarization was performed on a region with a width of approximately 6 mm between the wave crest lines as boundaries by a heat bar press method at a pressure of 60 $kPa/cm^2$ and a temperature of 100° C.

The other sample, Sample 2, was fabricated in such a manner that a film was folded such that the phases of waves of facing portions were coordinate, that is, wave crest lines of one of the portions overlapped with wave trough lines of the other portion.

The inside of each of the fabricated secondary batteries of the two samples were observed by X-ray computed tomography (X-ray CT).

Figure 19A:
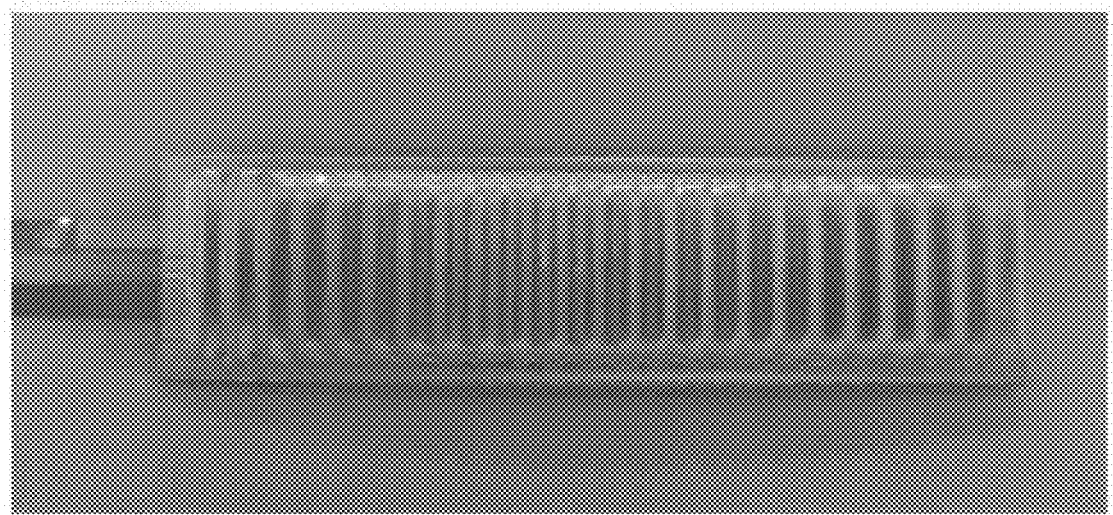
FIGS. 19A to 19D are photographs showing the appearances of batteries of Example 1.
Figure 19B:
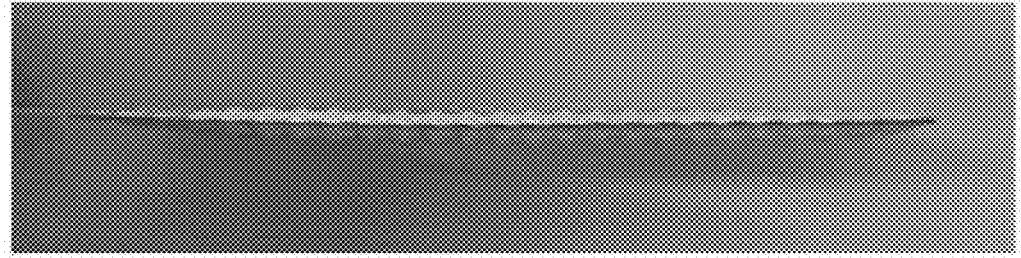
Figure 19C:
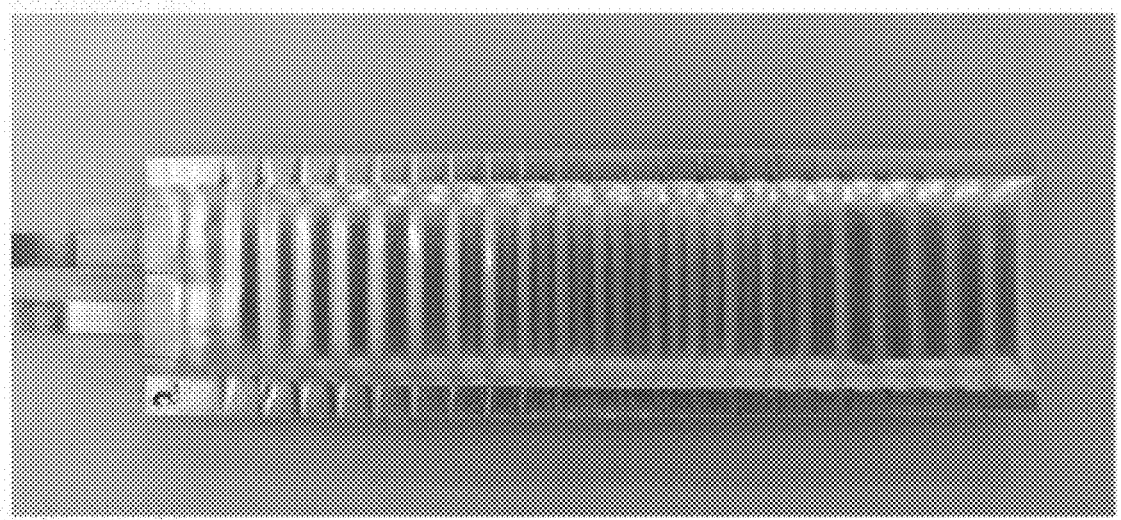
Figure 19D:
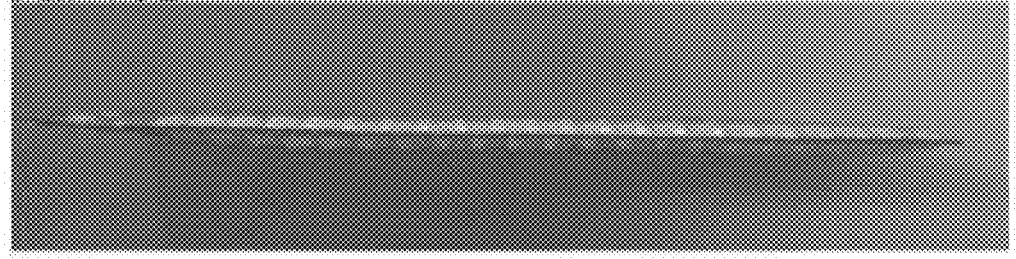

FIGS. 19A and 19B are photographs showing the appearance of Sample 1, and FIGS. 19C and 19D are photographs showing the appearance of Sample 2. It is found from these photographs that the bonding portion of each of Sample 1 and Sample 2 was formed to be very flat. In addition, part of the films of each of Sample 1 and Sample 2 was changed in form such that the wave period of a portion close to an end portion of the film was longer than that of a center portion thereof and the wave amplitude of the portion close to the end portion of the film was smaller than that of the center portion thereof.

Figure 20A:
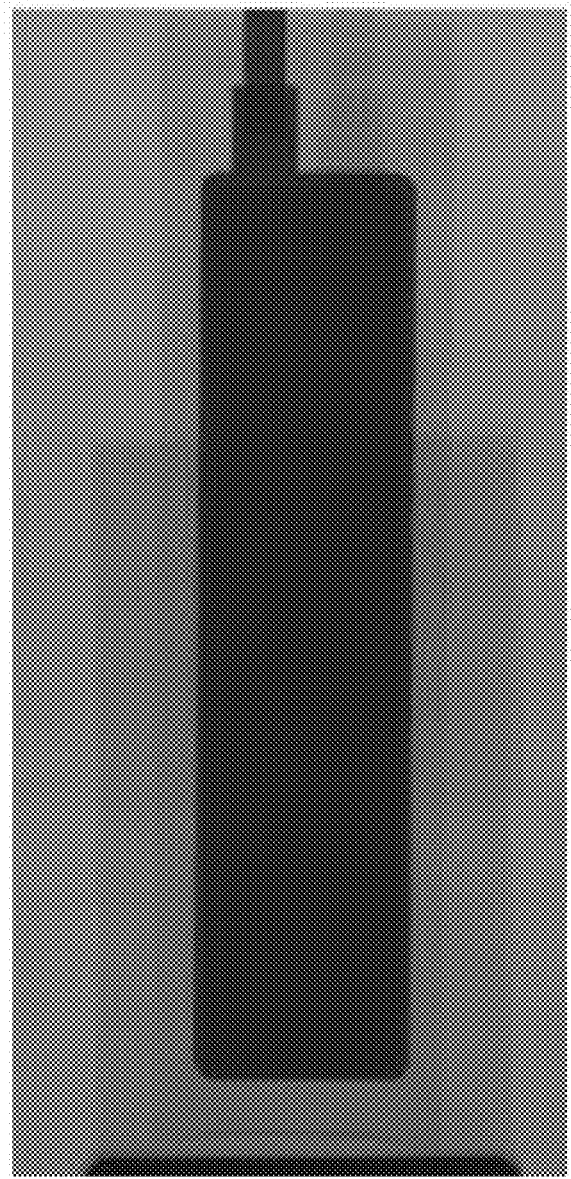
FIGS. 20A and 20B are X-ray images of a battery of Example 1.
Figure 20B:
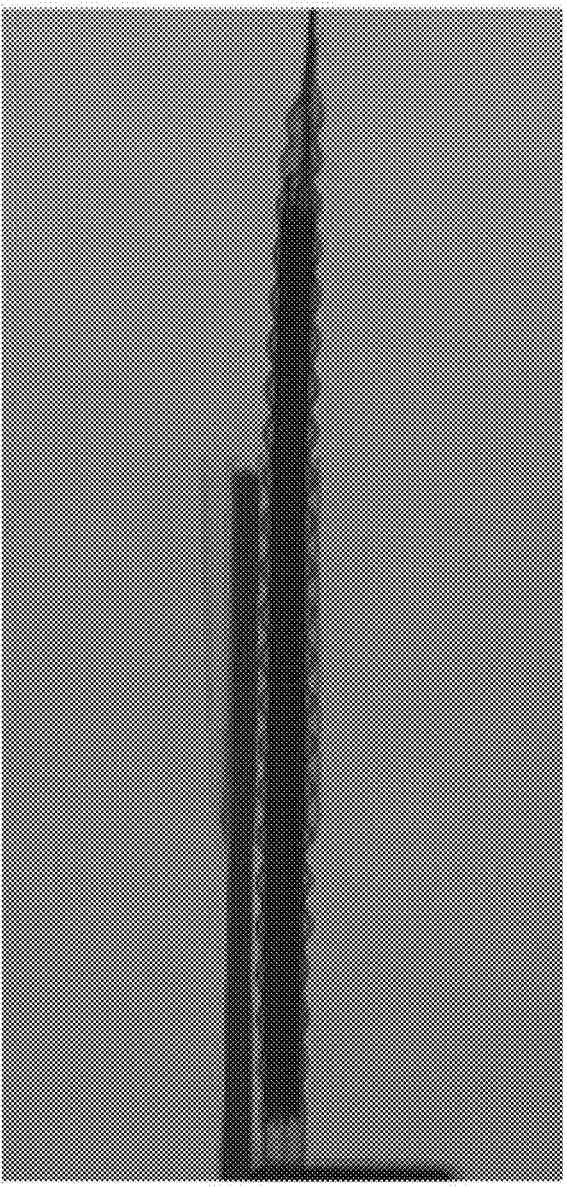

FIGS. 20A and 20B are transmission X-ray photographs of Sample 1. FIG. 20A is a photograph showing a top surface, and FIG. 20B is a photograph showing a side surface. As shown in FIG. 20A, the folded portion was curved so as to be more depressed as the distance from the bonding portion (side sealing portion) was larger. In addition, as shown in FIG. 20B, a space was formed between the electrode stack and the film.

Figure 21A:
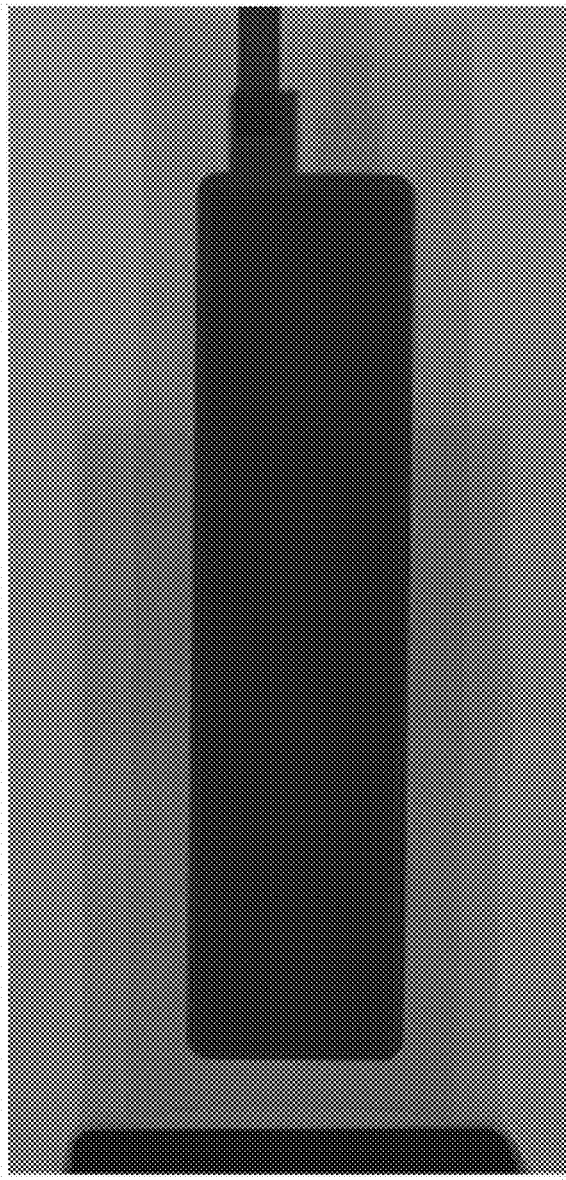
FIGS. 21A and 21B are X-ray images of a battery of Example 1.
Figure 21B:
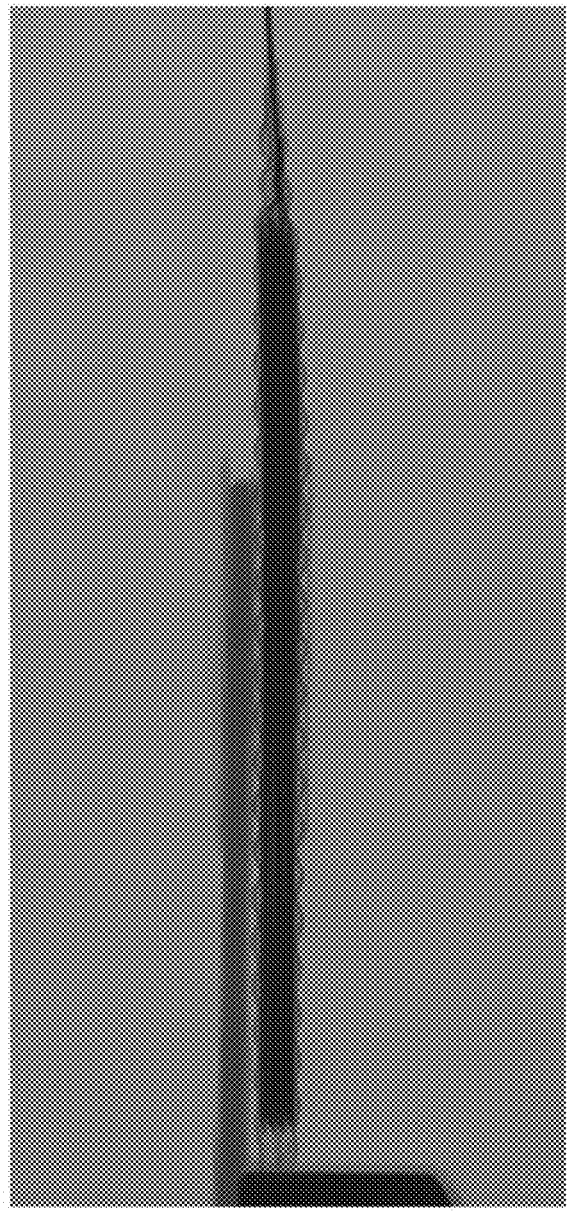

FIGS. 21A and 21B are transmission X-ray photographs of Sample 2. As in Sample 1, the folded portion of Sample 2 was curved so as to be more depressed as the distance from the bonding portion was larger. It is also found that a space was formed between the electrode stack and the film.

Figure 22A:
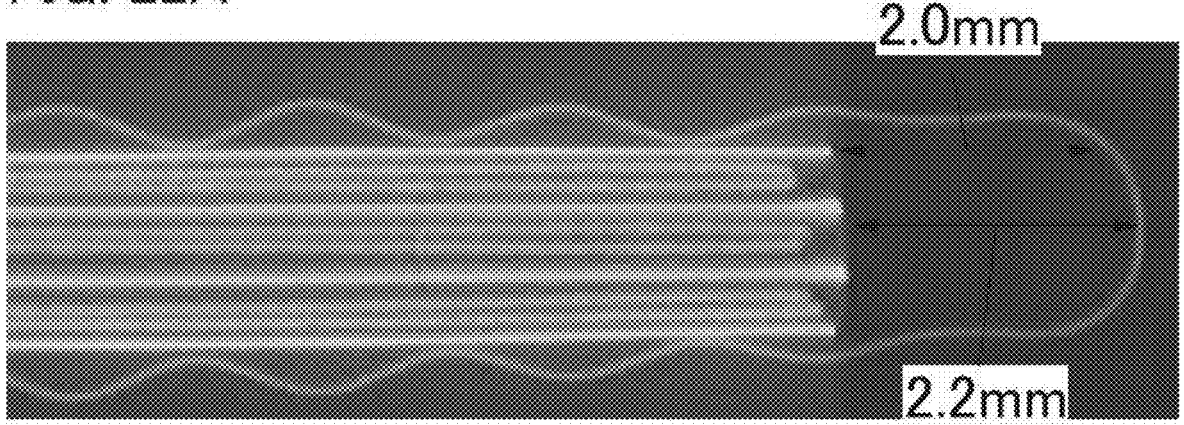
FIGS. 22A and 22B are X-ray CT images of batteries of Example 1.

FIG. 22A is an enlarged view of an X-ray CT image of Sample 1 whose folded portion was observed from the lateral direction. The folded portion of Sample 1 had a neat arc shape that was substantially bilaterally symmetric. It is also found from the photograph that the distance between the electrode stack and the interior wall of the film was approximately 2.2 mm in the vicinity of the center of the electrode stack and approximately 2.0 mm in the vicinity of an end portion thereof. As shown in FIG. 22A, the folded portion of the film was formed such that wave crest lines were connected; thus, a space in the area surrounded by the film was formed to be wide in the thickness direction and the end portion of the electrode stack was not in contact with a surface of the film.

Figure 22B:
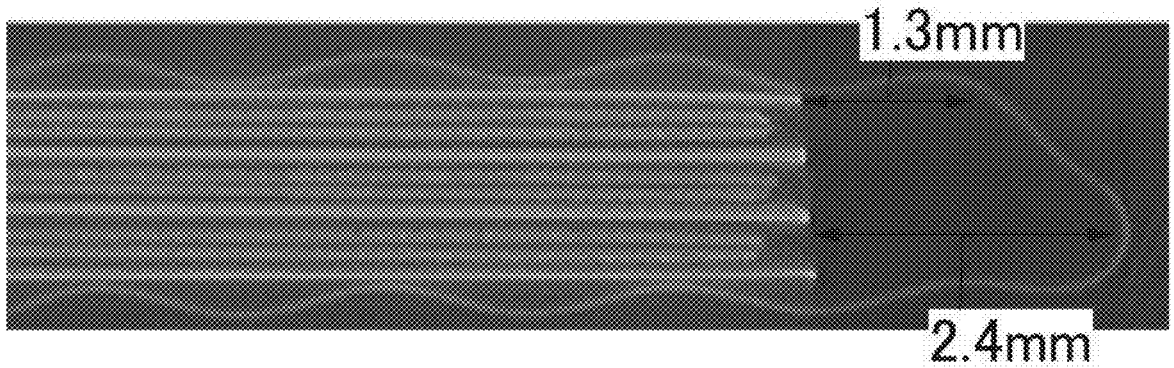

FIG. 22B is an enlarged view of an X-ray CT image of Sample 2 whose folded portion was observed from the lateral direction. The folded portion of Sample 2 had a distorted shape that was bilaterally asymmetric. In addition, Sample 2 included not only a portion in which the distance between the electrode stack and the interior wall of the film was as large as approximately 2.4 mm but also a portion in which the distance between the electrode stack and the interior wall of the film was as small as approximately 1.3 mm, which demonstrates that an enough space was not formed unlike in Sample 1. Furthermore, as shown in FIG. 22B, one end portion of the electrode stack was partly in contact with the film, which implies that the one end portion of the electrode stack and the film might rub against each other when the battery is bent.

The above results indicate that the folded portion can be formed symmetrically in the thickness direction when the phases of waves of the film are made to be different from each other by 180°. The above results also show that planarizing a portion of the film to be the folded portion such that crest lines are connected prevents any wave from being located in a portion where a space is formed, allowing the space to be formed larger also in the thickness direction.

Example 2

Results of a tensile test for a film will be described below.

For the test, the film which is the same as that used in Example 1 was used. The test specimen was a rectangle with a size of 15 mm×100 mm.

In the tensile test, the test specimen was sandwiched by clamps and force required for tension was measured while the distance between the clamps in the tensile direction was varied. The distance between the clamps before the test specimen was under tension is 50 mm. For the test, EZ graph (produced by Shimadzu Corporation) was used.

Figure 23:
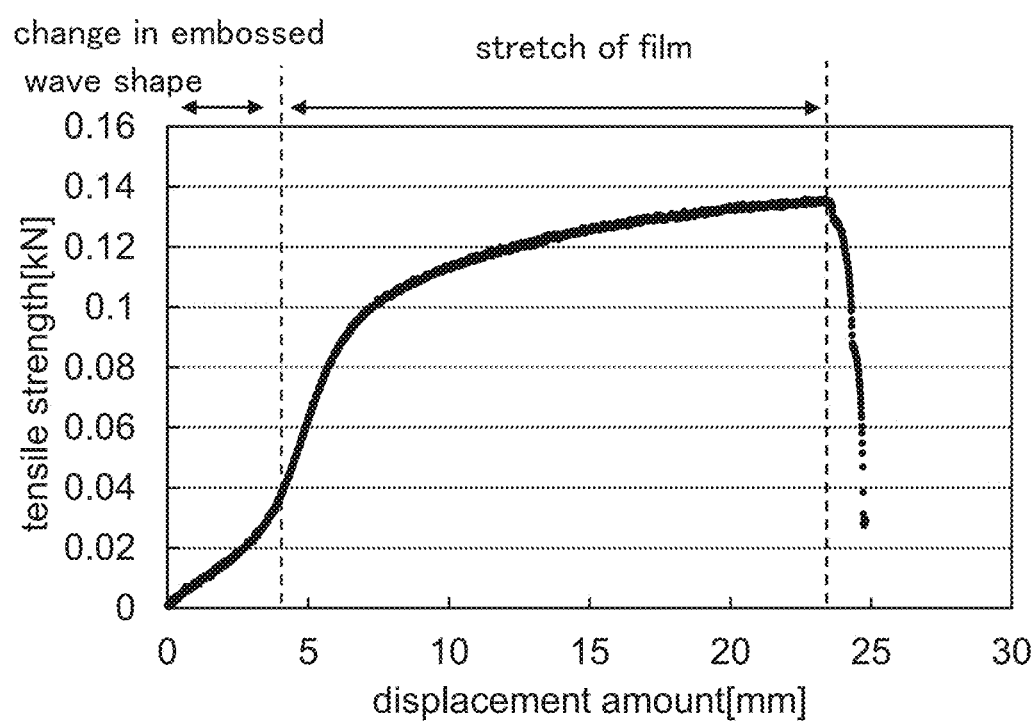
FIG. 23 shows the tensile test results of a film of Example 2.

FIG. 23 shows the results of the tensile test. The horizontal axis represents the displacement amount of the test specimen, and the vertical axis represents tensile strength. The tensile strength linearly varies with a gentle slope until the displacement amount reaches approximately 4 mm, which shows that the embossed wave shape was changed so as to be stretched. This suggests that the film can be changed in form with weak force. The tensile strength rapidly increases after the displacement amount reaches approximately 4 mm, which implies that the test specimen itself was stretched.

Thus, the use of an embossed layered film that can be easily stretched for an exterior body of a battery enables fabrication of the battery that can be flexibly bent.

Example 3

In this example, batteries of one embodiment of the present invention were fabricated and influences on the sealing capability of the batteries by bend tests were examined. Specifically, the amount of moisture entry into the film of each of samples subjected to the bend test and samples not subjected to the bend test was measured.

The batteries used in this example were fabricated by the same method as that for Sample 1 of Example 1 except for the film bonding temperature. That is, the film of each of the batteries was folded such that wave crest lines substantially overlap with each other and wave trough lines substantially overlap with each other. The film bonding for side sealing portions and a top sealing portion was performed at 185° C.

The length of the top sealing portion and the length of the side sealing portions of each of the fabricated batteries are approximately 15 mm and 52 mm, respectively. As an electrolytic solution, approximately 400 µL of propylene carbonate (PC) was used.

The measurement of the amount of moisture entry into each of the films was performed by the following method. First, an autoclave into which water was poured was prepared and the fabricated batteries were put in the autoclave so as to be immersed. Then, the autoclave was put in a thermostat kept at 120° C., and the batteries were boiled for approximately 25.5 hours. After that, the batteries were taken out, and the films were each opened in a glove box and 400 µL of PC was added. The added PC and the electrolytic solution in each of the batteries were mixed well to obtain about 0.3 g of the mixture. Then, the amount of moisture in the obtained mixture was measured with the Karl Fischer moisture meter (MKC 610 produced by Kyoto Electronics Manufacturing Co., Ltd.). The amount of moisture entry into each of the films was estimated by subtracting the amount of moisture originally contained in PC itself from the measured amount of moisture.

The following four kinds of batteries were used for the measurement of the amount of moisture entry. The first battery is the one not subjected to the bend test (Condition 1). The second battery is the one repeatedly bent 10000 times with a curvature radius of 40 mm (Condition 2). The third battery is the one heated at 160° C. for 15 minutes after being fabricated (Condition 3). The fourth battery is the one heated at 160° C. for 15 minutes after being fabricated, and repeatedly bent 10000 times with a curvature radius of 40 mm (Condition 4).

Figure 24A:
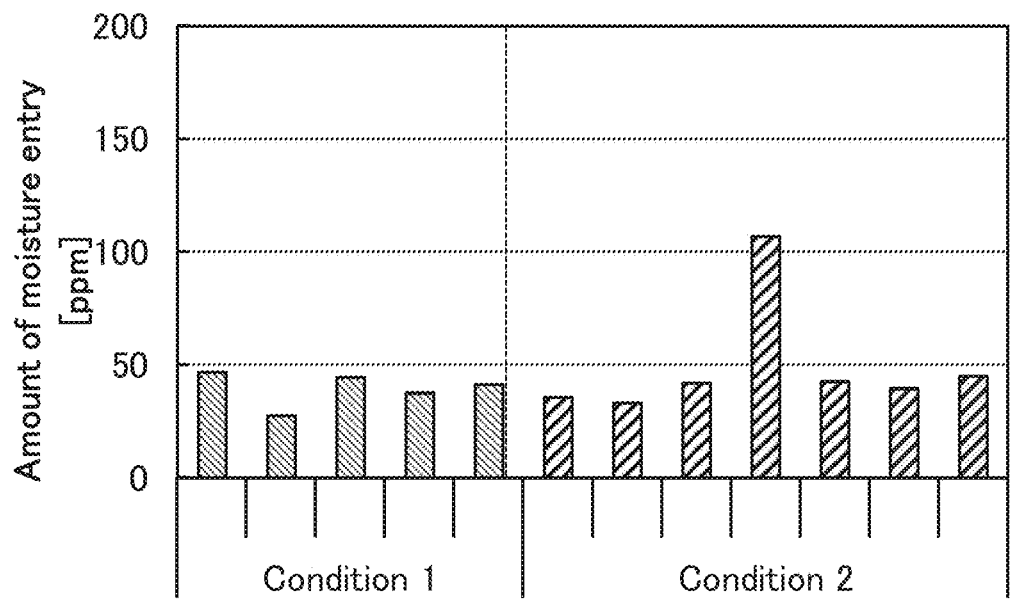
FIGS. 24A and 24B show the measurement results of the amounts of moisture entry of Example 3.

FIG. 24A shows the measured amount of moisture entry of the batteries of Conditions 1 and 2. The number of measurement samples of Condition 1 is 5, and the number of measurement samples of Condition 2 is 7 The amount of moisture entry of the samples of Condition 2 repeatedly bent was substantially equal to that of the samples of Condition 1. This demonstrates that repeated bends do not degrade the sealing capability of the film. Note that the amount of moisture entry of one of the samples of Condition 2 was outstandingly larger than that of the rest but was less than 110 ppm, which is low enough to ensure the sealing capability of the battery.

Figure 24B:
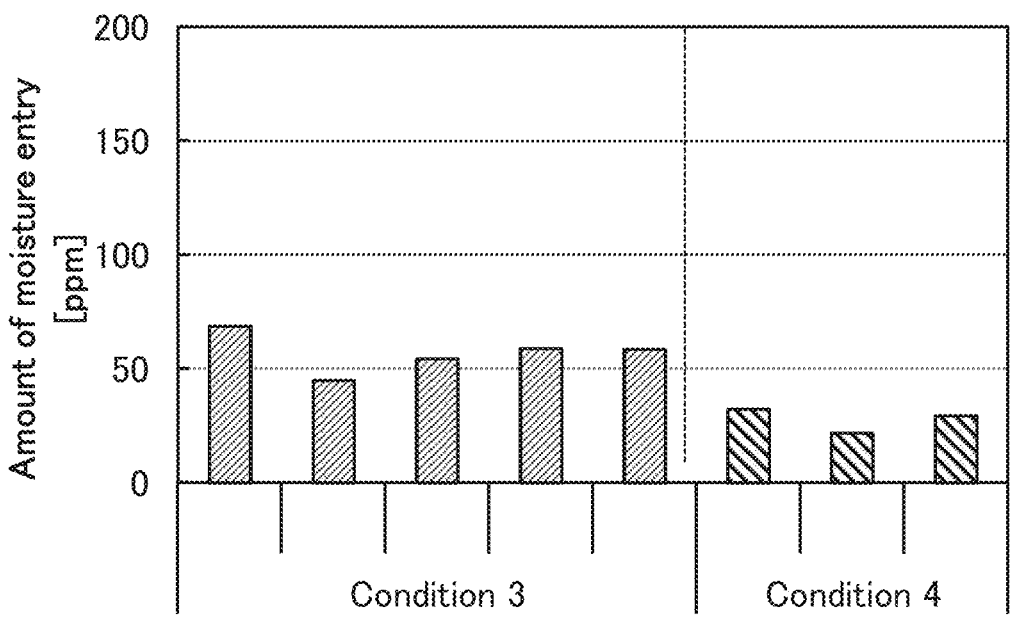

FIG. 24B shows the measured amount of moisture entry of the batteries of Conditions 3 and 4. The number of measurement samples of Condition 3 is 5, and the number of measurement samples of Condition 4 is 3. The measurement results of the samples of Condition 3 indicate that sufficient sealing capability can be ensured even after heating. The measurement results of the samples of Condition 4 indicate that repeated bends after heating do not degrade the sealing capability. Note that the following tendency was observed: the sealing capability of the samples of Condition 4 was slightly better than that of the samples of Condition 3.

The above results demonstrate that the battery of one embodiment has sufficient resistance to repeated bends and a high-temperature environment.

Example 4

In this example, batteries were fabricated using exterior bodies with different thicknesses, and force required to bend each of the batteries was measured.

In this example, batteries (Sample 3, Sample 4, and Sample 5) were fabricated using the following three kinds of exterior bodies. The exterior body used for each of the samples is an aluminum laminated film in which polypropylene, aluminum foil, and nylon are stacked. For Sample 3, the film with a total thickness of approximately 110 μm in which the thickness of aluminum foil is approximately 40 μm was used. For Sample 4, the film with a total thickness of approximately 70 μm in which the thickness of aluminum foil is approximately 30 μm was used. For Sample 5, the film with a total thickness of approximately 50 μm in which the thickness of aluminum foil is approximately 20 μm was used.

Note that Samples 3 to 5 were fabricated by the same method as that in Example 3 except for the material of the exterior body.

Figure 25A:
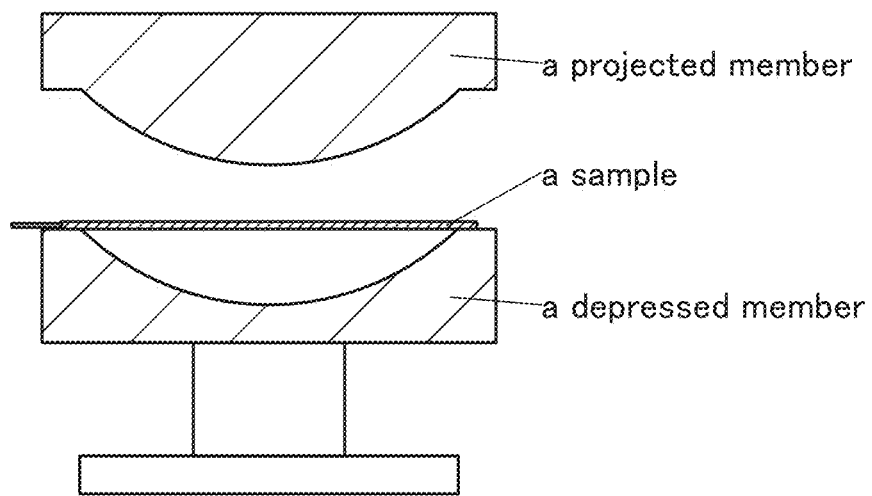
FIGS. 25A and 25B illustrate a measurement method of Example 4.
Figure 25B:
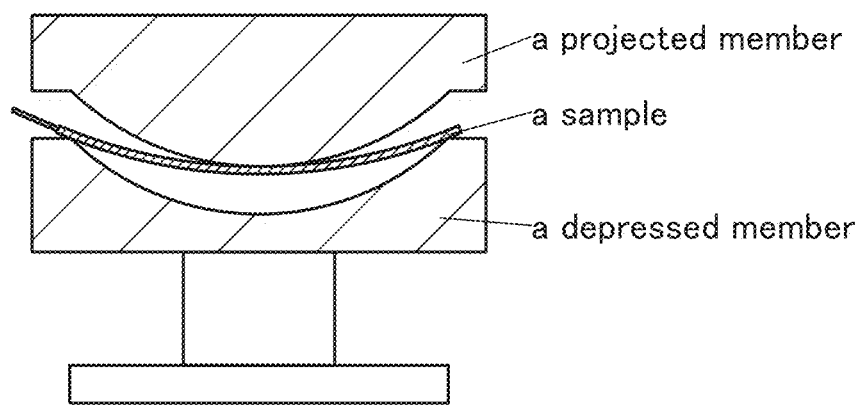

Next, force required to bend each of the fabricated three samples was measured by the following method. FIGS. 25A and 25B are schematic views illustrating the measurement method, A measurement apparatus includes a depressed member on the lower side and a projected member on the upper side. The curvature radius of a curved surface of the depressed member and the projected member is 30 mm. Each sample was positioned such that end portions thereof were supported by edge portions of a depressed portion of the depressed member. Then, as illustrated in FIG. 25B, the projected member was displaced downward while a projected portion of the projected member was pressed against the sample, whereby the sample in the state of being flat was curved. Force required to displace the projected member downward was measured to estimate force required to bend the sample. For the measurement, a compact table-top precision universal tester (EZ-Graph) manufactured by Shimadzu Corporation was used.

Figure 26:
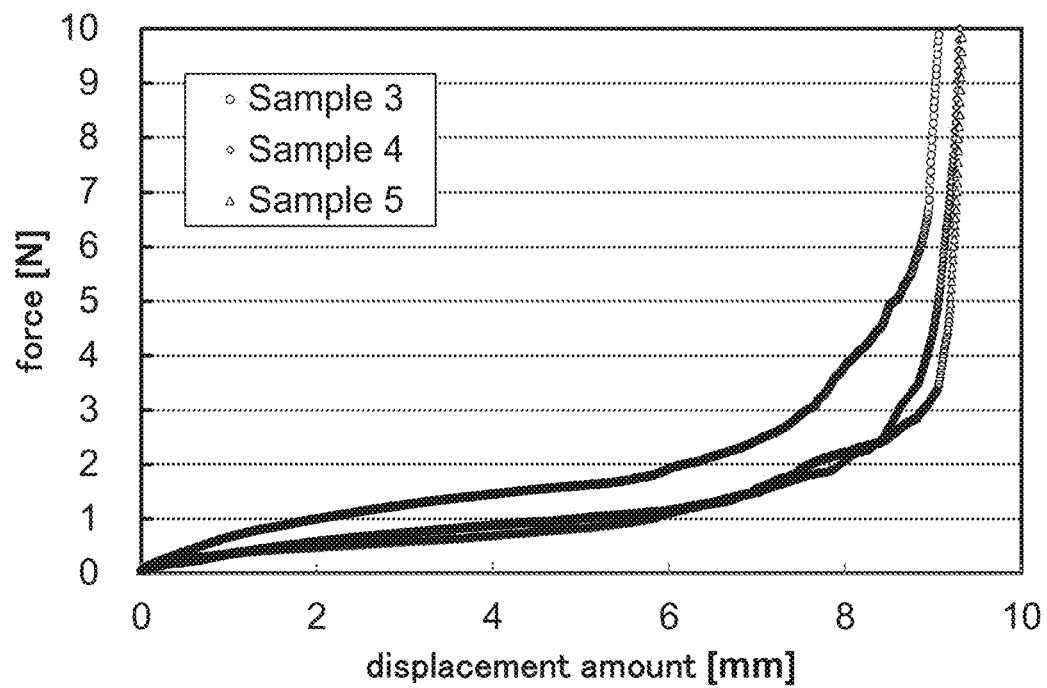
FIG. 26 shows the measurement results of force required to bend batteries of Example 4.

FIG. 26 shows the measurement results. In FIG. 26, the horizontal axis represents the displacement amount of the projected member, and the vertical axis represents force required for displacement. An increase in force required for a bend from a displacement amount of approximately 6 mm in FIG. 26 is due to the state where the bottom surface of the sample was in contact with the top surface of the depressed member and force applied so as to press the sample was dominant.

Force required to bend each of the samples was 2N or less when the displacement amount was 6 mm or less, which indicates that the batteries are capable of easily bent.

In addition, as shown in FIG. 26, the following tendency was observed: force required to bend each of the samples increased as the displacement amount increased, that is, the curvature radius of the sample decreased. This is due to the fact that each battery is resilient and force to return to the original form increases as the curvature radius decreases. In particular, the film processed to have a wave shape was used as the exterior body; restoring force of the exterior body was presumably dominant.

Comparison between the results of the samples in FIG. 26 shows that force required for a bend decreases as the thickness of the exterior body decreases. For example, when the displacement amount was 4 mm, force required to bend Sample 3 was approximately twice as strong as that required to bend Sample 5, and this difference is substantially equal to the difference in thickness between Samples 3 and 5. Meanwhile, force required to bend Sample 4 was approximately 1.3 times as strong as that required to bend Sample 5. Since the thickness of Sample 4 is approximately 1.4 times that of Sample 5, the difference in force required for bending between Samples 4 and 5 is substantially equal to the difference in thickness between Samples 4 and 5. These results imply that force required to a bend is proportional to the thickness of the film used as the exterior body.

The above results indicate that the battery of one embodiment of the present invention requires extremely weak force for a bend owing to the use of a film having a wave shape as the exterior body, and that reduction in the thickness of the exterior body enables a bend with weaker force.

Example 5

In this example, a watch band incorporating the battery of one embodiment of the present invention was fabricated.

First, a method for fabricating the band will be described. The band was fabricated by the following method. The method for fabricating the band will be described with reference to FIGS. 27A to 27E.

Figure 27A:
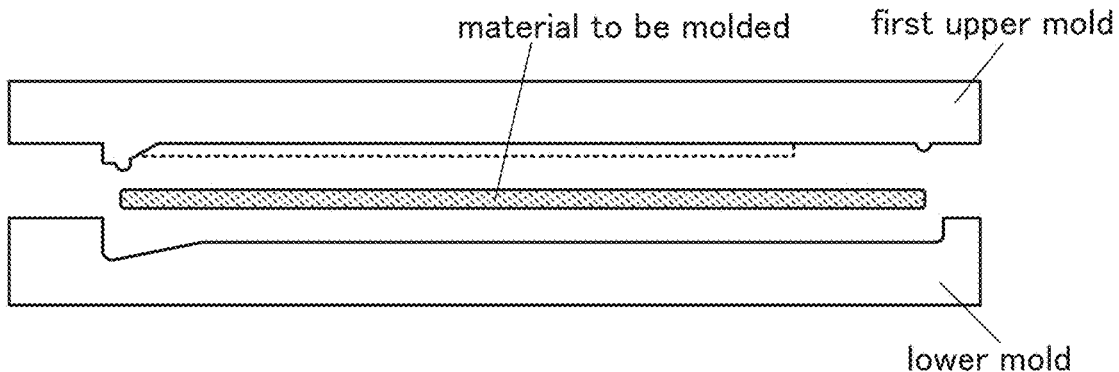
FIGS. 27A to 27E illustrate a method for fabricating a band of Example 5.
Figure 27B:
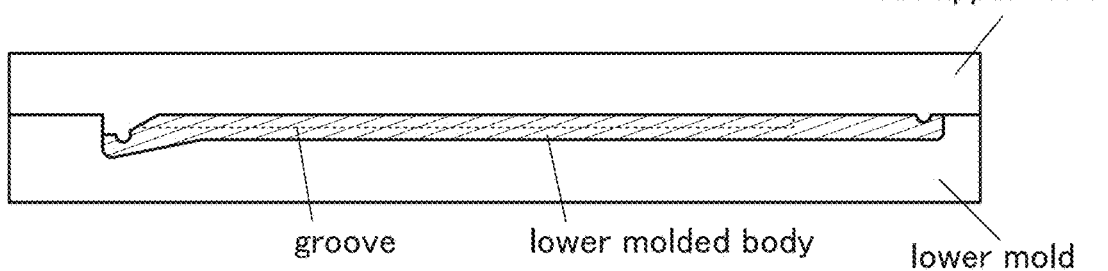

First, a lower mold and a first upper mold were pressed against a material to be molded that was sandwiched therebetween and the material was cured with the lower mold and the first upper mold fitting together, so that a lower molded body was formed (FIGS. 27A and 278). Here, as illustrated in FIG. 27B, a groove was formed in part of the lower molded body.

Figure 27C:
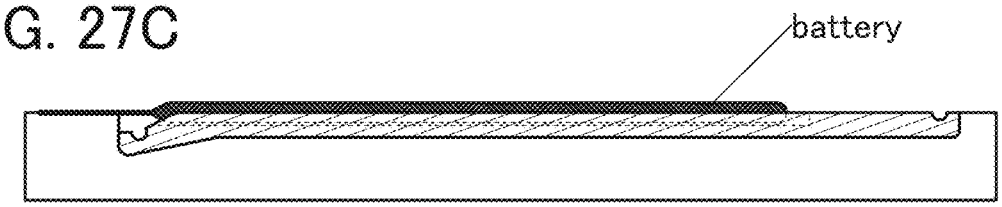

Then, the first upper mold was removed and the battery was placed to be fitted in the groove of the lower molded body (FIG. 27C).

Figure 27D:
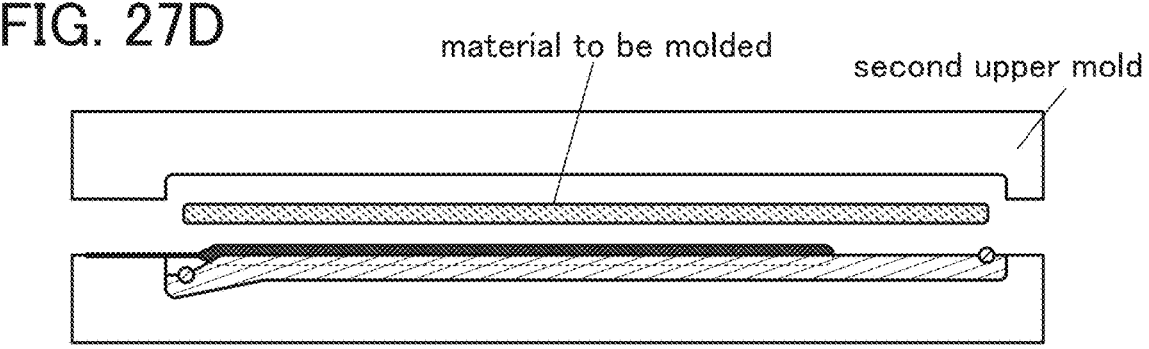

After that, a second upper mold and the lower mold were pressed against a material to be molded that was positioned between the battery and the second upper mold and the material was cured with the second upper mold and the lower mold fitting together (FIG. 27D).

Figure 27E:
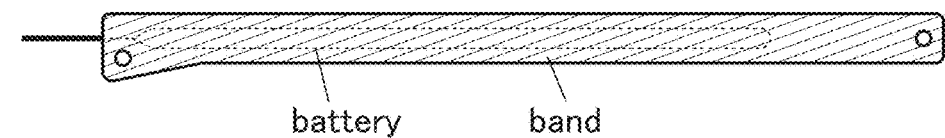

After that, the second upper mold and the lower mold were removed, so that the band incorporating the battery was fabricated (FIG. 27E).

In this example, Sample 6 using a millable silicone raw material as a material to be molded and Sample 7 using a liquid silicone raw material as a material to be molded were fabricated. For Sample 6, a battery fabricated by a method similar to that for Sample 3 described in Example 4 was used, and for Sample 7, a battery fabricated by a method similar to that for Sample 5 described in Example 4 was used.

Figure 28A:
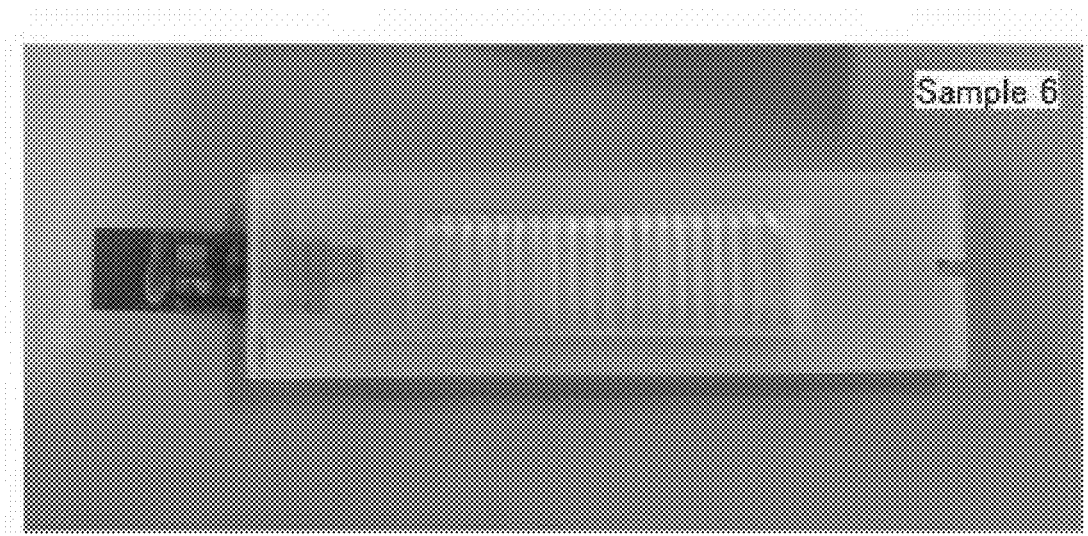
FIGS. 28A and 28B are photographs showing a band incorporating a battery of Example 5.
Figure 28B:
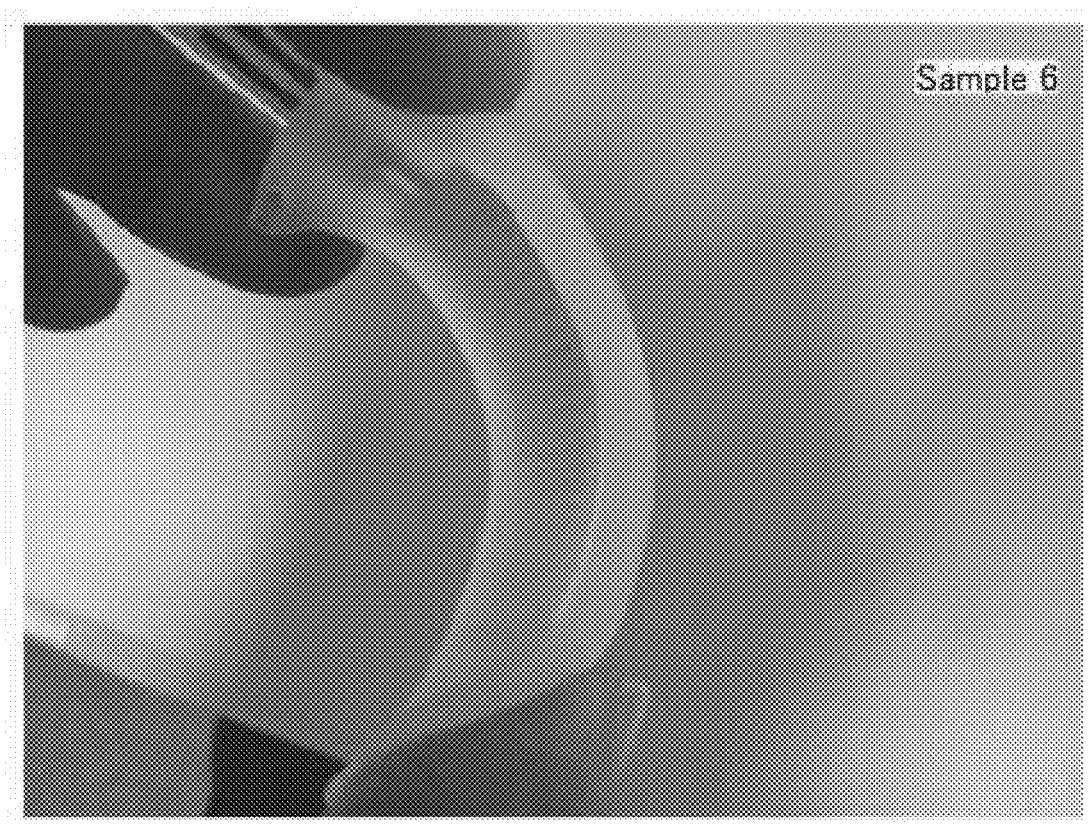

FIG. 28A is a photograph showing the appearance of the top surface of Sample 6. FIG. 28A shows that the battery was incorporated in a milk-white silicone rubber. FIG. 28B is a photograph showing the state where a portion of the band in which the battery was located was bent.

Figure 29A:
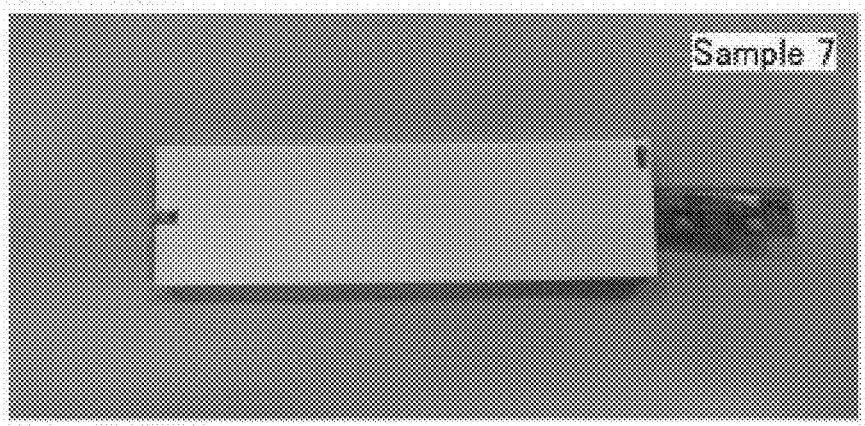
FIGS. 29A to 29C are photographs showing a band incorporating a battery of Example 5.
Figure 29B:
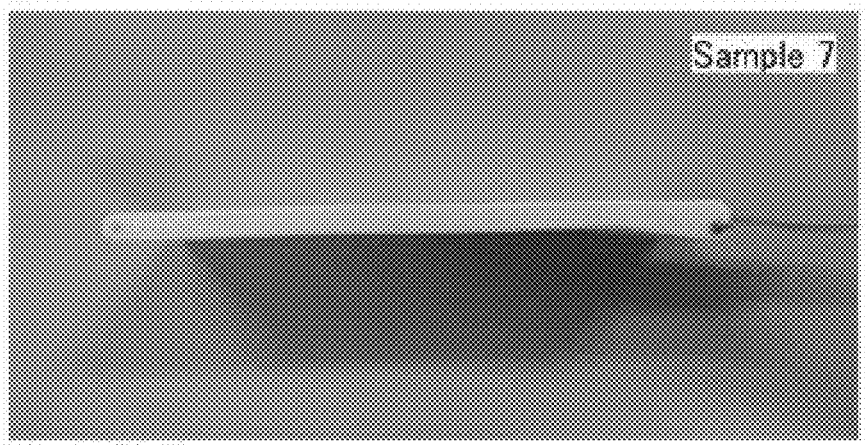
Figure 29C:
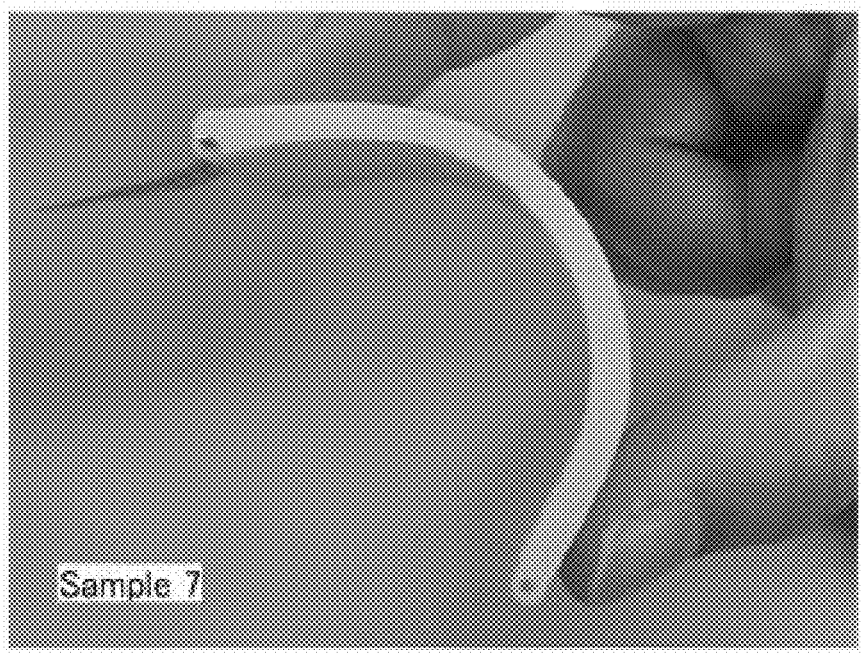

FIGS. 29A and 29B are photographs showing the appearances of the top surface and a side surface of Sample 7, respectively. The rubber molded body of Sample 7 was deeper milk-white than that of Sample 6 but was slightly transparent, and it was confirmed that the wave shape of the exterior body of the incorporated battery was maintained. FIG. 29C is a photograph showing the state where a portion of the band in which the battery was located was bent. The thickness of the film used for the exterior body of Sample 7 was smaller than that of the film used for the exterior body of Sample 6; thus, Sample 7 had higher flexibility and was capable of being bent with weaker force.

A rubber molded body incorporating the battery of one embodiment of the present invention can be fabricated in the aforementioned manner where an exterior body is covered with rubber and the rubber is molded. Although the shape of a watch band was formed here, one embodiment of the present invention is not limited thereto and the battery of one embodiment of the present invention can be used in any of various rubber molded bodies.

Example 6

In this example, results of bend tests of fabricated batteries of one embodiment of the present invention will be described.

In this example, the following three kinds of samples, Sample 8, Sample 9, and Sample 10 were fabricated.

An aluminum laminated film in which polypropylene, aluminum foil, and nylon are stacked was used as an exterior body of each of Sample 8, Sample 9, and Sample 10. The thickness of aluminum foil is approximately 20 μm, and the total thickness of the film is 50 μm. Furthermore, the film was processed to have a wave pitch of 2 mm and a height difference between a crest surface and a trough surface of 0.5 mm.

Sample 8, Sample 9, and Sample 10 were fabricated by the same method as that in Example 1 except for how to fold the film.

Sample 8 was obtained by folding the film such that the phases of waves are different from each other by 180°, that is, the wave crest lines overlap with each other and the wave trough lines overlap with each other.

Sample 9 was obtained by folding the film such that the phases of waves are different from each other, specifically, by approximately 90°.

Sample 10 was obtained by folding the film such that the phases of waves are coordinate, that is, wave crest lines of one of portions overlap with wave trough lines of the other portion.

Figure 30A:
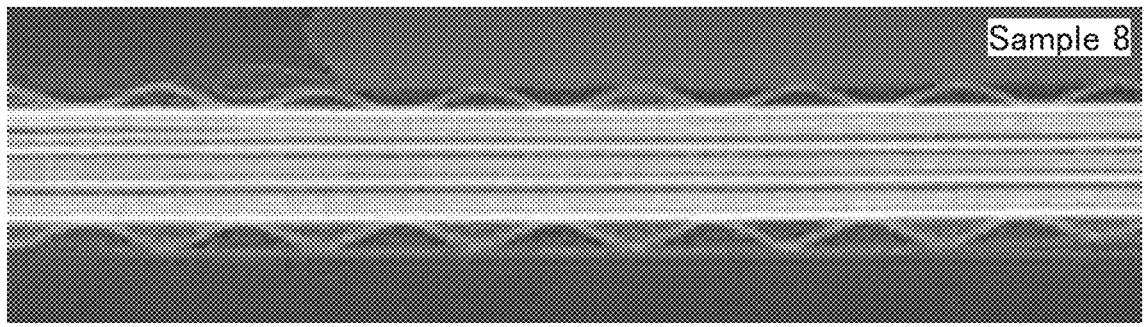
FIGS. 30A to 30C are X-ray images of batteries of Example 6.
Figure 30B:
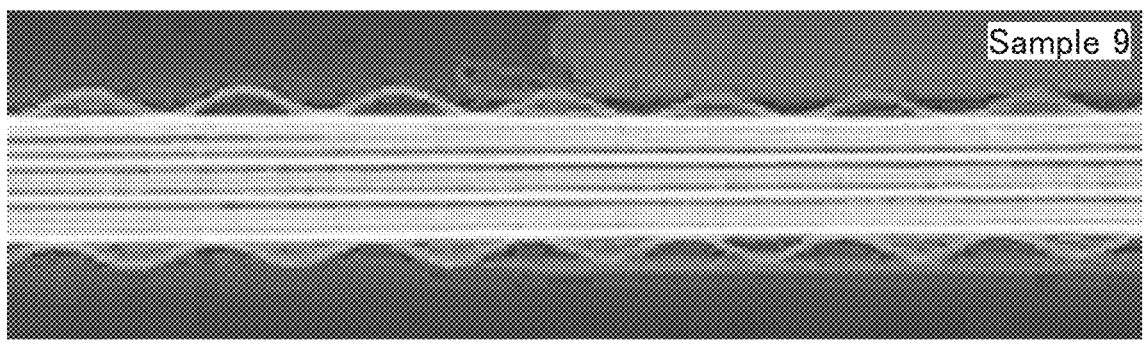
Figure 30C:
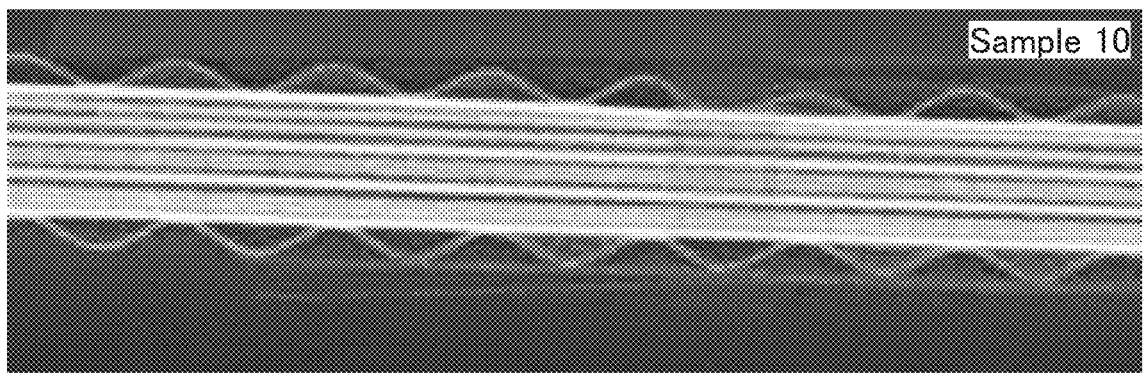

FIGS. 30A, 30B, and 30C are transmission X-ray photographs of Sample 8, Sample 9, and Sample 10, respectively. The photographs show that although the phases of the waves of part of a pair of portions of each of the films were slightly different because of a film bonding step, desired shapes were substantially obtained.

Subsequently, the bend test was performed on each of Sample 8, Sample 9, and Sample 10. For the test, each sample was repeatedly bent and unbent 10000 times with a curvature radius between 40 mm (in bending) and 150 mm (in unbending).

Figure 31A:
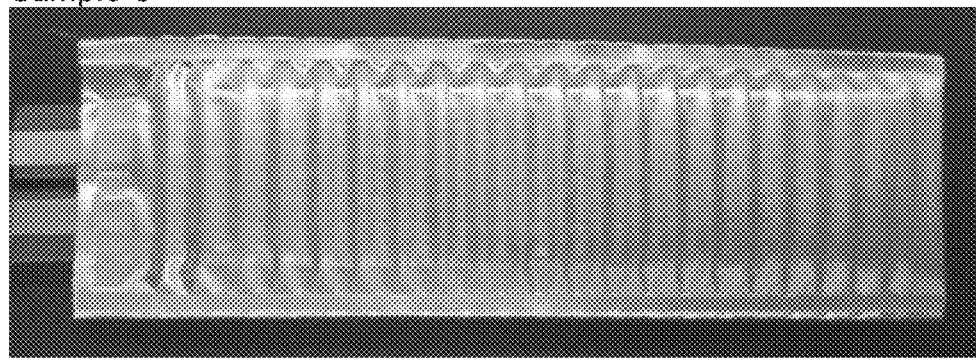
FIGS. 31A to 31C are photographs showing the appearances of batteries of Example 6.
Figure 31B:
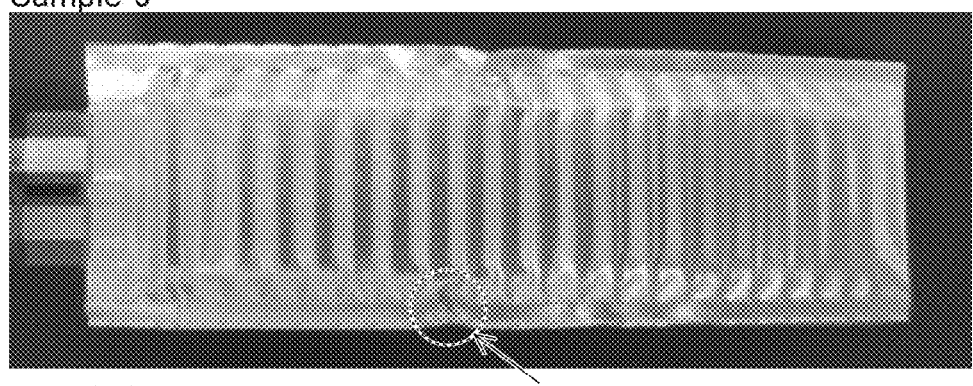
Figure 31C:
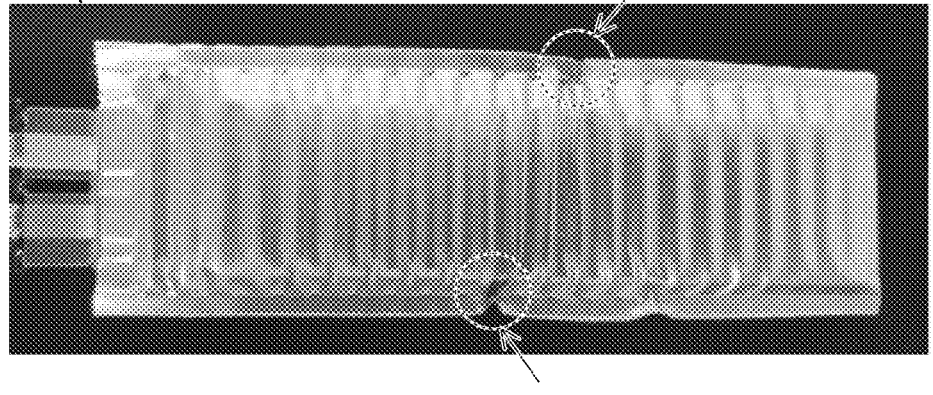

FIGS. 31A, 31B, and 31C are photographs showing the appearances of the samples after the bend tests.

As shown in FIG. 31A, there was no significant change in the appearance of Sample 8 even after the bend test. As shown by the broken line in FIG. 31B, side sealing portions of Sample 9 were partly changed; however, there was no leakage of an electrolytic solution. In contrast, side sealing portions of Sample 10 were partly significantly distorted as shown by the broken lines in FIG. 31C. In addition, it was found after the bend test performed 10000 times that there was leakage of an electrolytic solution of Sample 10.

The above results show that the side sealing portions of the samples of the condition in which the phases of waves of the film are different from each other (Sample 8 and Sample 9) did not easily change their forms compared with the side sealing portions of the sample of the condition in which the phases of waves of the film are coordinate (Sample 10). In particular, almost no change in the forms of the side sealing portions was observed in Sample 8, in which the phases of the waves of the film are different from each other by 180°, and favorable results were obtained from Sample 8.

Then, the amount of moisture entry into each of the films of Sample 8 and Sample 9 was measured and the sealing capability thereof was evaluated. The measurement of the amount of moisture entry was performed by a method similar to that in Example 3. Note that leakage of the electrolytic solution of Sample 10 was observed as described above; thus, Sample 10 was not evaluated. In addition, two Samples 8 fabricated under the same conditions and subjected to bend tests and two Samples 9 fabricated under the same conditions and subjected to bend tests were evaluated.

Figure 32:
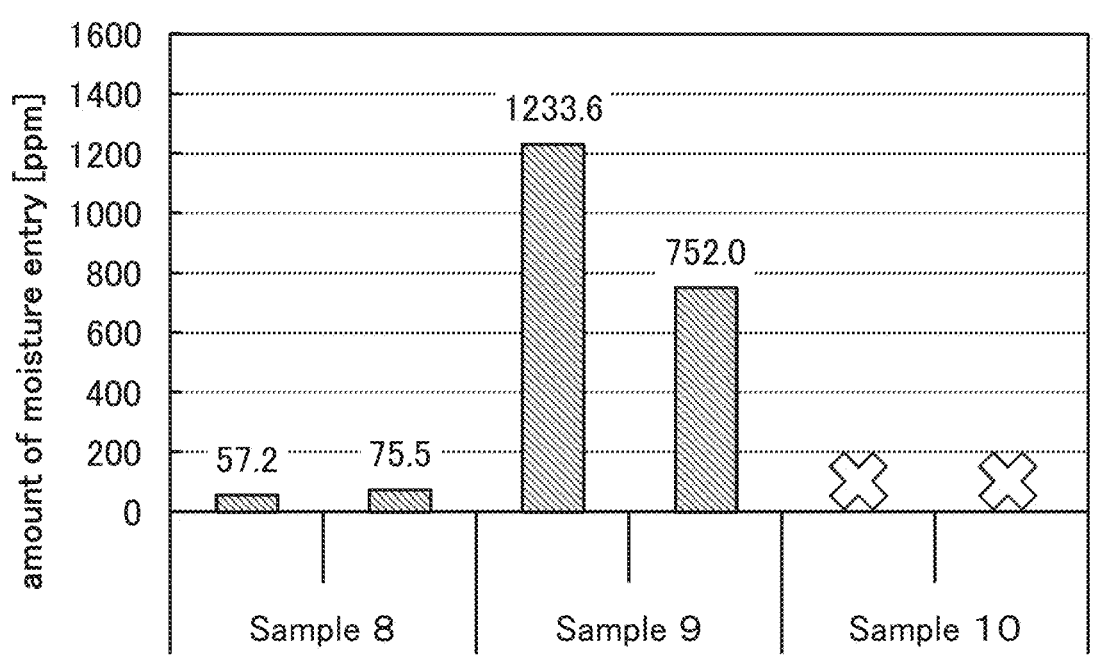
FIG. 32 shows the measurement results of the amounts of moisture entry of Example 6.

FIG. 32 shows the measured amounts of moisture entry.

The amount of moisture entry of each of Samples 8 was less than 100 ppm, which demonstrates that favorable sealing capability was maintained even after bend tests performed 10000 times. Furthermore, Sample 8 includes the film in which aluminum foil thinner than that of the sample given in Example 3 but the sealing capability of Sample 8 was similar to that of the sample given in Example 3.

The amount of moisture entry of each Sample 9 was larger than that of each Sample 8. This is presumably because there are portions in which a local change is easily caused at the position near the side sealing portions as shown in the photograph of the appearance in FIG. 31B, and repeated changes in form of the portions cause metal fatigue and produces cracks in the aluminum foil, resulting in degradation of sealing capability. In particular, the thickness of the aluminum foil of this example is much smaller than that of Example 3; thus, a marked difference in sealing capability may be observed.

Note that the process using an autoclave in water at high temperature and high pressure that was used in the tests is a check under tougher environment conditions than practical conditions, and there was no leakage of the electrolytic solution of Sample 9 due to the bend test. This suggests that practically sufficient sealing capability was ensured.

The above results indicate that even when the samples in which the phases of waves of a film are different from each other are repeatedly bent and unbent, no problems such as leakage of an electrolytic solution was caused. In particular, when the phases of waves of the film are different from each other by 180°, sealing capability was hardly degraded. In other words, when the difference between the phases of waves of the film is closer to 180°, resistance to bending and unbending is higher.

Example 7

In this example, calculation results of changes in forms of film exterior bodies with wave shapes when batteries are bent will be described.

For the calculation, two models (Model1 and Model2) are used. FIGS. 33A1 and 33A2 show Model1, and FIGS. 33B1 and 33B2 show Model2. FIGS. 33A1 and 33B1 are perspective views of Model1 and Model2, respectively, and FIGS. 33A2 and 33B2 are views of Model1 and Model2 seen from the lateral direction, respectively.

The calculation models will be described. First, for an exterior body of each battery, a structure is assumed in which two films each having a wave shape are arranged so as to be spaced and are bonded to each other in end portions in the width direction. The values of the following material properties of the films are calculated from the results of the tensile test of the aluminum laminated film obtained in Example 2: the Young's modulus is assumed to be $4.9 \times 10^9$ Pa; the yield stress is assumed to be $2 \times 10^7$ Pa; the tangent modulus is assumed to be $6.3 \times 10^9$ Pa; and the Poisson's ratio is assumed to be 0.3. For simplification of the calculation structure, it is assumed that an electrode stack is not provided in the battery.

The exterior body of the battery of Model1 is a pair of films positioned such that the phases of waves are different from each other by 180°, and the exterior body of the battery of Model2 is a pair of films positioned such that the phases of waves are coordinate.

The exterior body of each battery is assumed to change its form along a surface of a rigid body. The rigid body has a surface curved with a curvature radius of 25 mm Note that part of the rigid body is assumed to have the shape of comb teeth so that the contact condition for contact portions between crests of the battery and the rigid body is set for the convenience of the calculation.

A columnar rigid body is placed in the vicinity of an end portion of the battery, and is displaced in the vertical direction to change the form of the battery as shown by an arrow in FIG. 33A2 and the like.

For the calculation, ANSYS Mechanical APDL 14.0 manufactured by ANSYS, Inc. is used. A mesh condition for the calculation models is as follows: the element type: 285 (three-dimensional four-contact tetrahedron solid).

There is no noticeable difference between the calculated values of stress on Model1 and Model2.

Figure 34A:
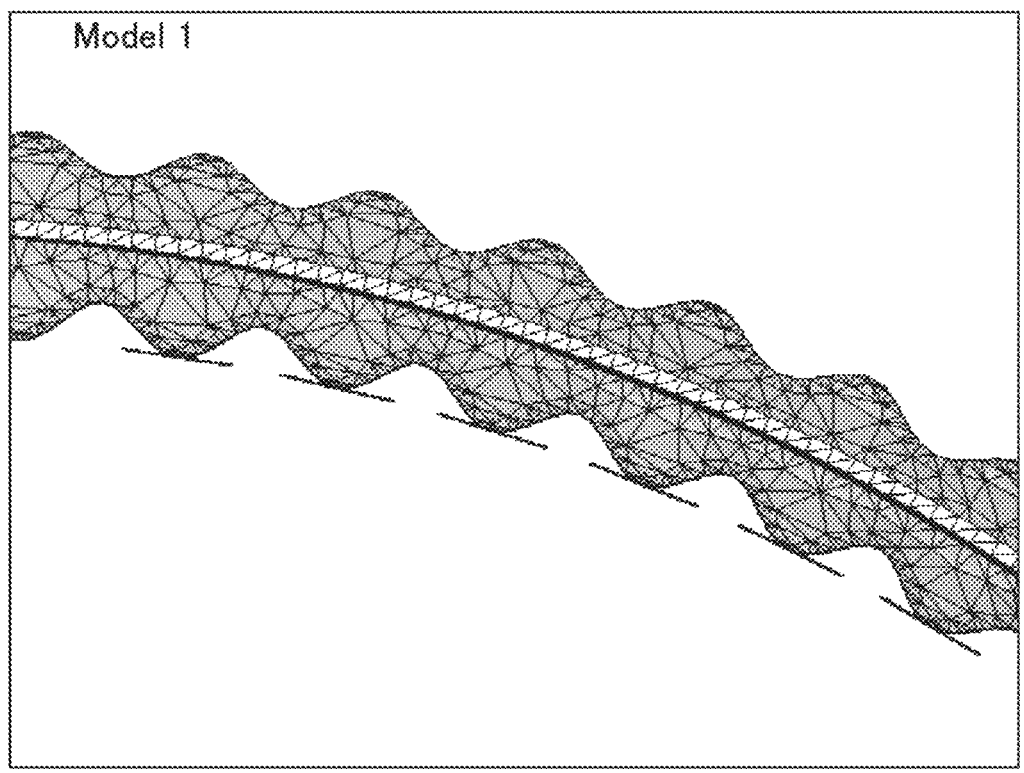
FIGS. 34A and 34B show calculation results of Example 7.
Figure 34B:
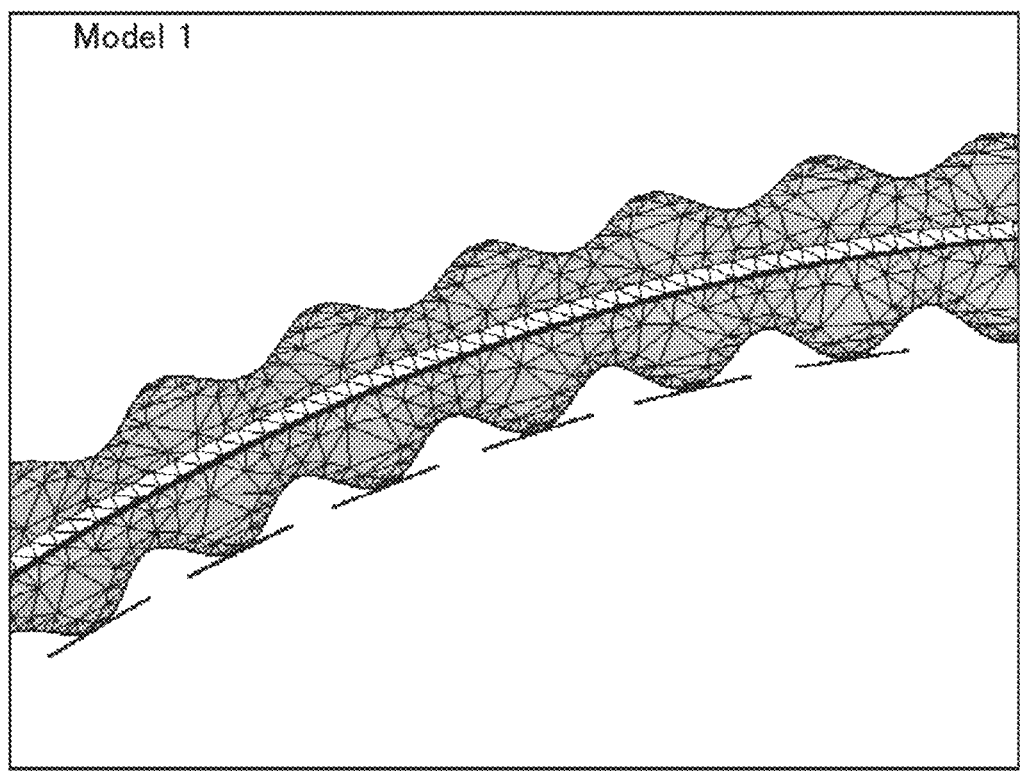
Figure 35A:
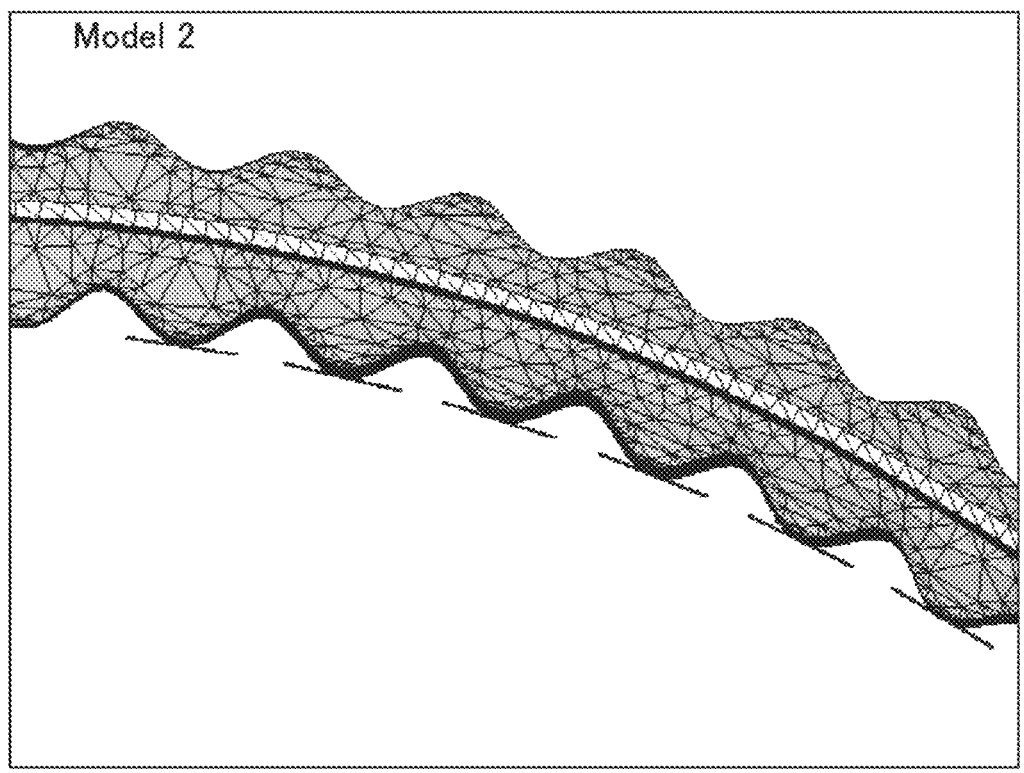
FIGS. 35A and 35B show calculation results of Example 7.
Figure 35B:
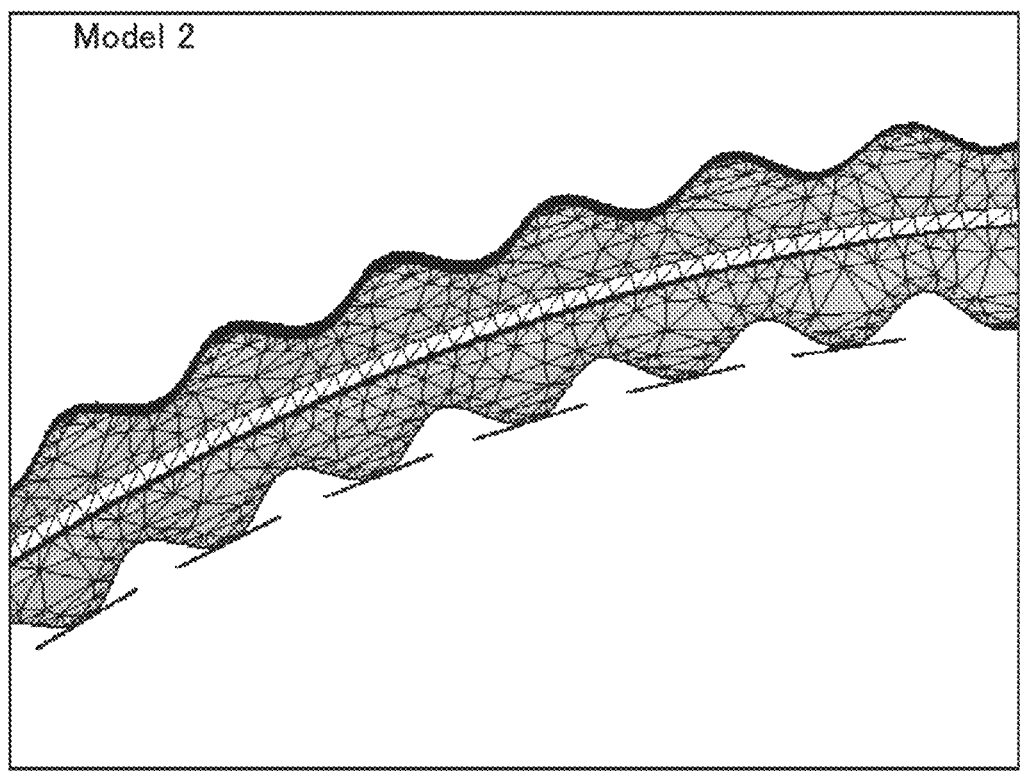

FIGS. 34A and 34B each show the shape of Model1 change in form, and FIGS. 35A and 35B each show the shape of Model2 changed in form. FIG. 34A and FIG. 35A correspond to FIGS. 33A2 and 33B2, respectively, and FIG. 34B and FIG. 35B correspond to FIGS. 33A2 and 33B2 seen from the reverse side (the back side), respectively The shape after a bend will be described. It is found that Model1 is changed in form uniformly in accordance with the bend, whereas Model2 is noticeably distorted. Specifically, calculation results of Model1 in FIGS. 34A and 34B each show a symmetric shape. In contrast, calculation results of Model2 in FIGS. 35A and 35B each show an asymmetric shape. In particular, it is observed from the FIG. 35A side that the battery is changed in form to be twisted such that the front side of the exterior body is not in contact with the surface of the rigid body.

Here, as the exterior body of each battery, a pair of films (upper and lower films) is fixed in the side sealing portions. The side sealing portions are located substantially on the neutral plane of the battery exterior body. Thus, when the battery exterior body is curved, the side sealing portions do not stretch and the form of a wave-shaped portion between the pair of side sealing portions mainly is changed.

When one of the films is bent, it changes its form with a trough line portion near the neutral plane as a starting point. A crest line portion between two trough line portions changes its form in accordance with a change in the forms of two trough line portions on both sides of the crest line portion. Thus, the pair of films changes its form with the trough line portions as starting portions. For this reason, a portion between two trough line portions proximate to each other with the neutral plane therebetween is presumably most likely to change its form.

In Model1, the difference between the phases of waves is 180° and thus the distance between two trough line portions proximate to each other with the neutral plane therebetween is the shortest; accordingly, Model1 is easy to bend.

In addition, in Model1, a straight line connecting two trough line portions proximate to each other with the neutral plane therebetween passes through the center of bending when the battery exterior body is seen from the lateral direction. That is probably why Model1 changes its form with less distortion as shown in FIGS. 34A and 34B.

In contrast, in Model2, the phases of waves are coordinate and thus the distance between two trough line portions proximate to each other with the neutral plane therebetween is the longest; accordingly, Model2 is not easy to bend.

In addition, in Model2, one trough line portion is proximate to two trough line portions located on the reverse side with the neutral plane between the one trough line portion and the two trough line portions. That is, two portions per trough line portion most easily change their forms. Furthermore, when the battery exterior body is seen from the lateral direction, there are two straight lines connecting one trough line portion and trough line portions proximate to the one trough line portion, and both the straight lines do not pass through the center of bending and cross at the one trough line portion. This is a difference from Model1. The forms of the two portions per trough line portion that easily change their forms do not change in the same degree, and the form of one of the portions can change more greatly than the other portion.

Note that which portion easily changes its form is not uniquely determined; thus, a portion in which both the forms of the two portions that most easily change their forms are greatly changed can be locally generated when the battery exterior body is bent. The significantly distorted portions shown in FIGS. 35A and 35B probably correspond to the two portions. This description agrees with the result that the side sealing portions of Sample 10 in which the phases of the waves are coordinate were partly significantly distorted because of the bend test as in Example 6.

The above results indicate that the structure of a battery exterior body where the phases of waves are completely coordinate as in Model2 is not suitable for a bend and the structure where the phases of waves are different from each other is preferred. Furthermore, the structure of a battery exterior body where the phases of waves are different from each other by 180° as in Model1 is the most preferred.

EXPLANATION OF REFERENCE

10: battery, 11; exterior body, 12: stack, 13: electrode, 13a: electrode, 13b: electrode, 21: crest line, 21a: crest line, 21b: crest line, 22: trough line, 22a: trough line, 22b: trough line, 25: space, 31: portion, 31a: portion, 31b: portion, 32: folded portion, 33: bonding portion, 34: bonding portion, 41: electrode, 42: electrode, 43: electrode, 50: film, 51: mold, 52: mold, 53: mold, 54: mold, 55: embossing roll, 55a: projection, 56: embossing roll, 56a: projection, 57: roll, 60: direction, 61: film, 62: film, 63: projection, 64: space, 71: region, 72: positive electrode current collector, 73 separator, 74: negative electrode current collector, 75: sealing layer, 76: lead electrode, 77: electrolytic solution, 78: positive electrode active material layer, 79: negative electrode active material layer, 80: plane, 90: plane, 7100: mobile phone, 7101: housing, 7102: display portion, 7103: operation button, 7104: secondary battery, 7105 lead electrode, 7106: current collector, 7400: mobile phone, 7401: housing, 7402: display portion, 7403: operation button, 7404: external connection port, 7405; speaker, 7406: microphone, 7407: secondary battery, 7408 lead electrode, 7409: current collector, 7600: vacuum cleaner, 7601: lead electrode, 7602: lead electrode, 7603: operation button, 7604: secondary battery, 7605: secondary battery, 7606: display portion, 8021: charging apparatus, 8022: cable, 8100: automobile, 8101; headlight, 8200: automobile This application is based on Japanese Patent Application serial no. 2015-210931 filed with Japan Patent Office on Oct. 27, 2015, Japanese Patent Application serial no. 2015-240157 filed with Japan Patent Office on Dec. 9, 2015, and Japanese Patent Application serial no. 2015-245916 filed with Japan Patent Office on Dec. 17, 2015, the entire contents of which are hereby incorporated by reference.

What is claimed is:

1. A battery comprising:
an exterior body;
a stack in the exterior body; and
an ionic liquid in the exterior body,
wherein the exterior body has a film-like form and is folded in half with the stack between facing portions of the exterior body,
wherein the exterior body includes a pair of first portions, a second portion, a pair of third portions, and a fourth portion,
wherein the pair of first portions overlaps with each other,
wherein each of the first portion is surrounded by the second portion, the pair of third portions, and the fourth portion and includes a portion overlapping with the stack,
wherein the second portion is a folded portion located between the pair of first portions,
wherein the pair of third portions is belt-like portions located opposite to each other with each of the first portions therebetween and extending in a direction intersecting with the second portion,
wherein the fourth portion is a belt-like portion located opposite to the second portion with the first portion therebetween,
wherein the exterior body is bonded in the third portions and the fourth portion,
wherein the stack comprises a first positive electrode current collector and a second positive electrode current collector,
wherein a first positive electrode active material layer is provided on a first surface of the first positive electrode current collector,
wherein a second positive electrode active material layer is provided on a first surface of the second positive electrode current collector, and
wherein a second surface of the first positive electrode current collector is in contact with a second surface of the second positive electrode current collector.

2. The battery according to claim 1,
wherein in an area surrounded by the exterior body, the stack and the second portion are not in contact with each other but there is a space between the stack and the second portion.

3. The battery according to claim 1,
wherein the first positive electrode current collector slide with respect to the second positive electrode current collector when the battery is bent.

4. The battery according to claim 1,
wherein in a plan view of the exterior body, each of the third portions in an extension direction thereof is longer than a total length of one of the first portions, the second portion, and the fourth portion in a direction parallel to the extension direction of the third portions.

5. The battery according to claim 1,
wherein each of the first portions has a wave shape in which a plurality of crest lines and a plurality of trough lines are parallel to each other and alternately located, and
wherein each of the third portions is flat.

6. The battery according to claim 5,
wherein each of the first portions includes a region in which a length of a wave period increases and a wave amplitude decreases as a distance from the second portion decreases.

7. The battery according to claim 5,
wherein the pair of first portions of the exterior body includes a region in which the crest lines of one first portion do not overlap with the trough lines of the other first portion.

8. The battery according to claim 5,
wherein the pair of first portions includes a region in which the crest lines thereof overlap with each other and the trough lines thereof overlap with each other.

9. The battery according to claim 5,
wherein one of the crest lines is located between the second portion and the trough line of the first portion that is located closest to the second portion.

10. The battery according to claim 1,
wherein a distance between an end portion of the stack on the second portion side and an interior surface of the exterior body of the battery in the state of being unbent is greater than or equal to $\pi \times t$ when a thickness of the stack is 2t.

11. The battery according to claim 1,
wherein the ionic liquid includes ethylmethylimidazolium cation.

12. A battery comprising:
A battery comprising:
an exterior body;
a stack in the exterior body; and
an ionic liquid in the exterior body,
wherein the exterior body has a film-like form and is folded in half with the stack between facing portions of the exterior body,
wherein the exterior body includes a pair of first portions, a second portion, a pair of third portions, and a fourth portion,
wherein the pair of first portions overlaps with each other,
wherein each of the first portion is surrounded by the second portion, the pair of third portions, and the fourth portion and includes a portion overlapping with the stack,
wherein the second portion is a folded portion located between the pair of first portions,
wherein the pair of third portions is belt-like portions located opposite to each other with each of the first portions therebetween and extending in a direction intersecting with the second portion,
wherein the fourth portion is a belt-like portion located opposite to the second portion with the first portion therebetween,
wherein the exterior body is bonded in the third portions and the fourth portion,
wherein each of the first portion includes a plurality of projections and depressions,
wherein the stack comprises a first positive electrode current collector and a second positive electrode current collector,
wherein a first positive electrode active material layer is provided on a first surface of the first positive electrode current collector,
wherein a second positive electrode active material layer is provided on a first surface of the second positive electrode current collector, and
wherein a second surface of the first positive electrode current collector is in contact with a second surface of the second positive electrode current collector.

13. The battery according to claim 12,
wherein in an area surrounded by the exterior body, the stack and the second portion are not in contact with each other but there is a space between the stack and the second portion.

14. The battery according to claim 12,
wherein the first positive electrode current collector slide with respect to the second positive electrode current collector when the battery is bent.

15. The battery according to claim 12,
wherein in a plan view of the exterior body, each of the third portions in an extension direction thereof is longer than a total length of one of the first portions, the second portion, and the fourth portion in a direction parallel to the extension direction of the third portions.

16. The battery according to claim 12,
wherein a distance between an end portion of the stack on the second portion side and an interior surface of the exterior body of the battery in the state of being unbent is greater than or equal to $\pi \times t$ when a thickness of the stack is 2t.

17. The battery according to claim 12,
wherein the ionic liquid includes ethylmethylimidazolium cation.

18. A battery comprising:
an exterior body;
a stack in the exterior body; and
an ionic liquid in the exterior body,
wherein the exterior body has a film-like form and is folded in half with the stack between facing portions of the exterior body,
wherein the exterior body includes a pair of first portions and a second portion,
wherein the pair of first portions overlaps with each other,
wherein each of the first portions includes a portion overlapping with the stack,
wherein the second portion is a folded portion located between the pair of first portions,
wherein in an area surrounded by the exterior body, the stack and the second portion are not in contact with each other but there is a space between the stack and the second portion,
wherein each of the first portions has a wave shape in which a plurality of crest lines and a plurality of trough lines are parallel to each other and alternately located,
wherein the pair of first portions of the exterior body includes a region in which the crest lines of one first portion do not overlap with the trough lines of the other first portion,
wherein the stack comprises a first positive electrode current collector and a second positive electrode current collector,
wherein a first positive electrode active material layer is provided on a first surface of the first positive electrode current collector,
wherein a second positive electrode active material layer is provided on a first surface of the second positive electrode current collector, and
wherein a second surface of the first positive electrode current collector is in contact with a second surface of the second positive electrode current collector.

* * * * *